United States Patent
Imai et al.

(10) Patent No.: US 8,692,931 B2
(45) Date of Patent: Apr. 8, 2014

(54) CAMERA MODULE

(75) Inventors: Satoshi Imai, Kanagawa (JP); Hironori Shimizu, Tokyo (JP); Tomoki Taguchi, Chiba (JP); Ryosuke Sawano, Tokyo (JP)

(73) Assignee: Sony Corporation, Tokyo (JP)

( * ) Notice: Subject to any disclaimer, the term of this patent is extended or adjusted under 35 U.S.C. 154(b) by 836 days.

(21) Appl. No.: 12/601,042

(22) PCT Filed: Jan. 20, 2009

(86) PCT No.: PCT/JP2009/050724
§ 371 (c)(1),
(2), (4) Date: Nov. 20, 2009

(87) PCT Pub. No.: WO2009/116310
PCT Pub. Date: Sep. 24, 2009

(65) Prior Publication Data
US 2010/0157137 A1    Jun. 24, 2010

(30) Foreign Application Priority Data
Mar. 21, 2008  (JP) .............................. P2008-074703

(51) Int. Cl.
*H04N 5/225*   (2006.01)
(52) U.S. Cl.
USPC ......................................................... 348/374
(58) Field of Classification Search
None
See application file for complete search history.

(56) References Cited

U.S. PATENT DOCUMENTS

| | | | |
|---|---|---|---|
| 7,288,003 B2 * | 10/2007 | Ono et al. ................ | 439/607.01 |
| 2003/0081948 A1 | 5/2003 | Nomura et al. | |
| 2005/0207026 A1 * | 9/2005 | Satodate et al. ............ | 359/696 |
| 2005/0264673 A1 * | 12/2005 | Kuchimaru .................... | 348/335 |
| 2005/0275740 A1 * | 12/2005 | Nagano ........................ | 348/335 |
| 2006/0063399 A1 * | 3/2006 | Li .................................... | 439/70 |
| 2006/0084301 A1 * | 4/2006 | Fromm et al. ................ | 439/101 |
| 2007/0097518 A1 * | 5/2007 | Sanou et al. .................. | 359/694 |
| 2007/0097527 A1 * | 5/2007 | Ichikawa et al. ............. | 359/819 |
| 2008/0247063 A1 * | 10/2008 | Otsuki et al. ................. | 359/824 |
| 2008/0266681 A1 * | 10/2008 | Shyu et al. .................... | 359/824 |
| 2009/0103192 A1 * | 4/2009 | Chang .......................... | 359/811 |

FOREIGN PATENT DOCUMENTS

| | | |
|---|---|---|
| EP | 1 781 019 | 5/2007 |
| JP | 2 149827 | 6/1990 |

(Continued)

*Primary Examiner* — Sinh Tran
*Assistant Examiner* — Jason Flohre
(74) *Attorney, Agent, or Firm* — Frommer Lawrence Haug LLP; William S. Frommer; Paul A. Levy

(57) ABSTRACT

A shutter section (84), mounted to a front surface (2202) of a front lens barrel (22), is included. The shutter section (84) has a shutter blade (not shown) that opens and closes an optical path of an image pickup optical system (28), an actuator (not shown) that drives the shutter blade, and a case (86) that accommodates the shutter blade and the actuator and that is provided with an opening (8610) for the optical path. The shutter section (84) is mounted to the front surface (2202) of the front lens barrel (22) by stopping a cover-side engagement stopping section (88) of the cover (26) and a case-side engagement stopping section (90) of the case (86) by engaging them with each other. By these structures, it is possible to provide a camera module that is advantageous in terms of reducing costs and size.

12 Claims, 43 Drawing Sheets

(56) References Cited

FOREIGN PATENT DOCUMENTS

| | | |
|---|---|---|
| JP | 2007 108597 | 4/2007 |
| JP | 2007 108599 | 4/2007 |
| JP | 2007 121779 | 5/2007 |
| JP | 2007 240996 | 9/2007 |
| WO | WO 2006/043358 | 4/2006 |

\* cited by examiner

FIG. 29
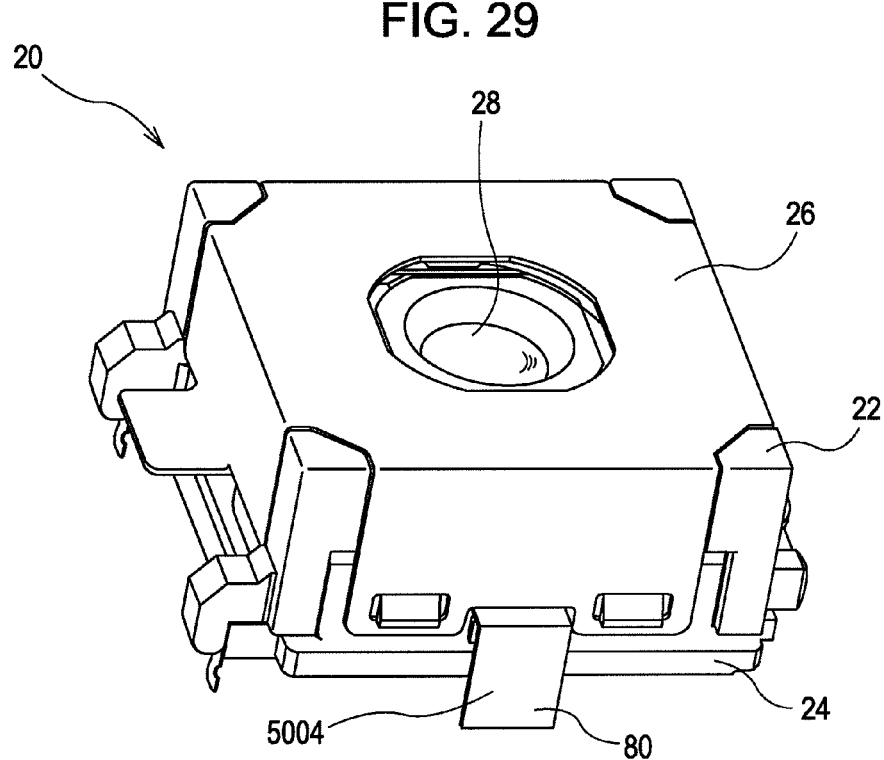
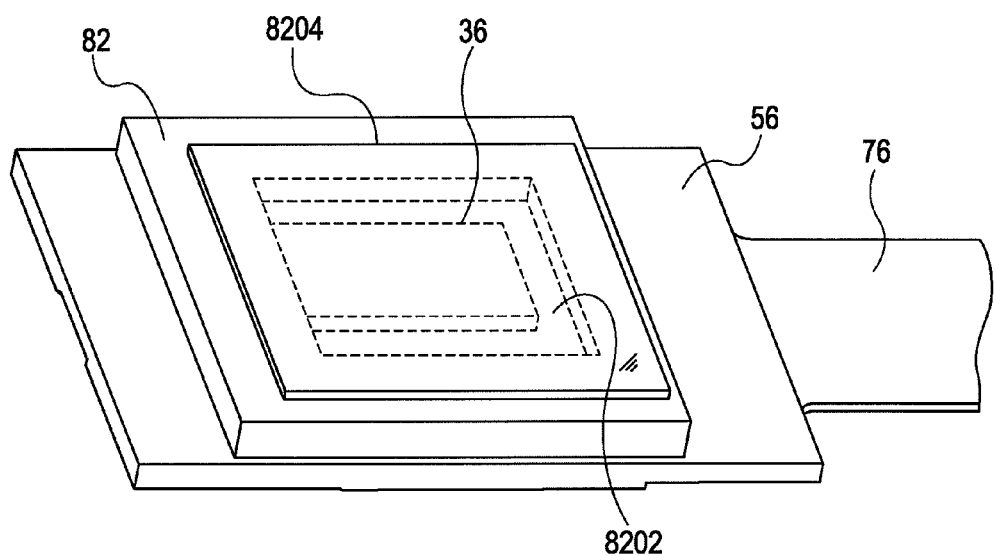

FIG. 33
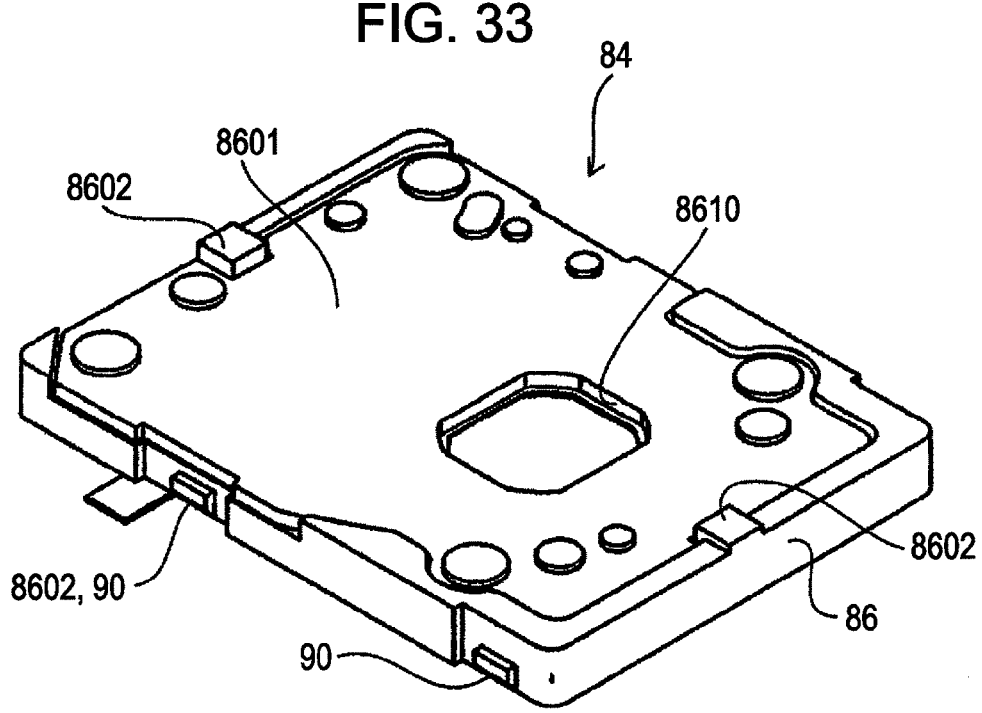
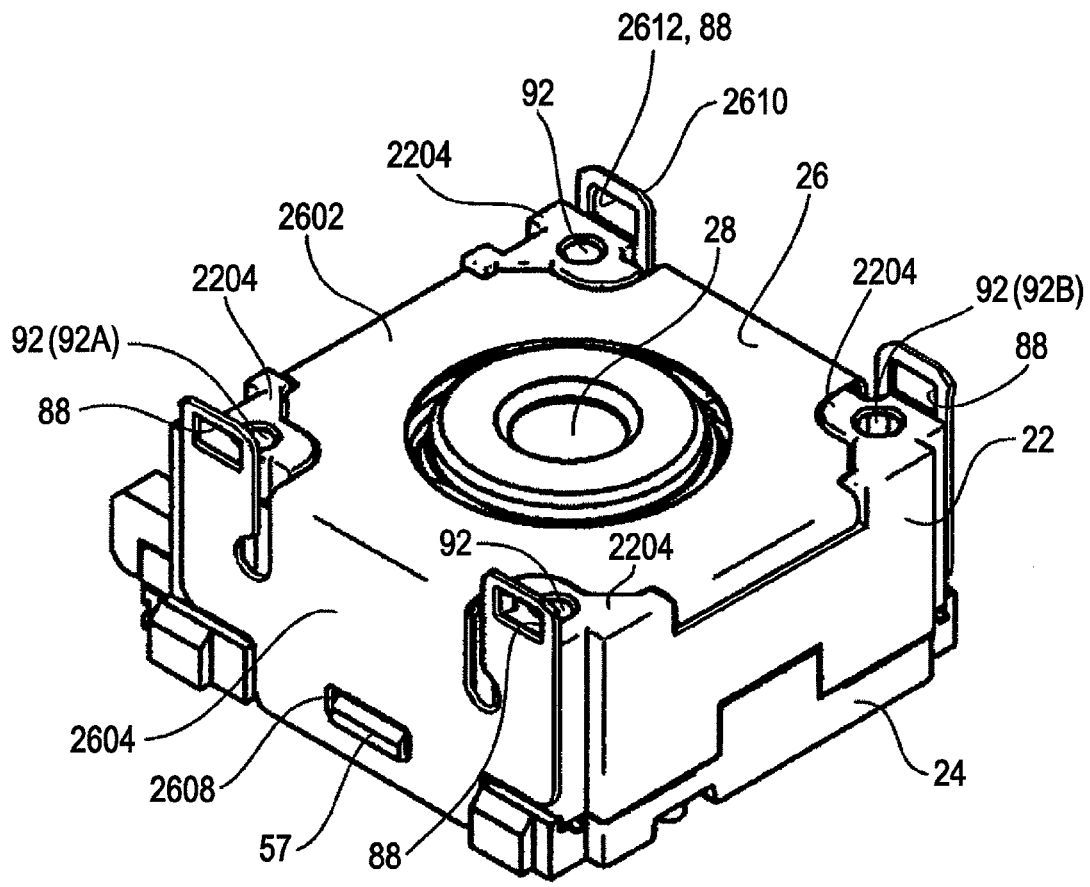

FIG. 34
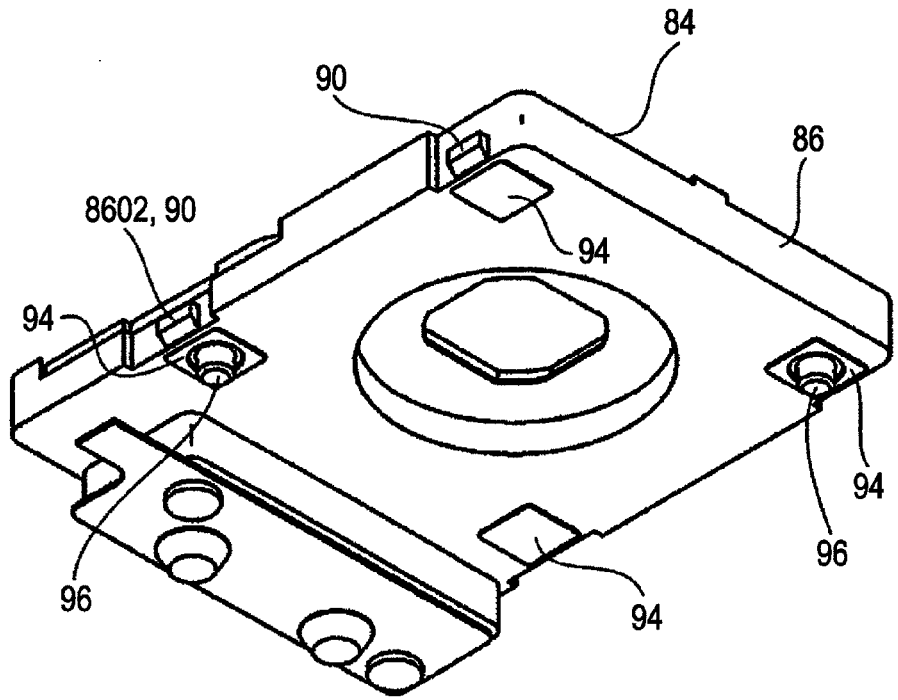
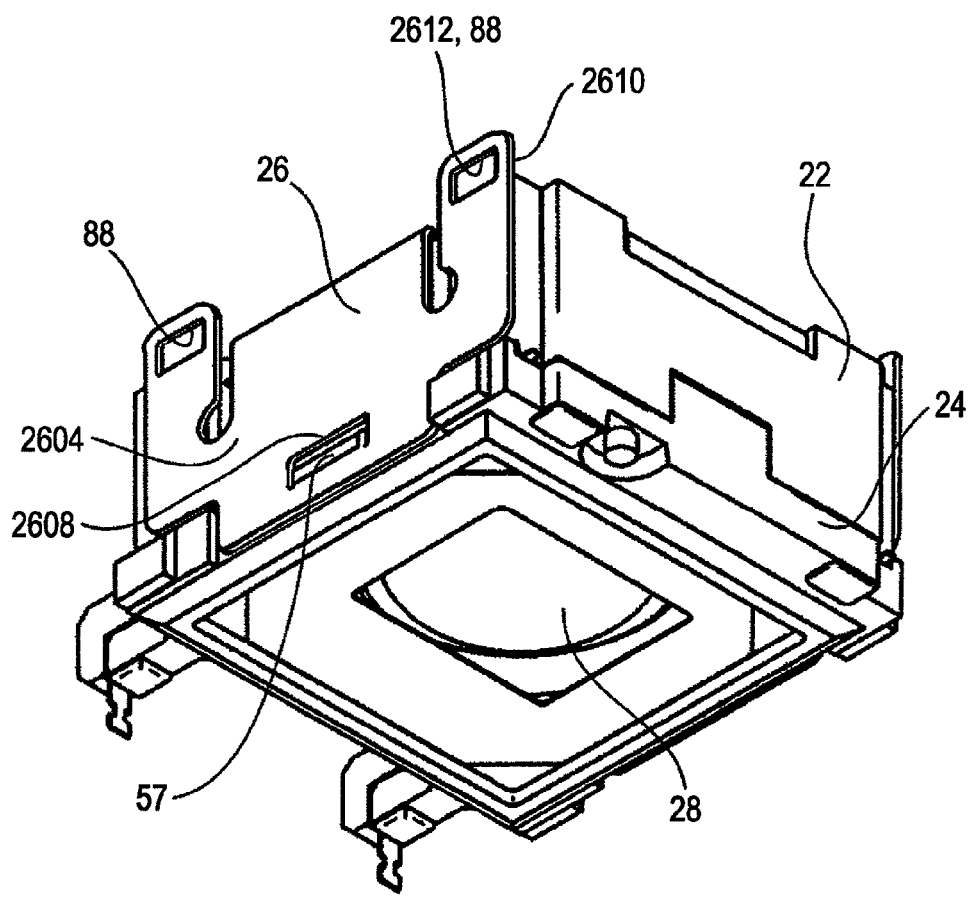

FIG. 37
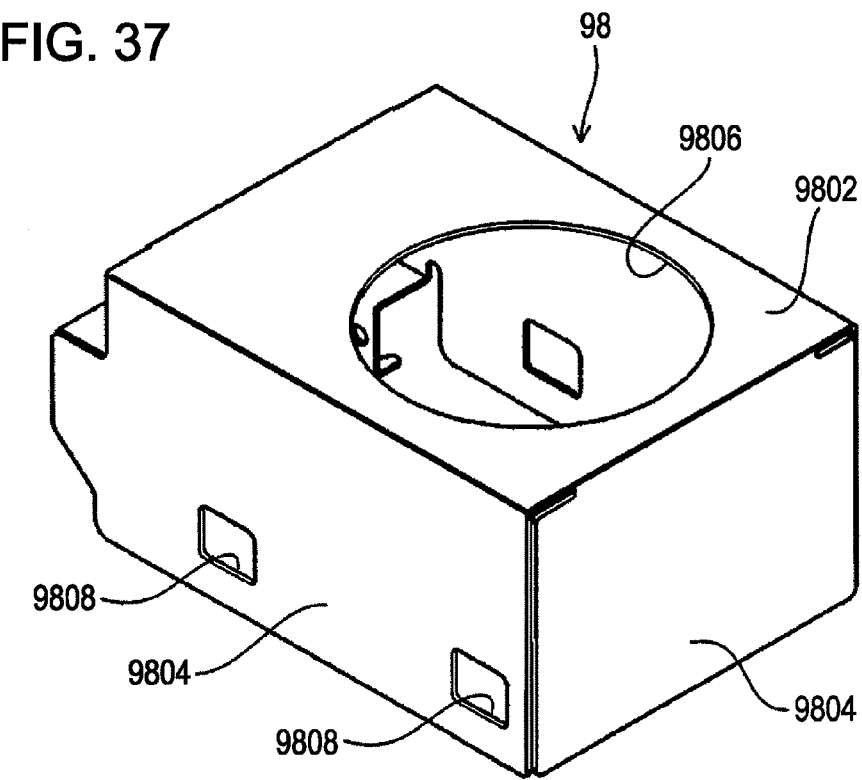
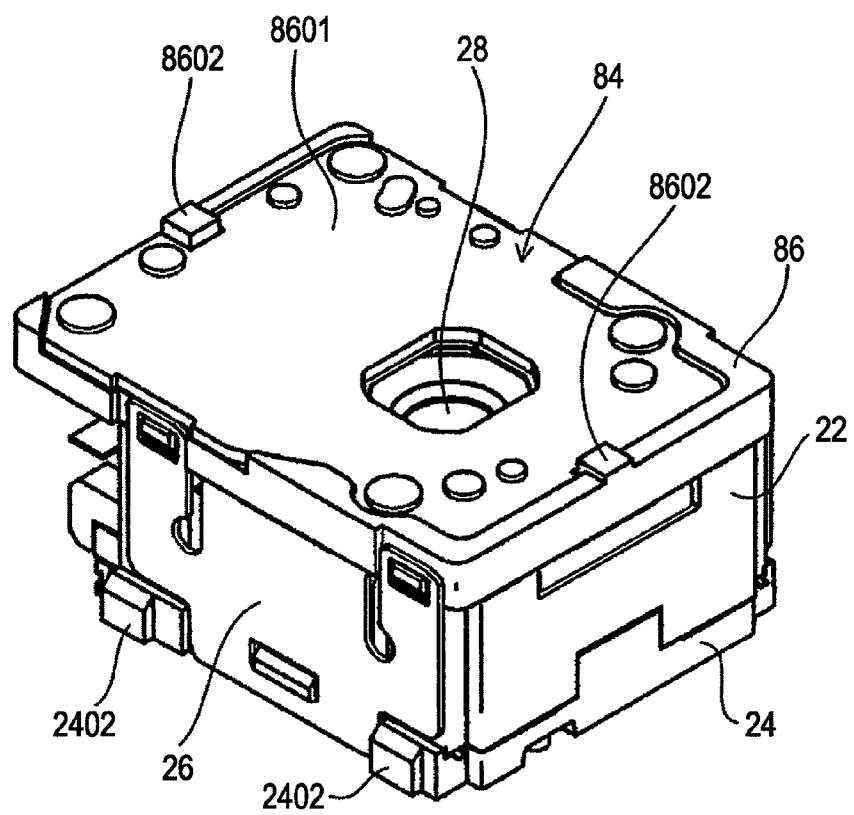

FIG. 49
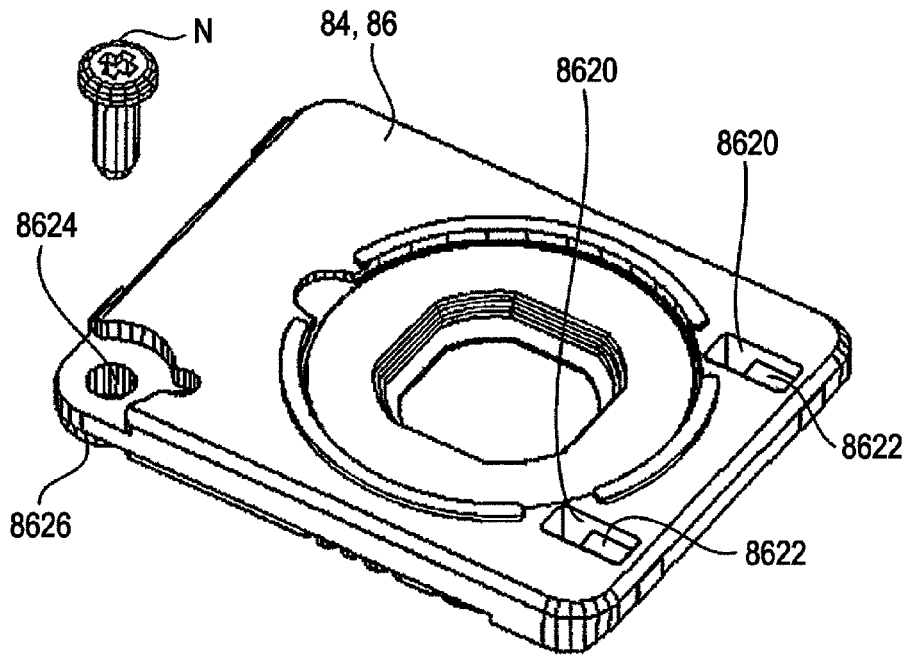
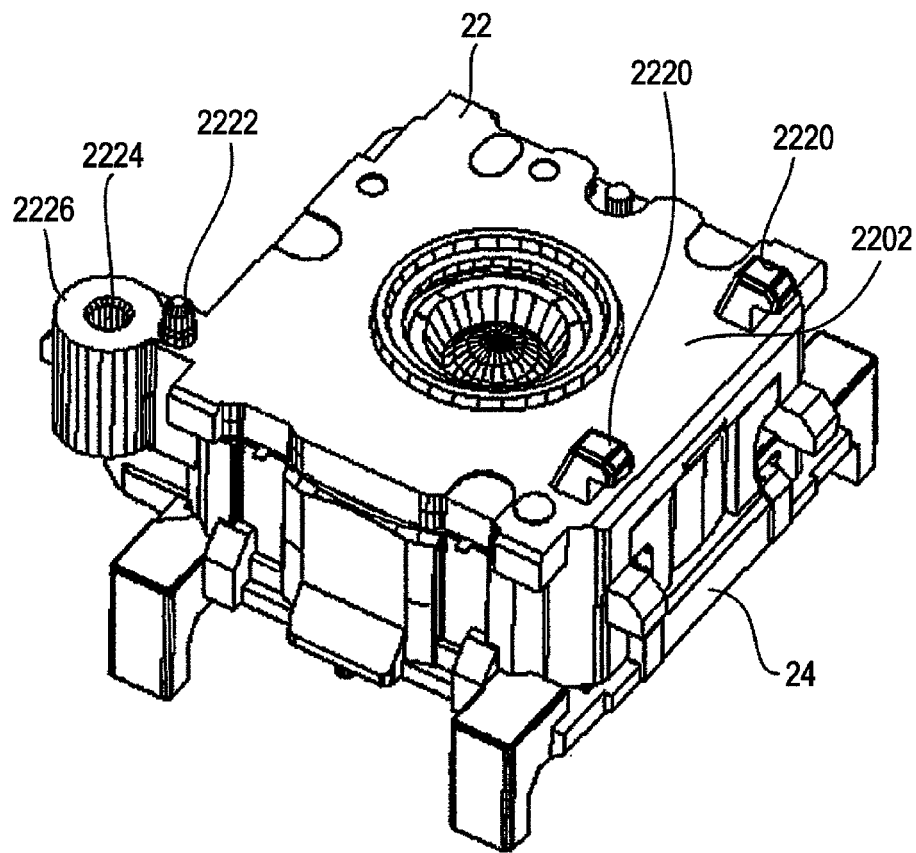

CAMERA MODULE

TECHNICAL FIELD

The present invention relates to, for example, a camera module incorporated in, for example, a portable electronic apparatus.

BACKGROUND ART

In recent years, electronic apparatuses, such as cellular phones incorporating camera modules or PDAs (personal digital assistants), are provided.

A camera module includes a lens holding member that holds an image pickup optical system, an image pickup element that picks up an object image guided by the image pickup optical system, and a driving section that moves the lens holding member along an optical axis of the image pickup optical system (refer to Japanese Unexamined Patent Application Publication No. 2007-108597).

To increase an added value of such a camera module, a camera module including a shutter section is provided.

In other words, in a structure in which a C-MOS sensor is used as the image pickup element and a flashlight that irradiates an electronic apparatus with image pickup auxiliary light is provided, when image pickup is performed by emitting light from the flashlight, it is necessary for the C-MOS sensor to read out the entire surface.

In reading out the entire surface, in order to eliminate the influence of external light in addition to the flashlight, it is necessary to use a mechanical shutter instead of an electronic shutter. Therefore, it is necessary to provide a shutter section that functions as such a mechanical shutter.

DISCLOSURE OF INVENTION

Hitherto, a shutter section is mounted to a camera module by screwing a screw, inserted into a screw insertion hole provided in the shutter section, into a threaded hole, provided in the camera module, with the camera module and the shutter section being positioned.

Therefore, a screw and a threaded hole are required, thereby increasing the number of parts and complicating the shapes of the parts. This is disadvantageous in terms of reducing costs and size of the camera module.

The present invention is achieved in view of such circumstances, and has as its object the provision of a camera module that is advantageous in terms of reducing costs and size.

To this end, according to the present invention, a camera module comprises a rear lens barrel; a front lens barrel mounted to a front side of the rear lens barrel, and forming along with the rear lens barrel an accommodation space in which an image pickup optical system is accommodated; a cover that is engaged with and stopped by the front lens barrel and the rear lens barrel, and that clamps the front lens barrel and the rear lens barrel in a front-back direction; and a shutter section mounted to a front surface of the front lens barrel, wherein the shutter section includes a shutter blade that opens and closes an optical path of the image pickup optical system, an actuator that drives the shutter blade, and a case that accommodates the shutter blade and the actuator and that has an opening for the optical path, and wherein the shutter section is mounted to the front surface of the front lens barrel by stopping a cover-side engagement stopping section of the cover and a case-side engagement stopping section of the case by engaging the cover-side engagement stopping section of the cover and the case-side engagement stopping section of the case with each other.

Therefore, according to the present invention, since the shutter section is mounted to the front surface of the front lens barrel by stopping the cover-side engagement stopping section of the cover and the case-side engagement stopping section of the case of the shutter section by engaging them with each other, the present invention is advantageous in terms of reducing the number of parts and simplifying the shapes of the parts, and in terms of reducing costs and the size of the camera module.

BRIEF DESCRIPTION OF DRAWINGS

FIG. 29 is a view illustrating mounting of the camera module 20 to an image pickup element 36.

FIG. 33 is an exploded perspective view illustrating mounting of a shutter section 84 to a front lens barrel 22.

FIG. 34 is an exploded perspective view illustrating the mounting of the shutter section 84 to the front lens barrel 22.

FIG. 37 is an exploded perspective view illustrating mounting of a shield case 98 to the front lens barrel 22.

FIG. 49 is an exploded perspective view illustrating mounting of a shutter section 84 to a front lens barrel 22 in a comparative example.

BEST MODE FOR CARRYING OUT THE INVENTION

Next, an embodiment according to the present invention will be described with reference to the drawings.

FIGS. 1(A) and 1(B) are external views of an exemplary electronic apparatus incorporating a camera module 20 according to the embodiment.

Figure 1:
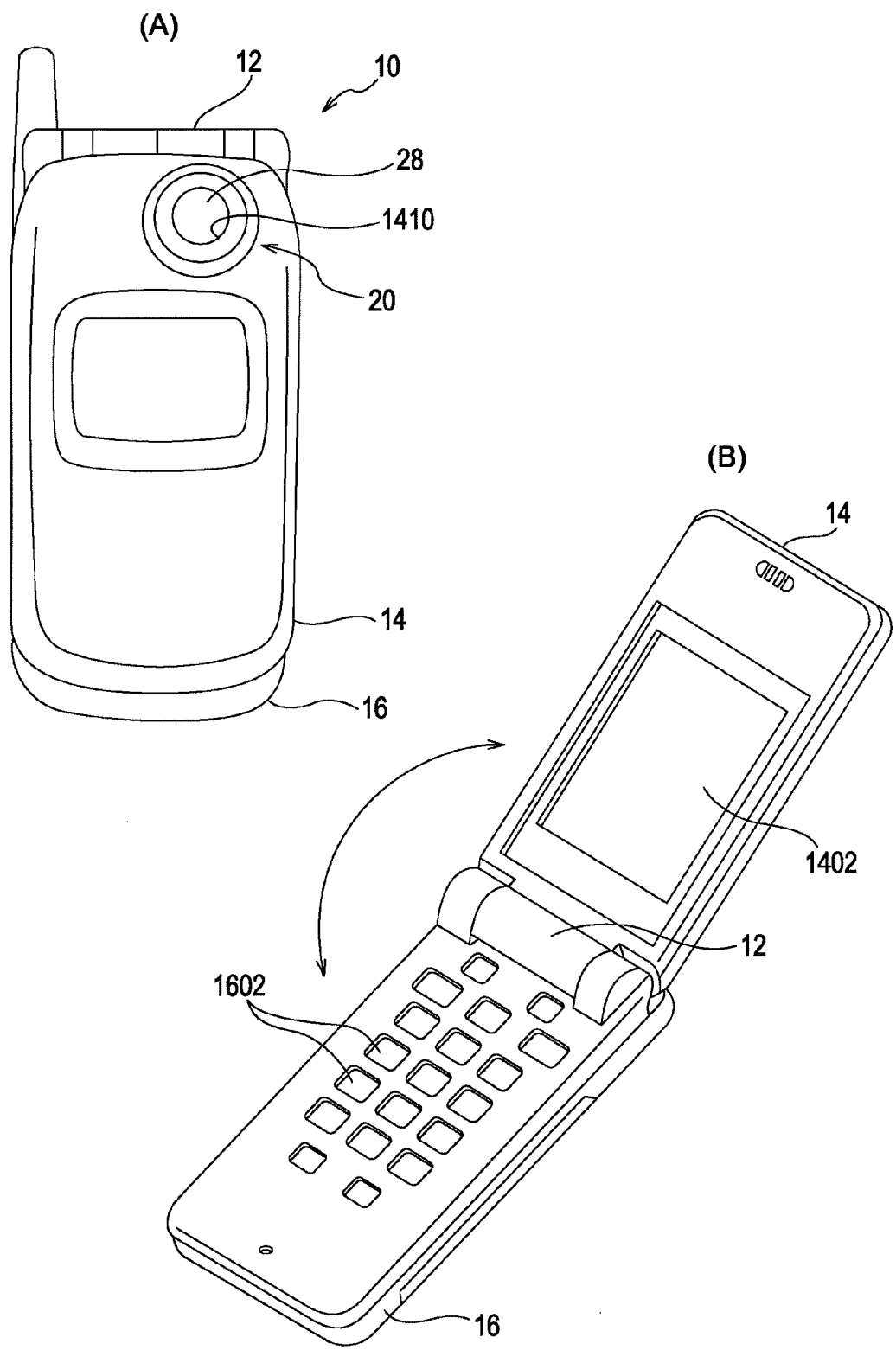
FIGS. 1(A) and 1(B) are external views of an exemplary electronic apparatus incorporating a camera module 20 according to an embodiment.

As shown in FIG. 1, an electronic apparatus 10 is a cellular phone, and includes a first housing 14 and a second housing 16 swingably connected to each other by a hinge section 12.

A liquid crystal display panel 1402 is provided at an inner surface of the first housing 14, and operation switches 1602, such as a numerical keypad or function keys, are provided at an inner surface of the second housing 16.

A camera module 20 is provided at the first housing 14, and an image picked up by the camera module 20 is displayed on the liquid crystal display panel 1402.

The camera module 20 includes an image pickup optical system 28 that places an object image, and the image pickup optical system 28 faces an opening 1410 provided in the first housing 14.

Next, the structure of the camera module 20 according to the present invention will be described in detail.

Figure 2:
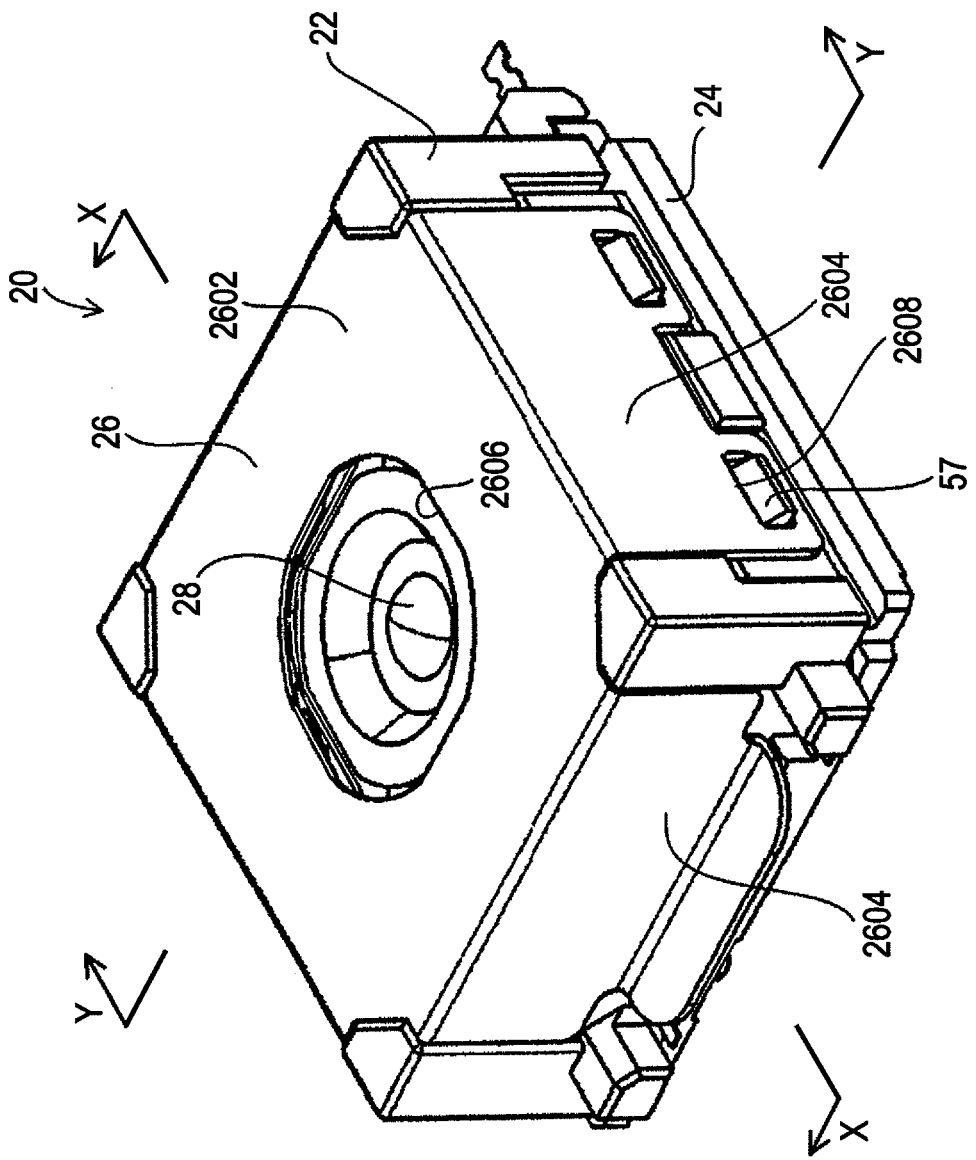
FIG. 2 is a perspective view of the camera module 20.
Figure 3:
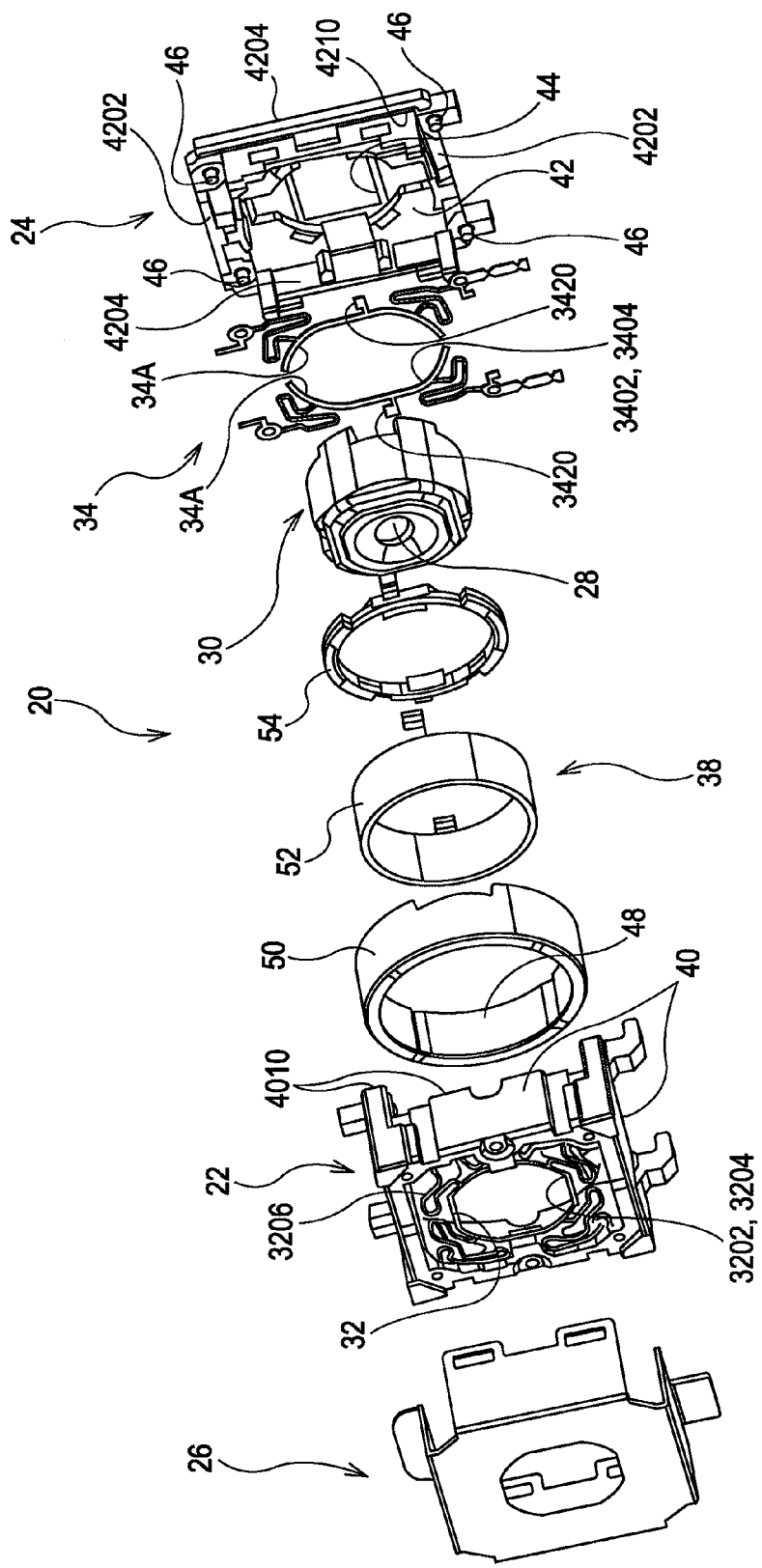
FIG. 3 is an exploded perspective view of the camera module 20.
Figure 4:
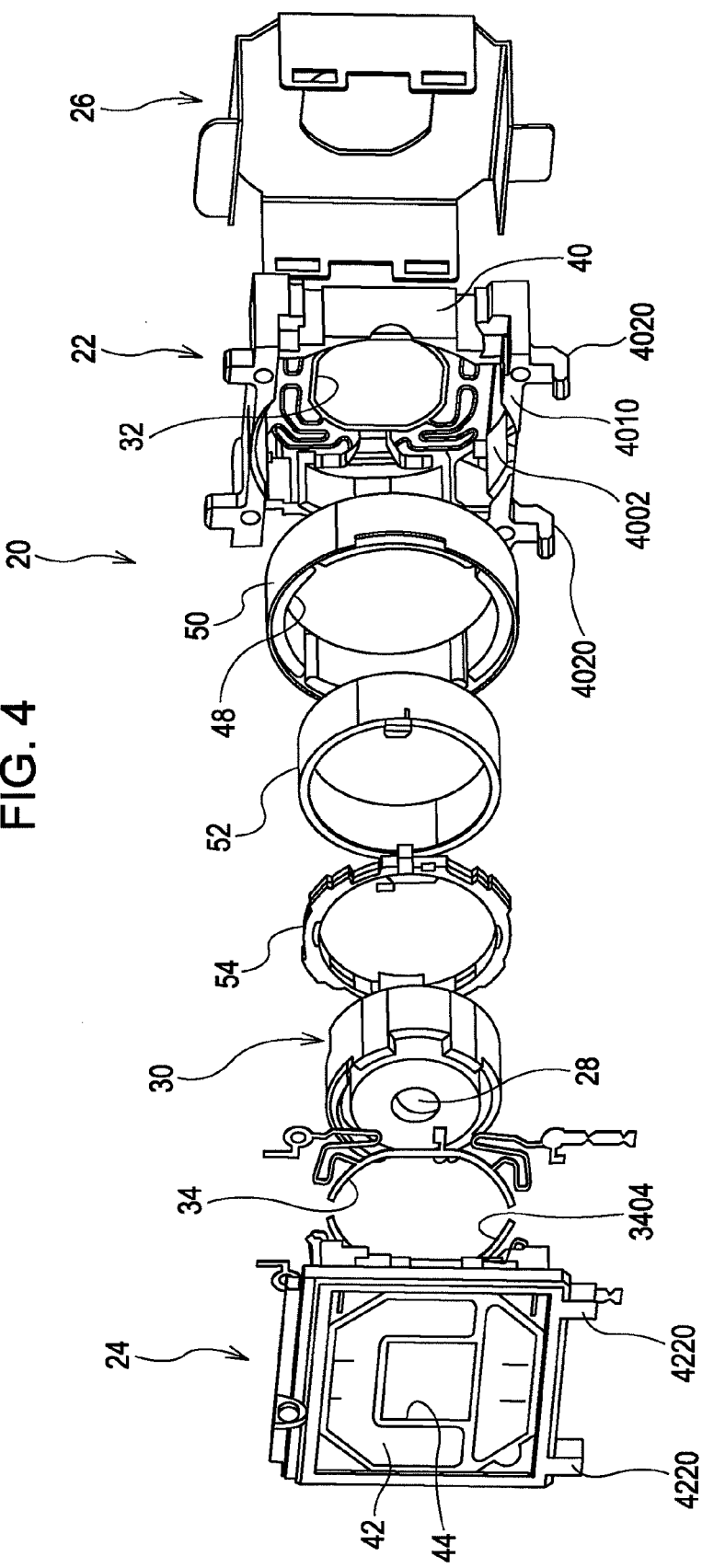
FIG. 4 is an exploded perspective view of the camera module 20.
Figure 5:
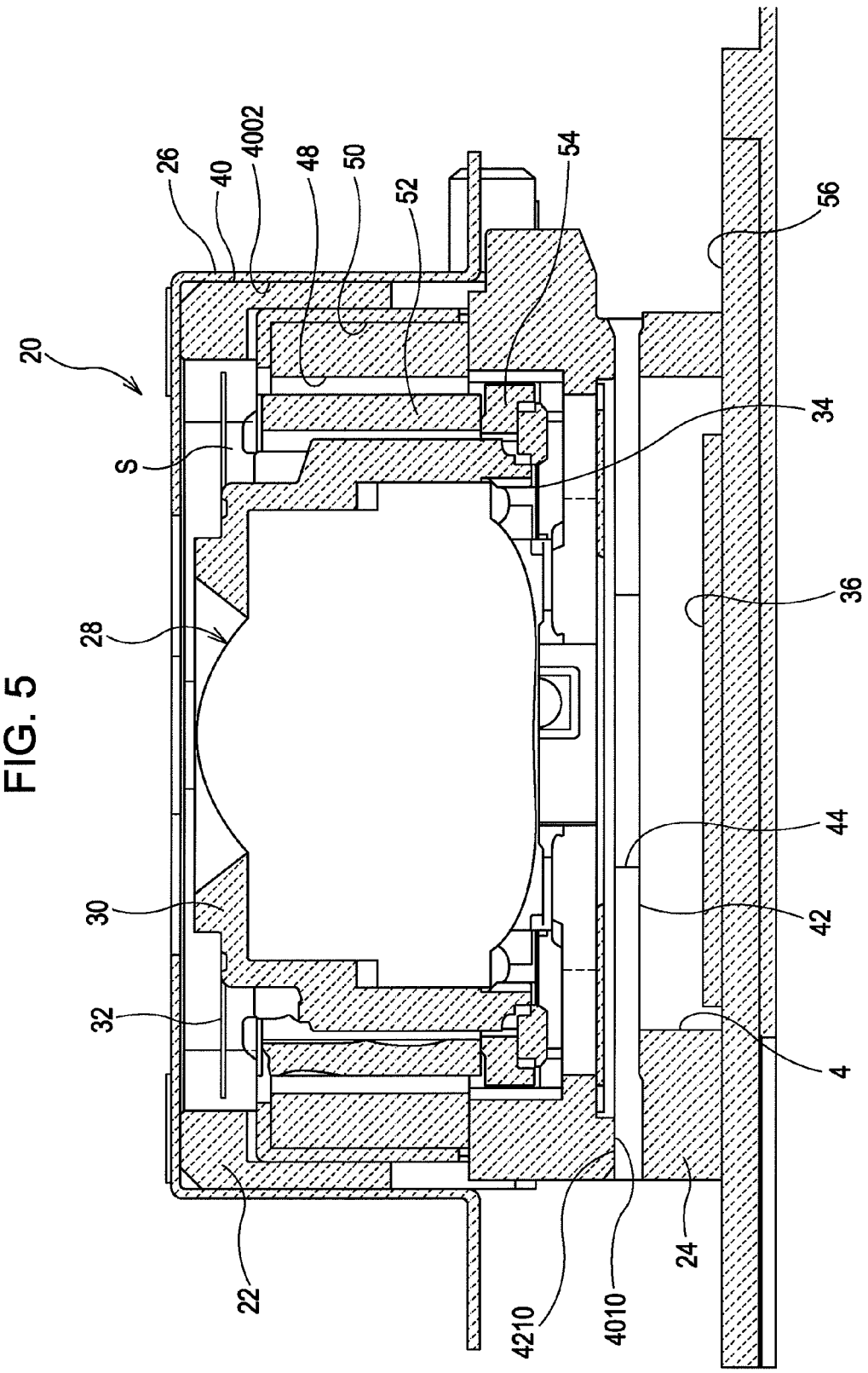
FIG. 5 is a sectional view taken along line XX in FIG. 2.
Figure 6:
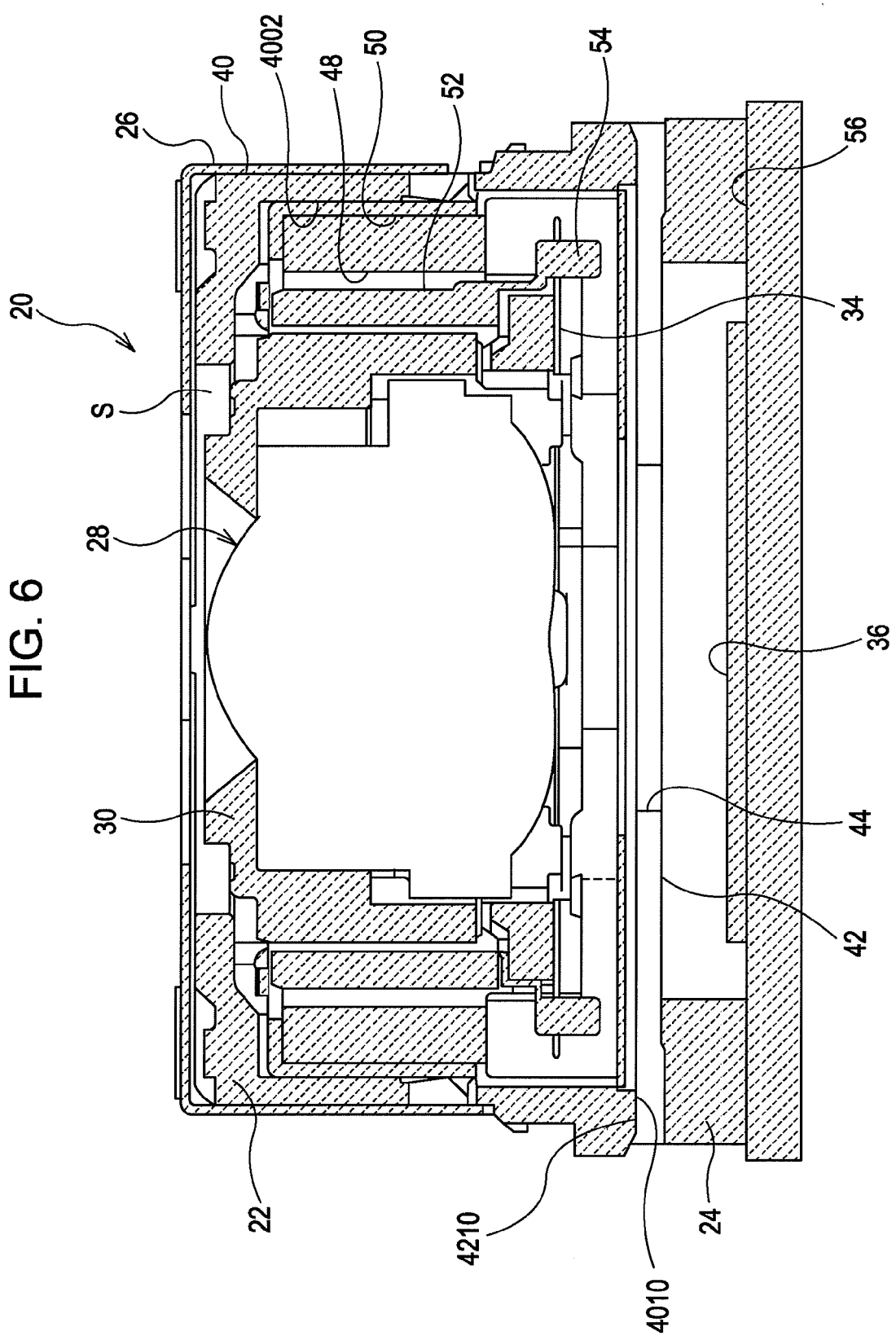
FIG. 6 is a sectional view taken along line YY in FIG. 2.
Figure 19:
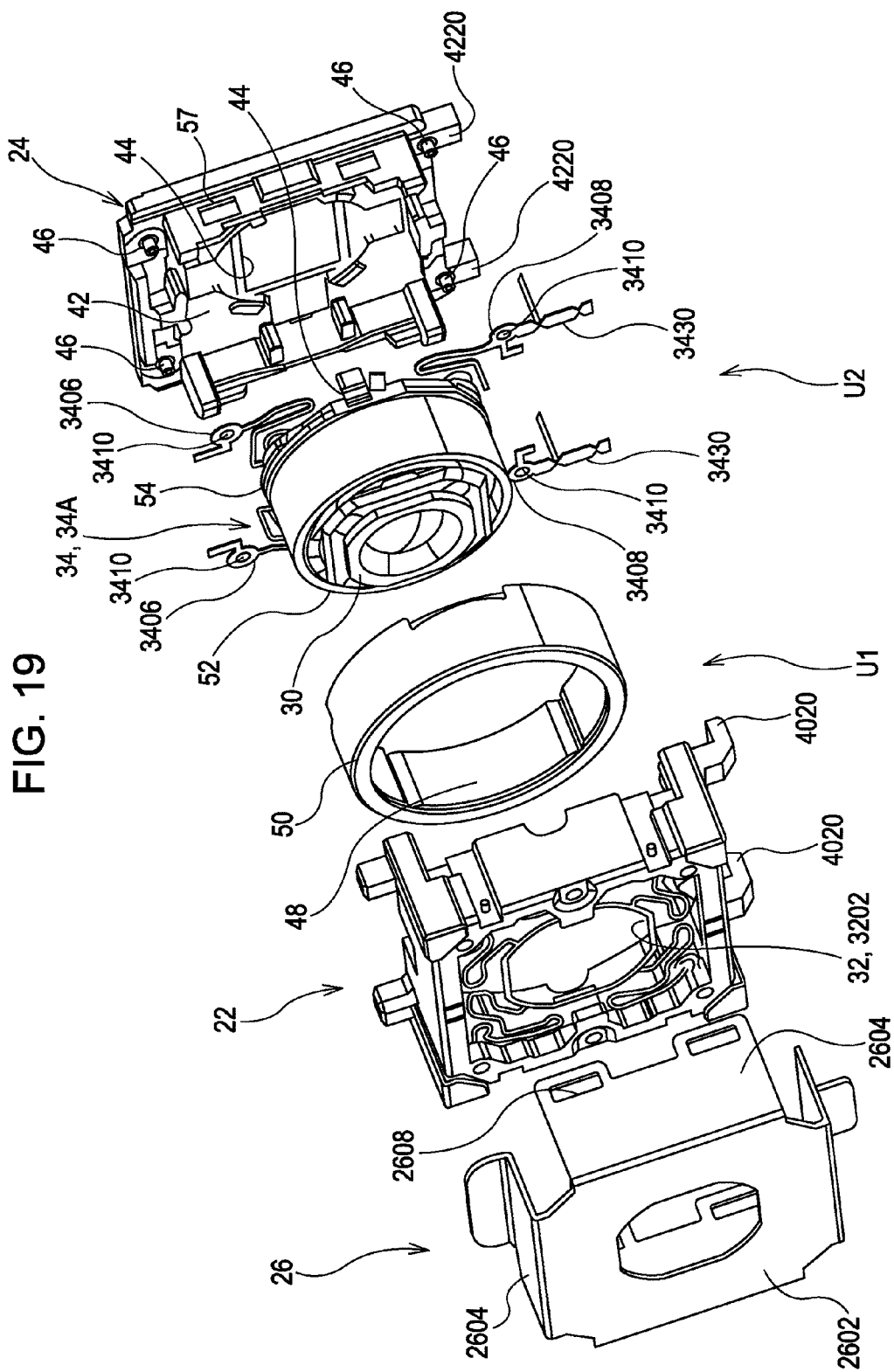
FIG. 19 is an exploded perspective view of the camera module 20.

FIG. 2 is a perspective view of the camera module 20. FIGS. 3, 4, and 19 are exploded perspective views of the camera module 20. FIG. 5 is a sectional view taken along line XX in FIG. 2. FIG. 6 is a sectional view taken along line YY in FIG. 2.

Figure 7:
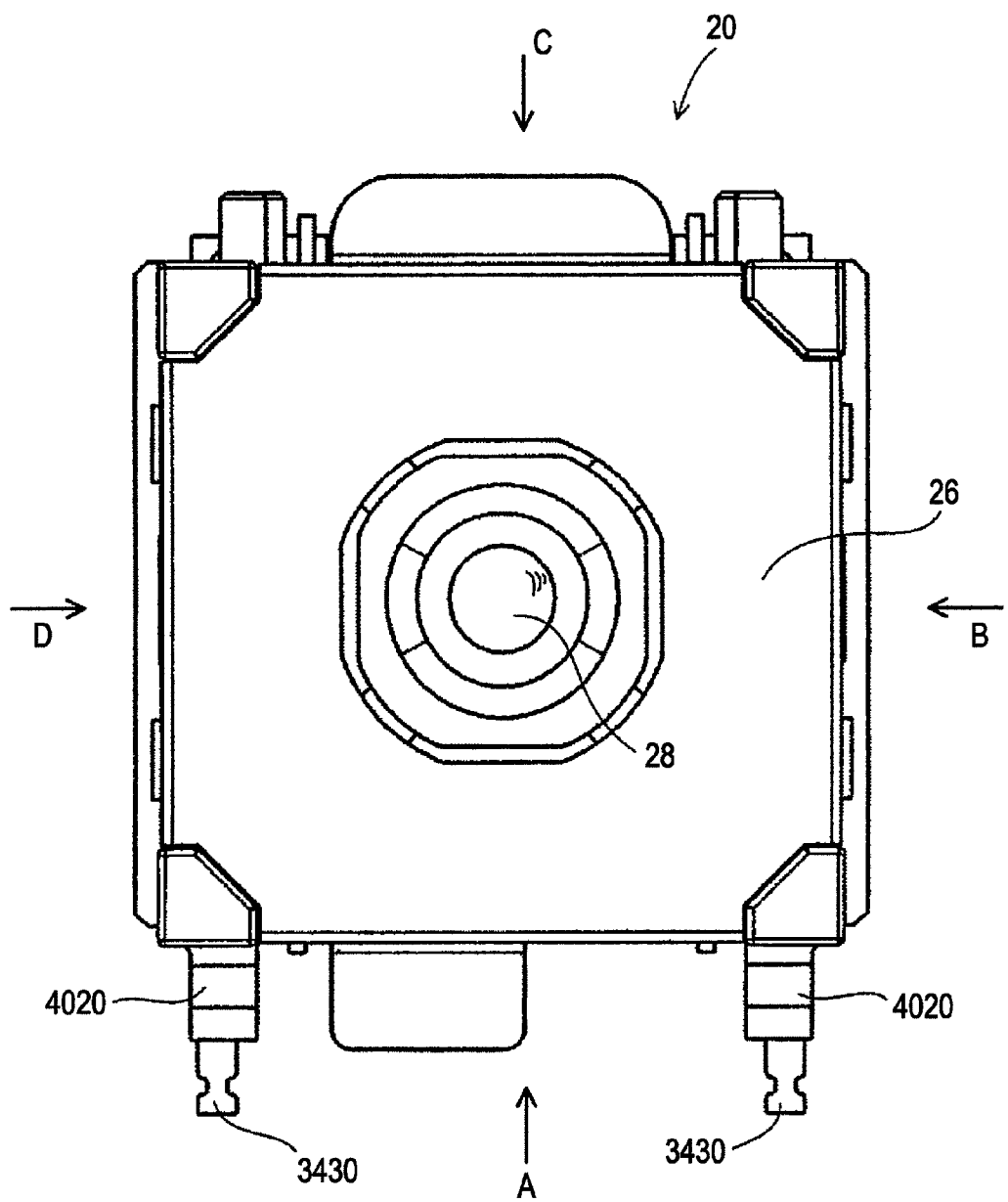
FIG. 7 is a plan view of the camera module 20.
Figure 8:
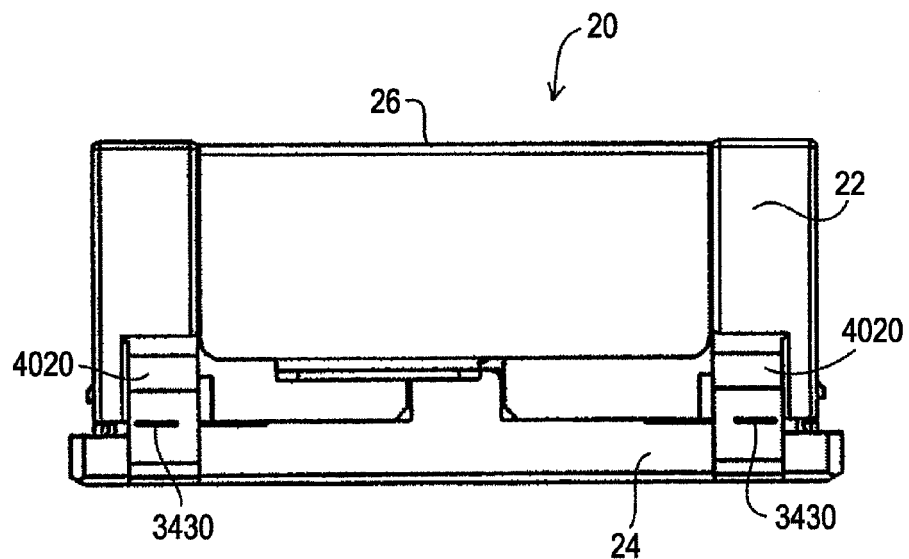
FIG. 8 is a view taken along arrow A in FIG. 7.
Figure 9:
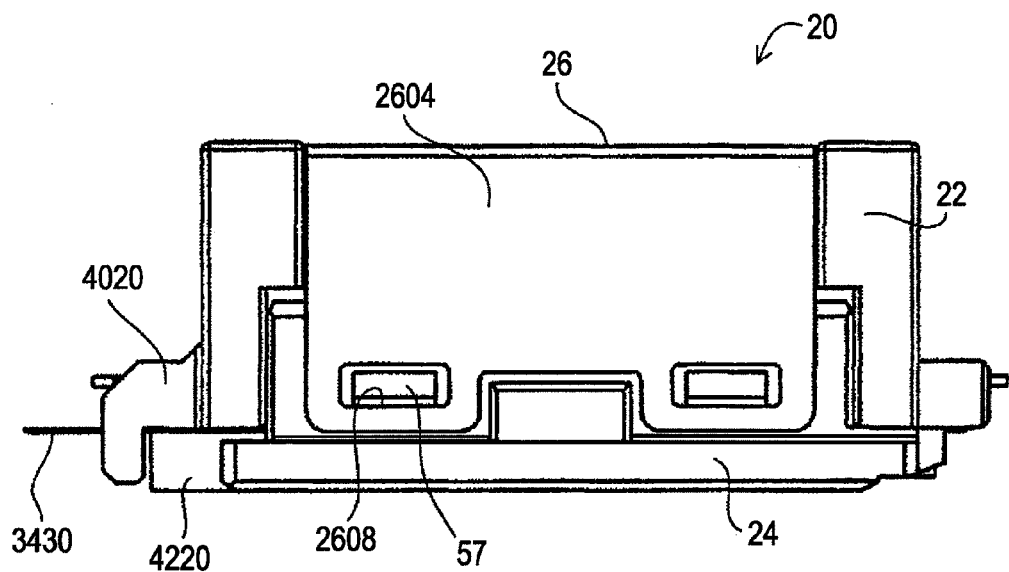
FIG. 9 is a view taken along arrow B in FIG. 7.
Figure 10:
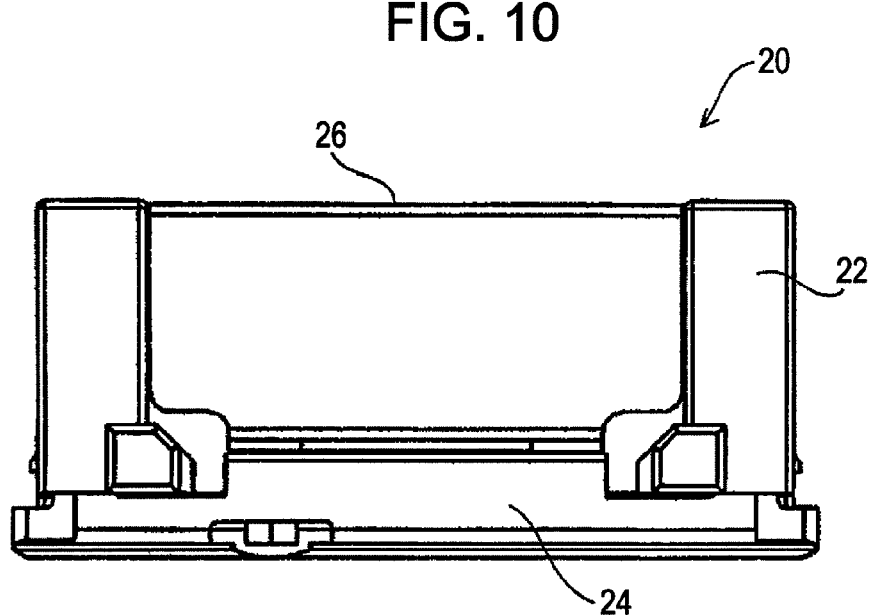
FIG. 10 is a view taken along arrow C in FIG. 7.
Figure 11:
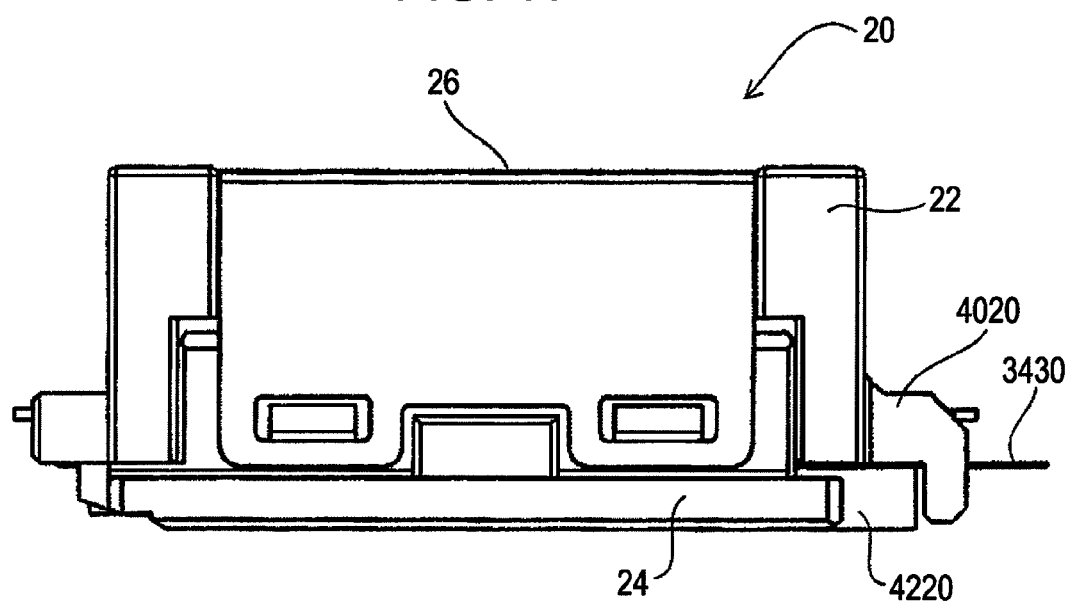
FIG. 11 is a view taken along arrow D in FIG. 7.
Figure 12:
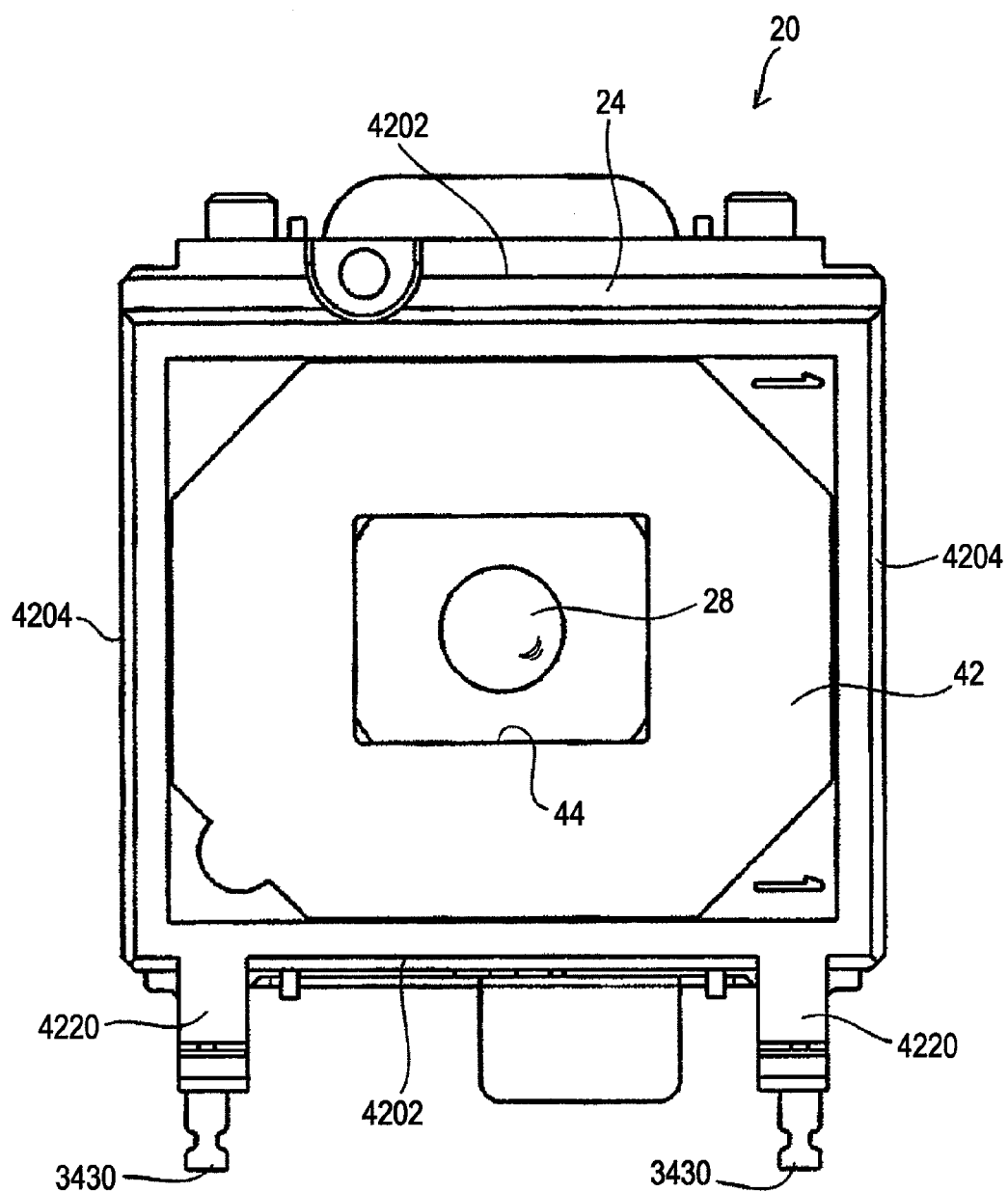
FIG. 12 is rear view of FIG. 7.

FIG. 7 is a plan view of the camera module 20. FIG. 8 is a view taken along arrow A in FIG. 7. FIG. 9 is a view taken along arrow B in FIG. 7. FIG. 10 is a view taken along arrow C in FIG. 7. FIG. 11 is a view taken along arrow D in FIG. 7. FIG. 12 is rear view of FIG. 7.

Furthermore, in FIGS. 2 to 4 and FIGS. 7 to 12, the camera module 20 is shown in a state without a substrate 56.

In addition, in the embodiment, a description will be given with an object side as a front side and the opposite side as a back side.

As shown in FIGS. 3 to 6, in addition to the above-described image pickup optical system 28, the camera module 20 includes, for example, a front lens barrel 22, a rear lens barrel 24, a cover 26, a lens holding member 30, a front spring 32, a back spring 34, an image pickup element 36, and a driving section 38.

(Front Lens Barrel 22)

The front lens barrel 22 is mounted to the rear lens barrel 24, and forms an accommodation space S (FIGS. 5 and 6) along with the rear lens barrel 24.

As shown in FIGS. 4, 5, and 6, the front lens barrel 22 includes a peripheral wall 40.

An inner surface of the peripheral wall 40 is formed as a magnet mounting surface 4002 having a circular cylindrical surface, and an outer surface of the peripheral wall 40 has a rectangular shape.

The front lens barrel 22 is formed by molding a synthetic resin material with a mold.

As shown in FIGS. 3 and 4, rear end surfaces where the peripheral wall 40 faces the back are formed as setting surfaces 4010 set upon the rear lens barrel 24.

In addition, as shown in FIG. 4, two front-side protruding portions 4020 protrude from both rear end sides at two outer surfaces opposing each other of the peripheral wall 40 of the front lens barrel 22.

(Rear Lens Barrel 24)

As shown in FIGS. 3 to 6, the rear lens barrel 24 has a bottom wall 42 and an opening 44.

The bottom wall 42 is formed with a rectangular shape that blocks a rear end of the accommodation space S in the optical axis direction, so that a front surface of the bottom wall 42 faces the accommodation space S.

The bottom wall 42 has two pairs of sides 4202 and sides 4204 opposing each other, and two pins 46, used for mounting the back spring 34, are provided so as to protrude from each pair of sides 4202.

Locations along the four sides, the sides 4202 and the sides 4204, at the front surface of the bottom wall 42 are formed as setting surfaces 4210 set upon the setting surfaces 4010 of the front lens barrel 22.

As shown in FIGS. 5 and 6, the setting surfaces 4210 of the rear lens barrel 24 are set upon the setting surfaces 4010 of the front lens barrel 22.

In addition, as shown in FIG. 4, two back-side protruding portions 4220 are provided so as to protrude from respective sides of one side of the bottom wall 42.

The opening 44 is formed at the center of the bottom wall 42, and has a rectangular shape.

(Magnet 48)

As shown in FIGS. 3 to 6, the driving section 38 is formed so as to include a magnet 48 and a coil 52.

The magnet 48 is provided so as to extend on a circumference in which an optical axis of the image pickup optical system 28 is the center. In the embodiment, the magnet 48 is formed by arranging side by side four magnet segments having the same shape in a circumferential direction, and faces an outer periphery of the coil 52.

In the embodiment, the magnet 48 is mounted to the inner peripheral surface of a yoke 50 having the form of a circular cylindrical wall for efficiently guiding magnetic flux of the magnet 48 to the coil 52, and is mounted to the magnet mounting surface 4002 of the front lens barrel 24 through the yoke 50.

(Coil 52)

Figure 13:
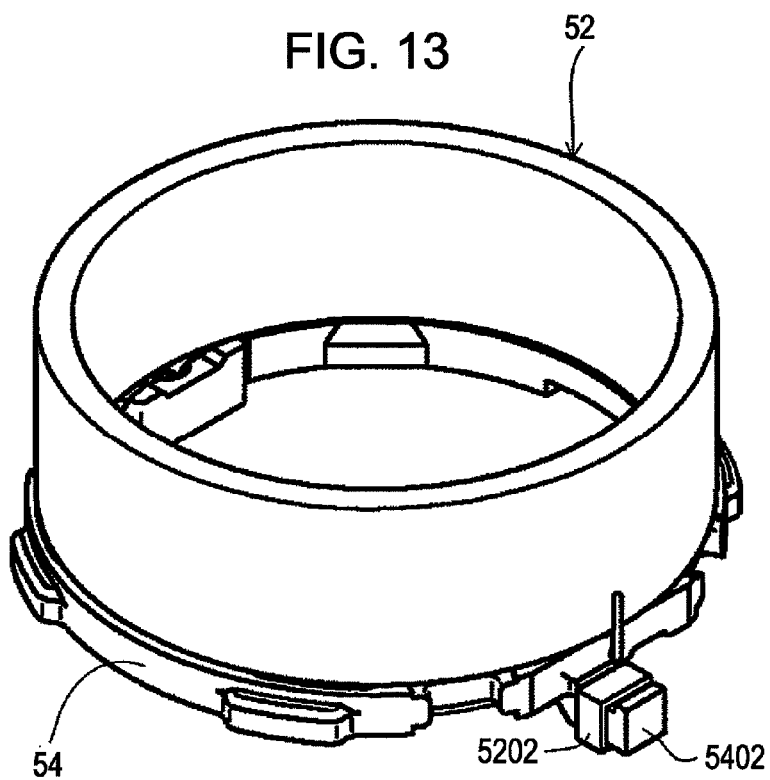
FIG. 13 is a perspective front view of a coil 52.
Figure 14:
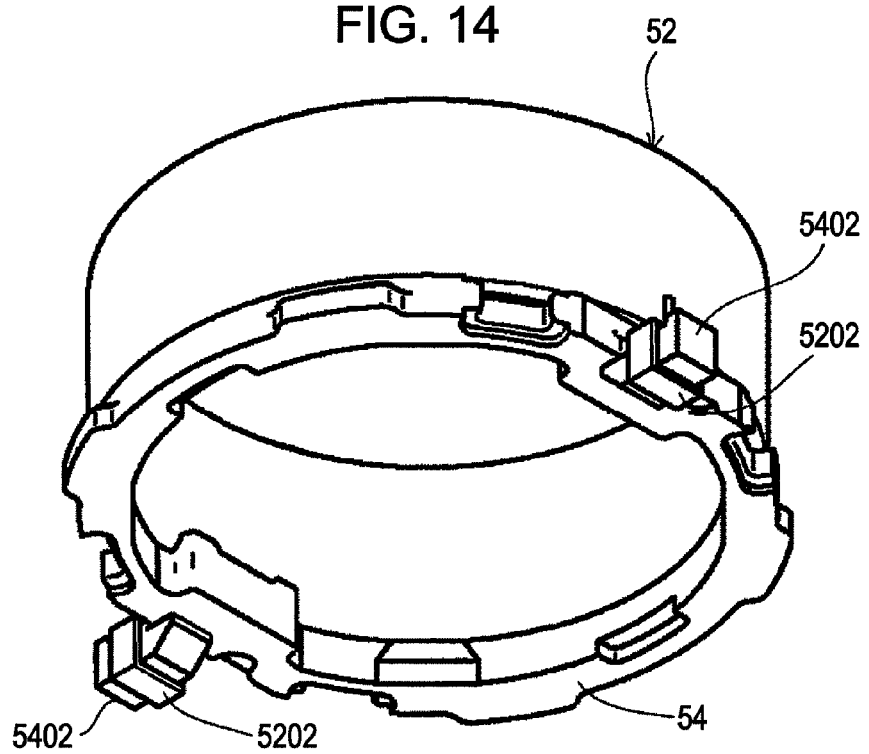
FIG. 14 is a perspective rear view of the coil 52.
Figure 15:
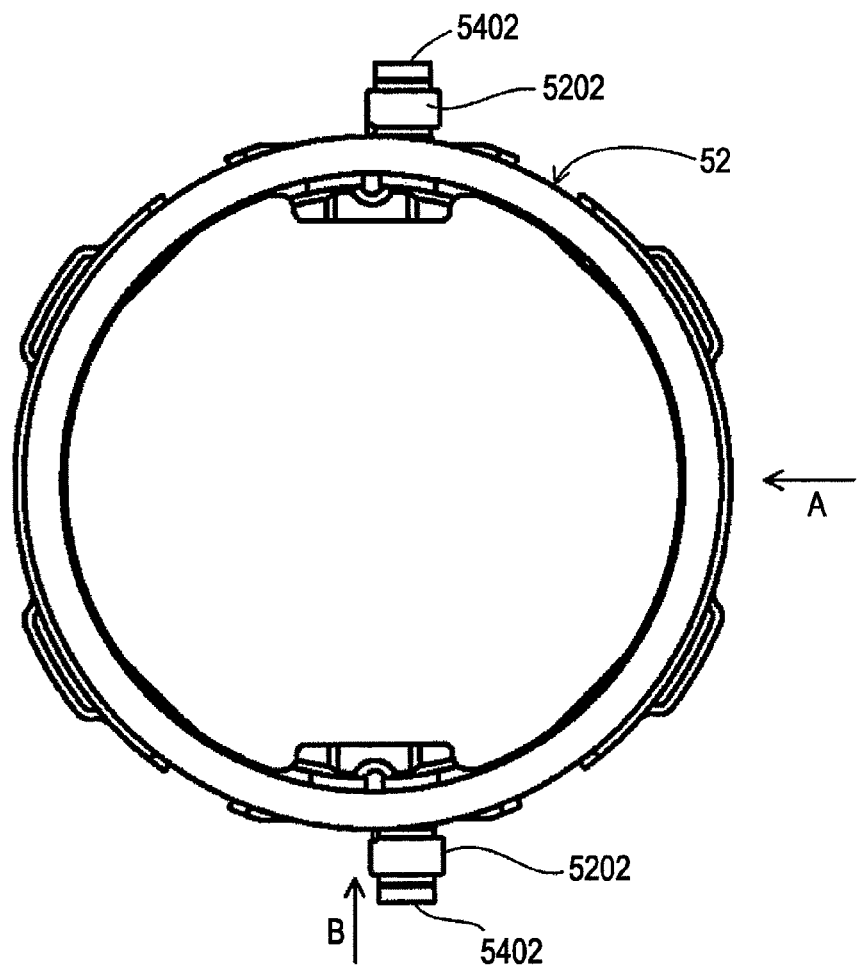
FIG. 15 is a plan view of the coil 52.
Figure 16:
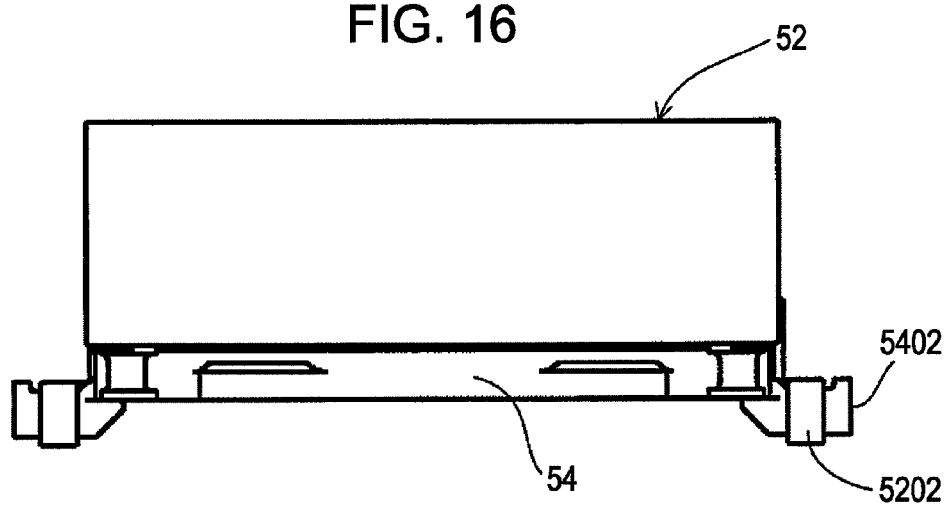
FIG. 16 is a view taken along arrow A in FIG. 15.
Figure 17:
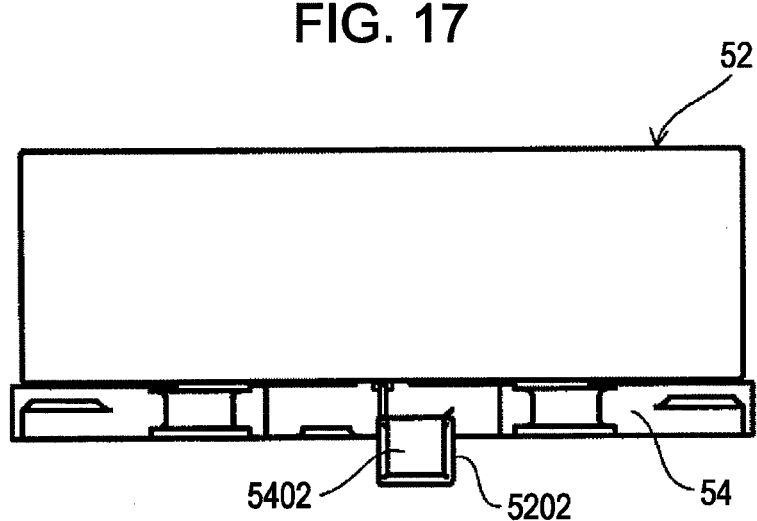
FIG. 17 is a view taken along arrow B in FIG. 15.
Figure 18:
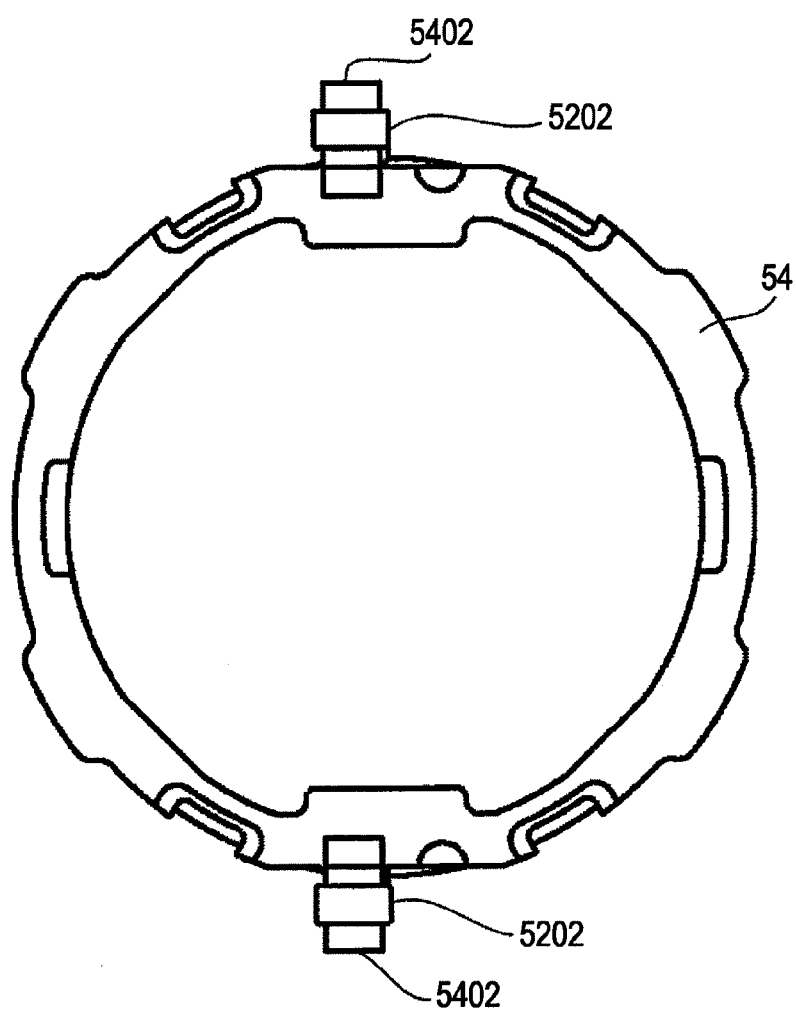
FIG. 18 is a rear view of the coil 52.

FIG. 13 is a perspective front view of the coil 52. FIG. 14 is a perspective rear view of the coil 52. FIG. 15 is a plan view of the coil 52. FIG. 16 is a view taken along arrow A in FIG. 15. FIG. 17 is a view taken along arrow B in FIG. 15. FIG. 18 is a rear view of the coil 52.

The coil 52 is formed by winding a wire along a circumference in which the optical axis of the image pickup optical system 28 is the center. The outside diameter of the coil 52 is smaller than the inside diameter of the magnet 48.

An annular coil holder 54 having a contour that is substantially the same as that of the coil 52 in plan view, and formed so as have an optical-axis direction size that is smaller than that of the coil 52 is mounted to a rear end surface of the coil 52.

In the coil holder 54, shaft sections 5402 are provided so as to protrude radially outward from two opposing locations whose phases differ by 180 degrees; and both ends 5202 of the wire of the coil 52 are wound on the respective shaft sections 5402.

(Image Pickup Element 36)

The image pickup element 36 picks up an object image that is guided by the image pickup optical system 28.

As shown in FIGS. 5 and 6, the image pickup element 36 is provided at a front surface of the rectangular substrate 56.

With the image pickup element 36 being positioned in the opening 44 of the rear lens barrel 24, the image pickup element 36 is sealed by adhering the substrate 56 to a back surface of the bottom wall 42 of the rear lens barrel 24, and by adhering an optical filter (not shown) that covers the opening 44 to the front surface of the bottom wall 42. Therefore, the image pickup element 36 is provided at the rear lens barrel 52.

(Cover 26)

As shown in FIGS. 2 and 9, the cover 26 has a front surface section 2602 and side surface sections 2604.

The front surface section 2602 has the form of a rectangular plate, and covers the front surface of the front lens barrel 22.

The front surface section 2602 has an opening 2606 formed in a location facing the image pickup optical system 28.

The side surface sections 2604 are formed by bending from four sides of the front surface section 2602, and covers four side portions of the front lens barrel 22 and those of the rear lens barrel 24.

One pair of the opposing side surface sections 2604 among the four side surface sections 2604 are provided with engagement grooves 2608 that engage respective engagement protrusions 57 of the rear lens barrel 24.

By engaging each engagement groove 2608 of the cover 26 with each engagement protrusion 57, the front lens barrel 22 is clamped between the front surface section 2602 of the cover 26 and the bottom wall 42 of the rear lens barrel 24, so that the front lens barrel 22 and the rear lens barrel 24 are connected to each other.

(Lens Holding Member 30)

Figure 20:
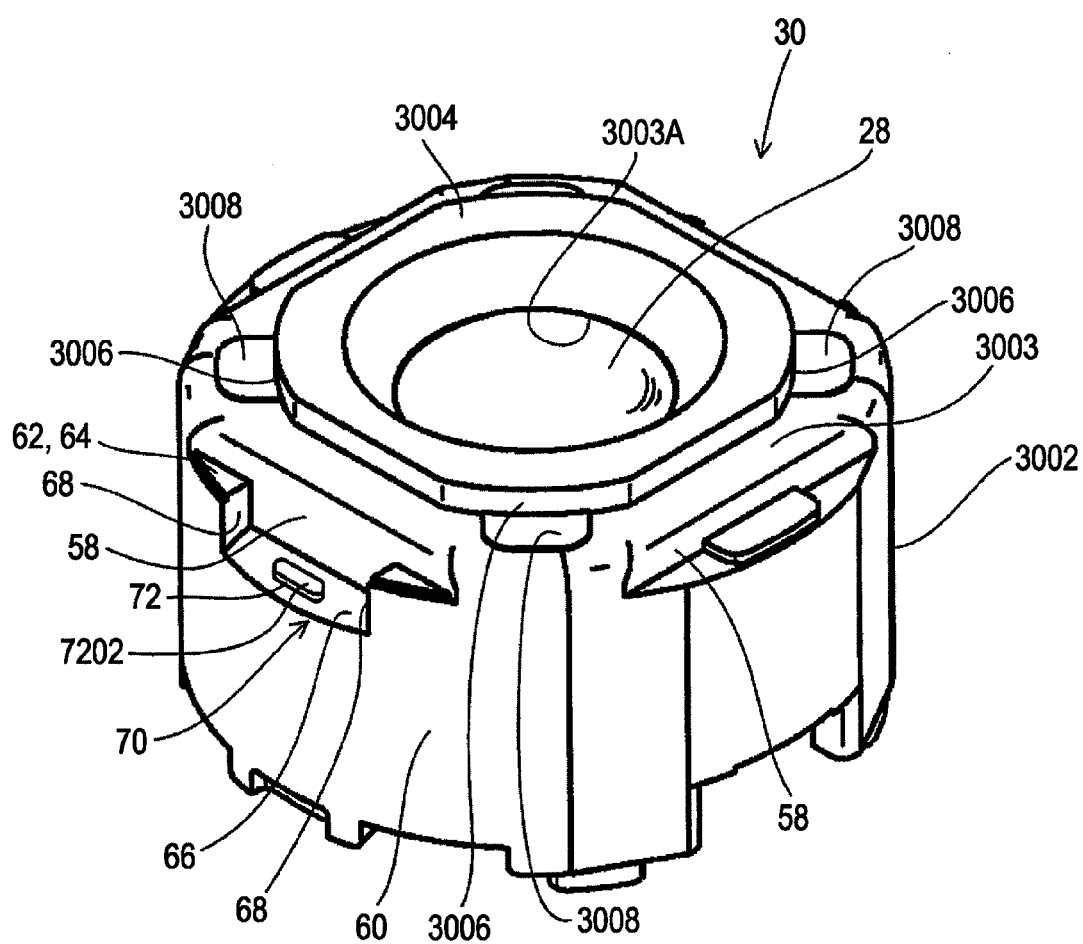
FIG. 20 is a perspective front view of a lens holding member 30.
Figure 21:
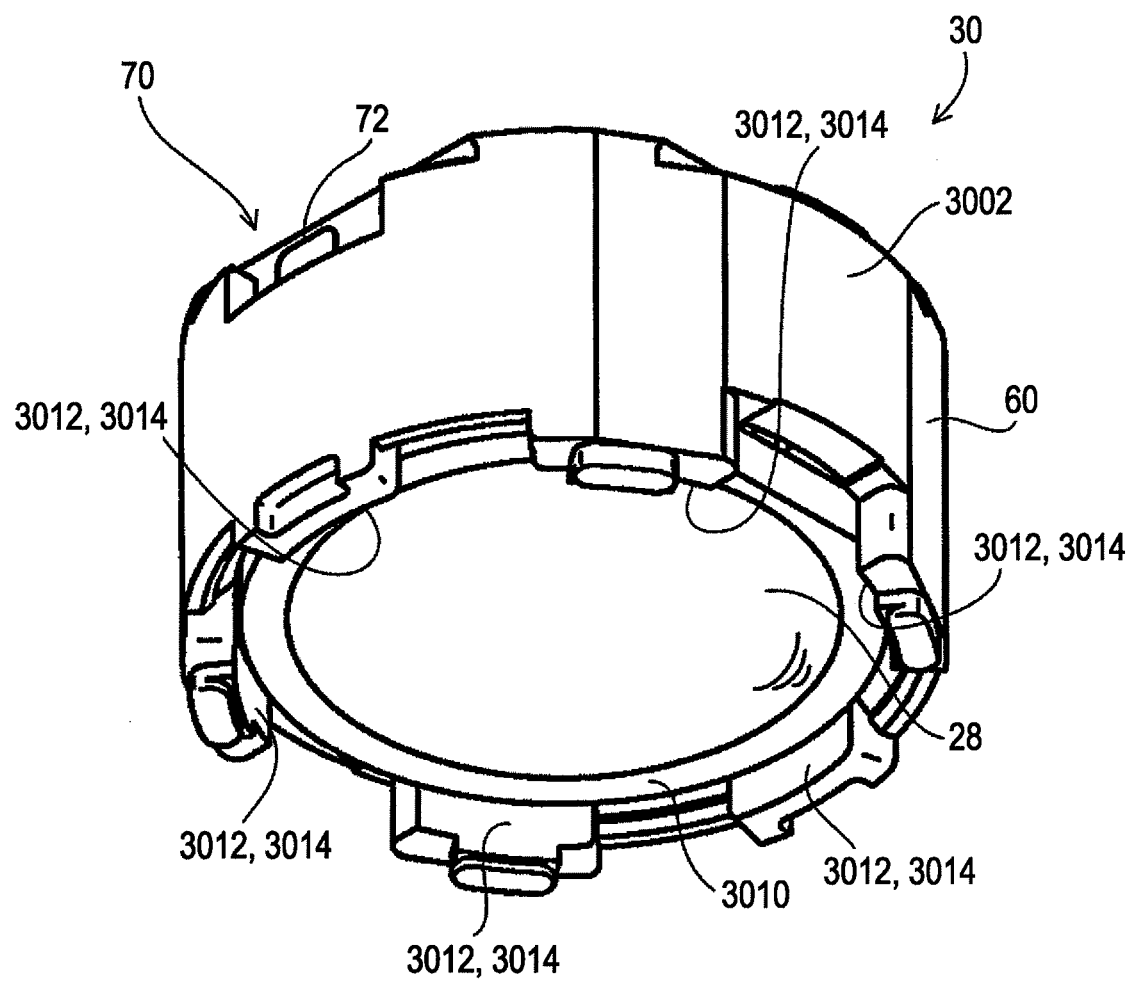
FIG. 21 is a perspective rear view of the lens holding member 30.
Figure 22:
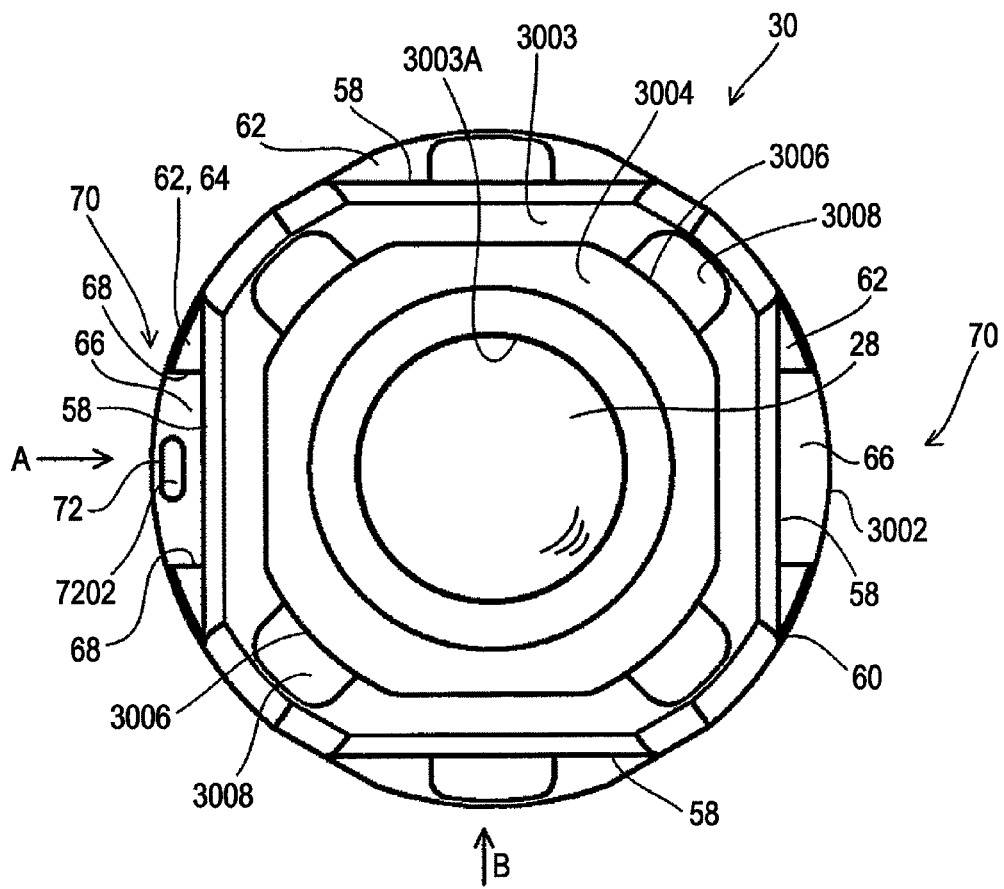
FIG. 22 is a plan view of the lens holding member 30.
Figure 23:
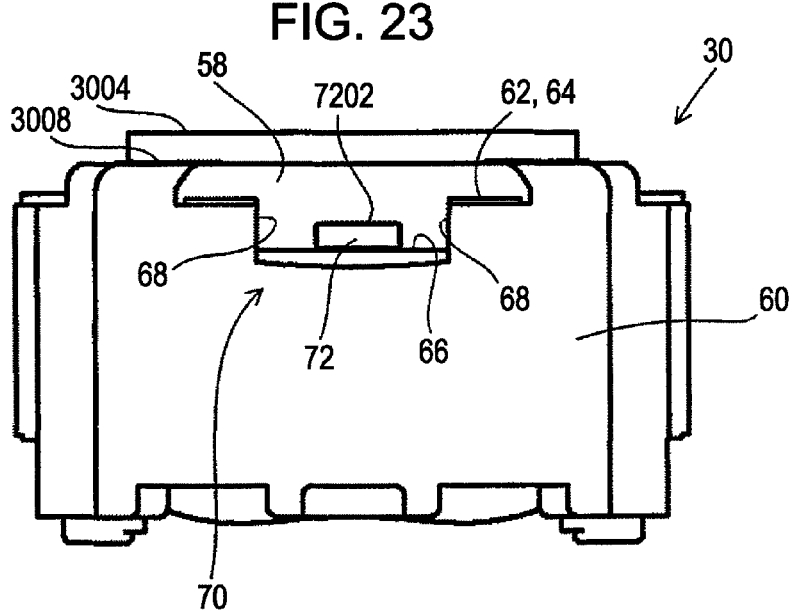
FIG. 23 is a view taken along arrow A in FIG. 22.
Figure 24:
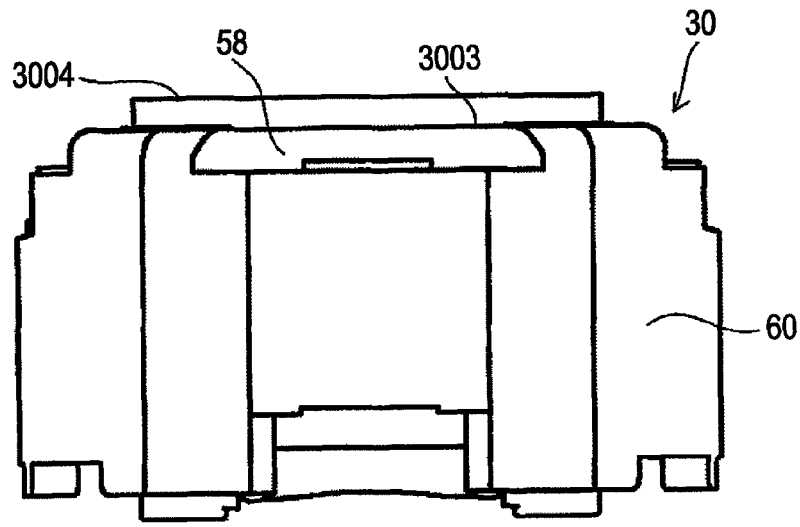
FIG. 24 is a view taken along arrow B in FIG. 22.
Figure 25:
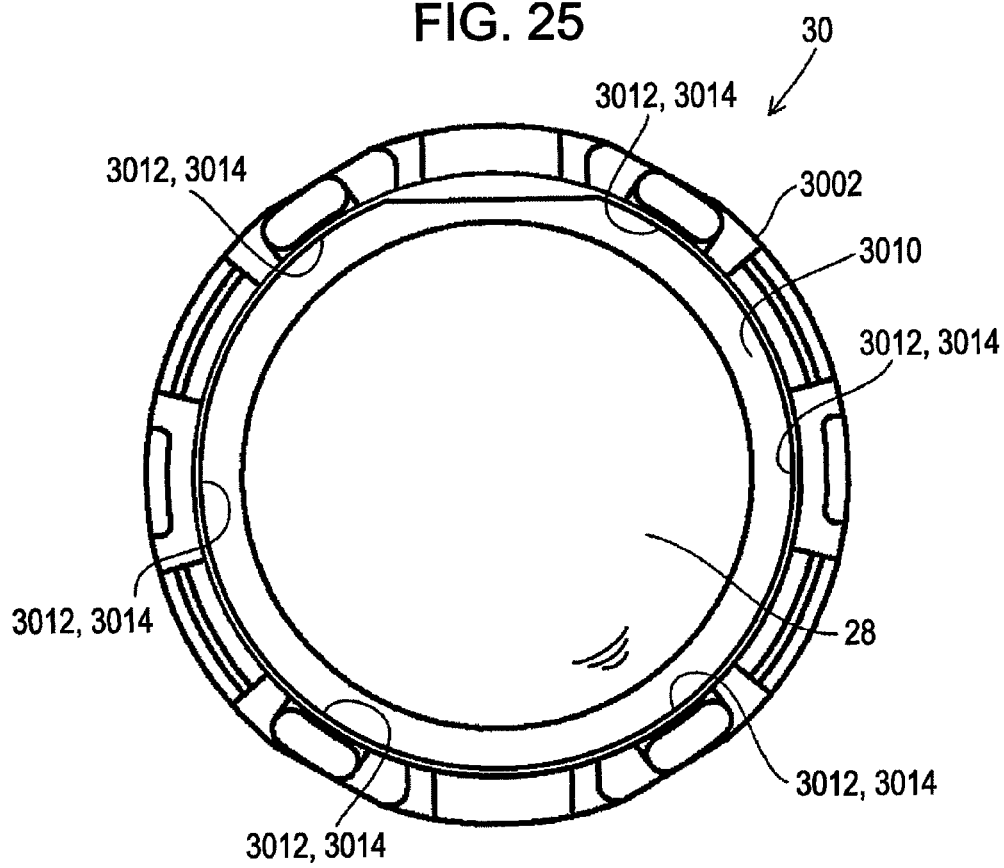
FIG. 25 is a rear view of the lens holding member 30.

FIG. 20 is a perspective front view of the lens holding member 30. FIG. 21 is a perspective rear view of the lens holding member 30. FIG. 22 is a plan view of the lens holding member 30. FIG. 23 is a view taken along arrow A in FIG. 22. FIG. 24 is a view taken along arrow B in FIG. 22. FIG. 25 is a rear view of the lens holding member 30.

Figure 26:
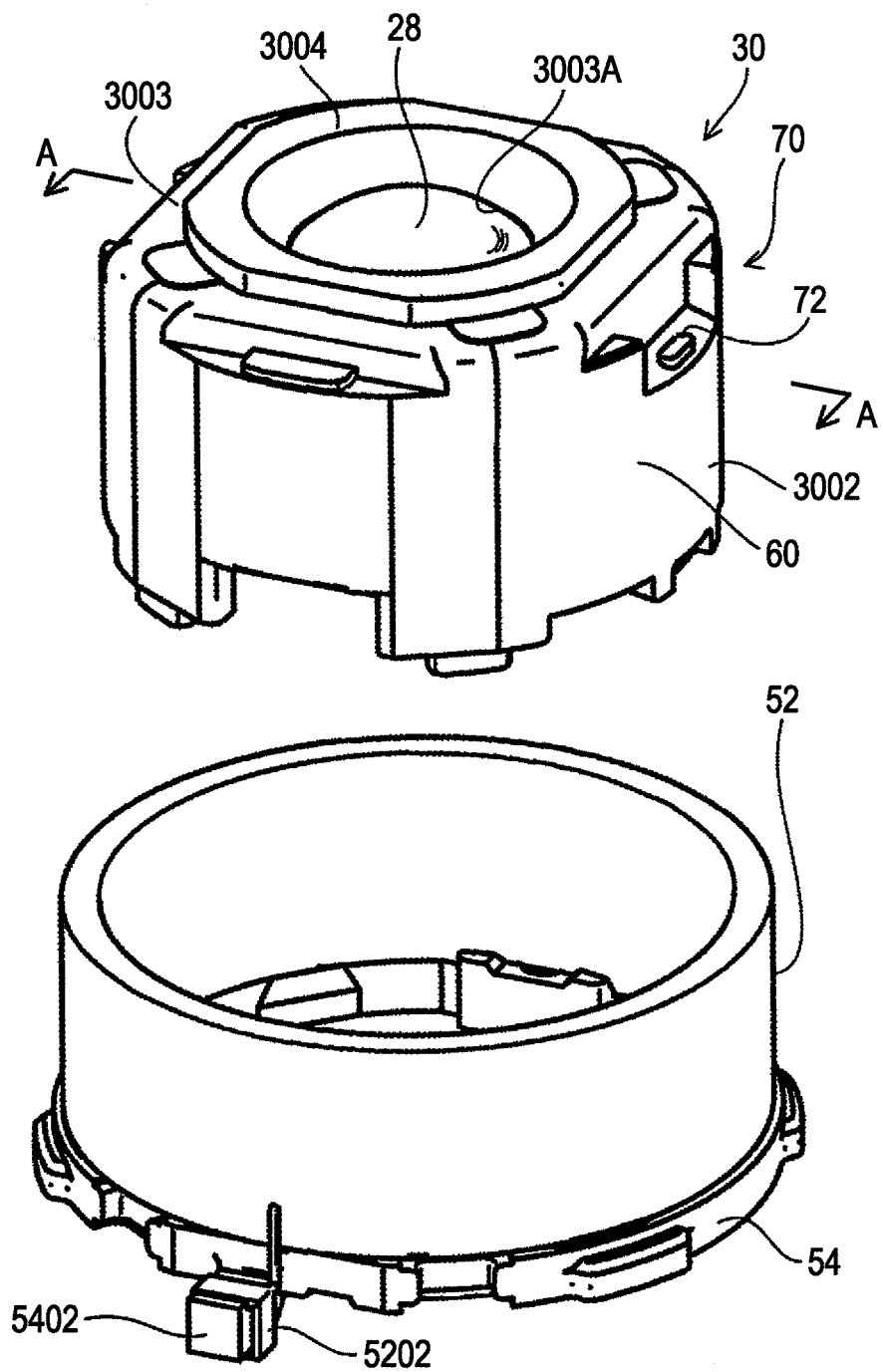
FIG. 26 is an assembly diagram of the lens holding member 30 and the coil 52.
Figure 27:
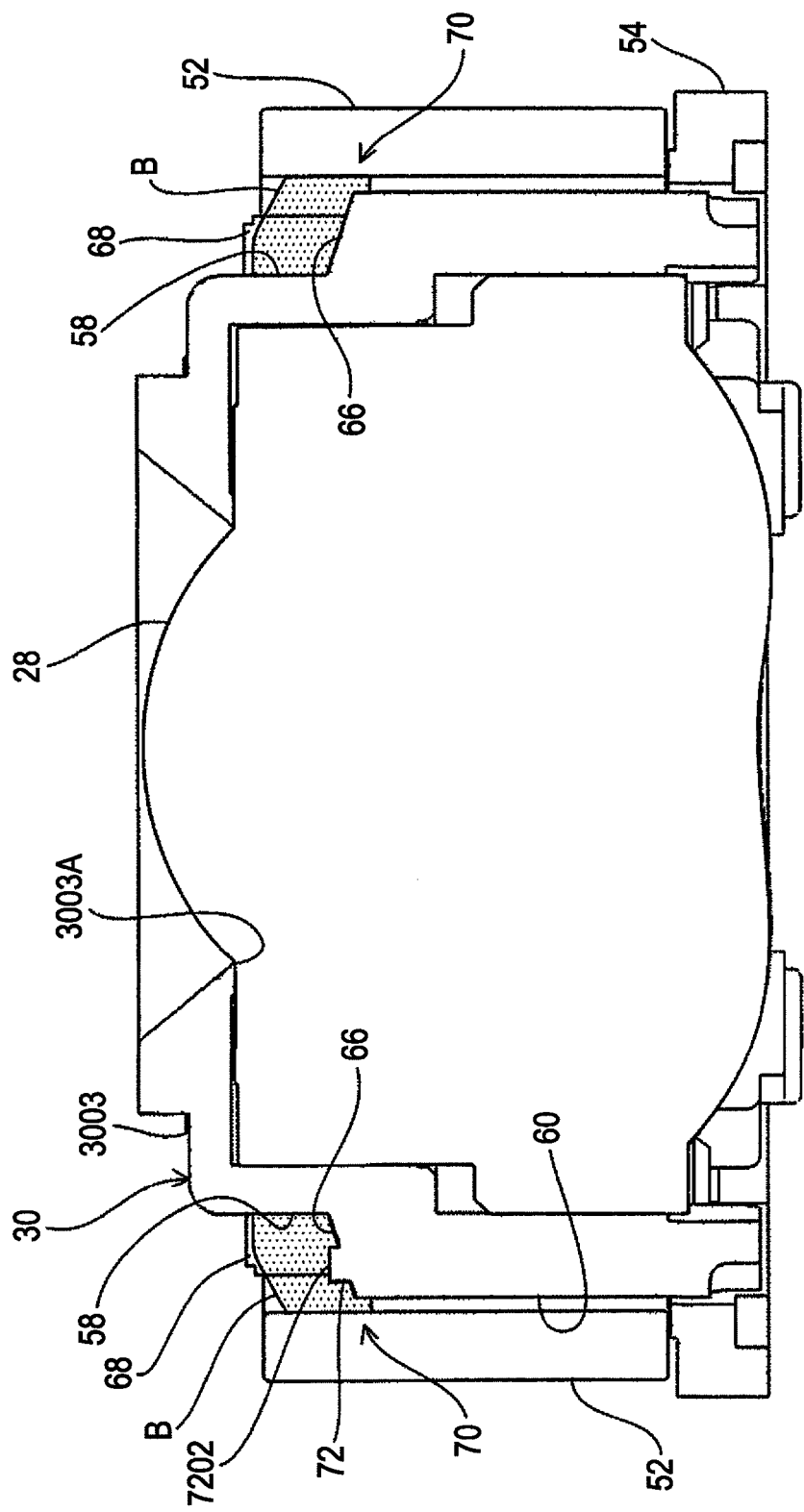
FIG. 27 is a sectional view taken along line AA of the lens holding member 30 assembled in an orientation in FIG. 26.

FIG. 26 is an assembly diagram of the lens holding member 30 and the coil 52. FIG. 27 is a sectional view taken along line AA of the lens holding member 30 assembled in an orientation in FIG. 26.

As shown in FIGS. 5 and 6, the lens holding member 30 holds the image pickup optical system 28, and is accommodated in the accommodation space S.

As shown in FIGS. 20 to 25, the lens holding member 30 has a cylindrical section 3002 and an annular front section 3003 connected to a front portion of the cylindrical section 3002. An opening 3003A is provided in the center of the front section 3003.

The image pickup optical system 28 is formed so as to include a plurality of lens groups, is accommodated in the cylindrical section 3002, and faces forwardly from the opening 3003A.

As shown in FIGS. 20 and 22, a bulging wall section 3004 having an outside diameter than is smaller than the outside diameter of the cylindrical section 3002 is formed at the front section 3003. A circular cylindrical surface 3006 extending along a circumference in which the optical axis of the image pickup optical system 28 is the center is formed at a peripheral surface of the bulging wall section 3004.

Four front-side spring contact surfaces 3008 are formed at an outer periphery of the circular cylindrical surface 3006 so as to be positioned at four locations behind the bulging wall section 3004 and at equal intervals in a peripheral direction. These front-side spring contact surfaces 3008 extend in a plane that is orthogonal to the optical axis.

As shown in FIGS. 21 and 25, an annular back-side spring contact surface 3010 having an outside diameter that is smaller than the outside diameter of the cylindrical section 3002 is formed at a rear end of the cylindrical section 3002.

The back-side spring contact surface 3010 extends in a plane orthogonal to the optical axis and coaxially with the optical axis.

Engagement stopping protruding portions 3012 are provided so as to protrude from six locations at equal intervals in a peripheral direction at rear-end locations of the cylindrical section 3002 at an outer periphery of the back-side spring contact surface 3010. Circular cylindrical surfaces 3014 extending along a circumference in which the optical axis of the image pickup optical system 28 is the center are formed at inner peripheral surfaces of the engagement stopping protruding portions 3012.

As shown in FIGS. 20, 22, 23, and 24, an outer peripheral surface of the cylindrical section 3002 is formed so as to include four outside surfaces 58, positioned at a front end and extending in the shape of a rectangle, and a back-portion circular cylindrical surface 60, extending in the form of a circular cylinder at a remaining portion excluding the front end.

As shown in FIGS. 26 and 27, the coil 52 is mounted to the back-portion circular cylindrical surface 60 as discussed below.

In addition, as shown in FIGS. 20, 22, and 23, forwardly facing crescent-shaped end face sections 62 are provided, respectively, at locations where two of the opposing outside surfaces 58 among the four outside surfaces 58 intersect with the back-portion circular cylindrical surface 60.

Each end face section 62 is formed so as to include surfaces 64, positioned at both ends, and a central surface 66, positioned towards a back-end side than these surfaces 64.

In addition, the central surfaces 66, side surfaces 68 rising from both sides of the central surfaces 66, and the outer surfaces 58 form adhesive filling recessed sections 70 described later.

The lens holding member 30 is formed by filling a product cavity with molten synthetic resin from a mold gate, and a location corresponding to the mold gate during molding remains as a gate section 72 as shown in FIG. 20.

The gate section 72 is positioned at the center of the central surface 66 of one of the end face sections 62 of the two end face sections 62.

In the embodiment, the synthetic resin is polycarbonate, and the synthetic resin includes a filler, such as glass fiber, for providing a hardness required for the lens holding member 30.

The gate section 72 protrudes from the central surface 66, and an end in a protruding direction thereof has a cut location 7202 of the gate section 72. The cut location 7202 is where filler existing at the gate section 72 is generated in powdered form when vibration or shock is applied.

(Front Spring 32, Back Spring 34)

As shown in FIGS. 5 and 6, the front spring 32 and the back spring 34 are disposed in the accommodation space S and constitute a guide mechanism that supports the lens holding member 30 so as to be movable along the optical axis of the image pickup optical system 28.

The front spring 32 is disposed between the front lens barrel 22 and the lens holding member 30, and the back spring 34 is disposed between the rear lens barrel 24 and the lens holding member 30.

As shown in FIG. 3, the front spring 32 and the back spring 34 are formed with annular shapes so as to provide openings 3202 for an optical path of the image pickup optical system 28, respectively, at the center from one-side member which is formed of an electrically conductive material, which is thin, and which has a small width.

More specifically, the front spring 32 has an annular plate section 3204, which has the opening 3202 formed at an inner side, and four supporting portions 3206, connected to an outer periphery of the annular plate section 3204; and is formed so as to be capable of being resiliently deformed in the optical axis direction.

In the front spring 32, outer peripheral portions of the respective supporting portions 3206 are mounted to the four corners of a front portion of the peripheral wall 40 of the front lens barrel 22. The circular cylindrical surface 3006 of the bulging wall section 3004 of the cylindrical section 3002 of the lens holding member 30 shown in FIGS. 20 and 22 is inserted into the opening 3202. The annular plate section 3204 is brought into contact with the four front-side spring contact surfaces 3008 of the lens holding member 30, so that the front spring 32 is disposed between the front lens barrel 22 and the lens holding member 30.

In the embodiment, as shown in FIG. 12, the outer peripheral portions of the four supporting portions 3206 are mounted to the four corners of the front portion of the peripheral wall 40 by insert molding in which they are embedded during molding of the front lens barrel 22.

As shown in FIGS. 3 and 19, the back spring 34 includes two spring segments 34A having the same shape.

Each spring segment 34A has an arcuate section 3404 extending along a semicircle.

The arcuate section 3404 of each spring segment 34A is adhered to the back-side spring contact surface 3010, at an inner side of the circular cylindrical surface 3014 of each engagement stopping protruding portion 3012 of the lens holding member 30 shown in FIGS. 21 and 25. By this, openings 3402 are formed in inner sides of the two arcuate sections 3404.

As shown in FIG. 3, two supporting portions 3406 and 3408 are connected to an outer periphery of each arcuate section 3404, and holes 3410 are formed in the supporting portions 3406 and 3408, respectively.

Therefore, the four holes 3410 of the spring segments 34A are inserted onto respective pins 46 of the rear lens barrel 24. Portions around the holes 3410 of the supporting portions 3406 and 3408 are clamped between the front lens barrel 22 and the rear lens barrel 24, so that the back spring 34 is disposed between the rear lens barrel 24 and the lens holding member 30.

In addition, as shown in FIG. 3, connection portions 3420 are formed, respectively, at intermediate portions of the actuate sections 3404 of the spring segments 34A. Both ends 5202 of the wire of the coil 52 wound upon the two shaft sections 5402 of the coil holder 54 shown in FIG. 13 are soldered to the connection portions 3420.

Further, end portions of the supporting portions 3408 of each spring segment 34A are external connection terminals 3430 extending outwardly of the coil 52. Therefore, the coil 52 is electrically connected to the external connection terminals 3430 through each spring segment 34A.

As shown in FIGS. 11 and 19, each external connection terminal 3430 is clamped between the two front-side protruding portions 4020 of the front lens barrel 22 and the two back-side protruding portions 4220 of the rear lens barrel 24. A front portion of each external connection terminal 3430 is exposed outward from an end of the front-side protruding portion 4020 and the back-side protruding portion 4220.

Therefore, when a drive signal is supplied to the wire of the coil 52 through the two external connection terminals 3430 of the back spring 34, a magnetic field is generated from the coil 52.

In addition, by an interaction between the magnetic field generated by the coil 52 and a magnetic field generated from magnetic poles of the magnet 48, a force (thrust) in the optical axis direction is generated at the coil 52. This causes the image pickup optical system 28 and the lens holding member 30, held by the front spring 32 and the back spring 34, to move in the optical axis direction, so that the image pickup optical system 28 focuses an object image that is formed at an image pickup surface of the image pickup element 36.

Therefore, the magnet 48 and the coil 52 constitute the driving section 38 that moves the lens holding member 30 along the optical axis of the image pickup optical system 28.

(Assembly of Lens Holding Member 30 and Coil 52)

Next, the assembly of the lens holding member 30 and the coil 52 will be described.

As shown in FIGS. 26 and 27, a front end of the coil 52 faces a back end of the lens holder 30, and the coil 52 is mounted to a back-portion circular cylindrical surface 60 of the lens holder 30.

By mounting the coil 52 to the back-portion circular cylindrical surface 60, as shown in FIG. 27, the central surfaces 66, the side surfaces 68 rising from both sides of the central surfaces 66, the outside surfaces 58, and an inner peripheral surface of the coil 52 constitute the adhesive filling recessed sections 70 that open in a direction parallel to the optical axis of the image pickup optical system 28.

In the embodiment, the adhesive filling recessed sections 70 are formed at two locations at equal intervals in a peripheral direction.

In addition, the central surface 66 of each adhesive filling recessed section 70 is a bottom surface of the corresponding adhesive filling recessed section 70 facing the direction parallel to the optical axis of the image pickup optical system 28.

Further, the gate section 72 is positioned at the central surface 66 of one of the adhesive filling recessed sections 70.

If the coil 52 is mounted to the back-portion circular cylindrical surface 60 of the lens holder 30, the lens holder 30 and the coil 52 are positioned using an adjustment jig in the optical axis direction of the image pickup optical system 28 or in a plane orthogonal to the optical axis.

Next, an outer peripheral portion of the lens holding member 30 and an inner peripheral portion of the coil 52 are adhered to each other by filling each adhesive filling recessed section 74 with an adhesive B.

During this time, the gate section 72 is embedded in the adhesive B using the adhesive B at one of the adhesive filling recessed sections 74.

By hardening the adhesive, the mounting of the coil 52 to the lens holding member 30 is completed.

Next, the back spring 24 is mounted to the lens holding member 30, so that a second unit U2 (see FIG. 19), in which the lens holding member 30, the back spring 24, the coil 52, and the coil holder 54 are mounted, is formed.

Next, a method of assembling the camera module 20 will be described.

As shown in FIG. 19, a first unit U1, in which the front spring 32, the magnet 48, and the yoke 50 are incorporated in the front lens barrel 22, the second unit U2 having the above-described structure, and the rear lens barrel 24 are provided.

Then, the second unit U2 is mounted to the rear lens barrel 24. More specifically, the pins 46 of the rear lens barrel 24 are inserted into the holes 3410 of the back spring 34, to put together the second unit U2 and the rear lens barrel 24.

Next, the first unit U1 is mounted to the mounted structure. More specifically, the circular cylindrical surface 3006 of the bulging wall section 3004 at the cylindrical section 3002 of the lens holding member 30 is inserted into the opening 3202 of the front spring 32, and the annular plate section 3204 is brought into contact with the front-side spring contact surfaces 3008 of the lens holding member 30, so that the first unit U1 and the second unit U2 are put together.

Finally, the cover 26 is placed over the first unit U1, and the engagement grooves 2608 thereof are made to engage the engagement protrusions 57. More specifically, the cover 26 is placed over the first unit U1, and the front lens barrel 22 is clamped between the top surface section 2602 of the cover 26 and the bottom wall 42 of the rear lens barrel 24.

By this, the first unit U1, the second unit U2, and the rear lens barrel 24 are connected to each other, so that the camera module 20 is completed.

According to such a structure, the gate section 72, which remains at the lens holding member 30, is positioned at a location of the bottom surface of the adhesive filling recessed section 70. Therefore, using the adhesive B filling the adhesive filling recessed section 70, the lens holding member 60 and the coil 52 are adhered to each other and the gate section 72 is embedded in the adhesive B.

Therefore, even if vibration or shock is applied to the lens holding member 30 when, for example, the electronic apparatus 10 incorporating the camera module 20 is dropped, it is possible to reliably prevent dust in the form of powdered filler to fall from the cut location 7202 of the gate section 72. Therefore, the dust does not adhere to, for example, the image pickup surface of the image pickup element 36 or a lens of the image pickup optical system 38, thereby making the present invention advantageous in terms of improving quality of picked up image data.

In addition, since a special processing step for preventing generation of dust from the gate section by, for example, applying an adhesive so as to cover the cut location of the gate section or by melting the cut location with a heater can be omitted, the present invention is advantageous in terms of reducing manufacturing costs.

Next a heat-dissipation structure will be described.

The image pickup element 36 comprises, for example, a CCD or a C-MOS sensor, and generates heat while performing an image pickup operation.

When the temperature of the image pickup element 36 exceeds a predetermined temperature, the operation of the image pickup element 36 is not stably performed, or a noise component of an image pickup signal generated at the image pickup element 36 is increased, thereby making it necessary to effectively prevent a rise in temperature of the image pickup element 36.

To achieve this, in the present invention, heat generated from the image pickup element 36 is dissipated by making use of the yoke 50.

Figure 28:
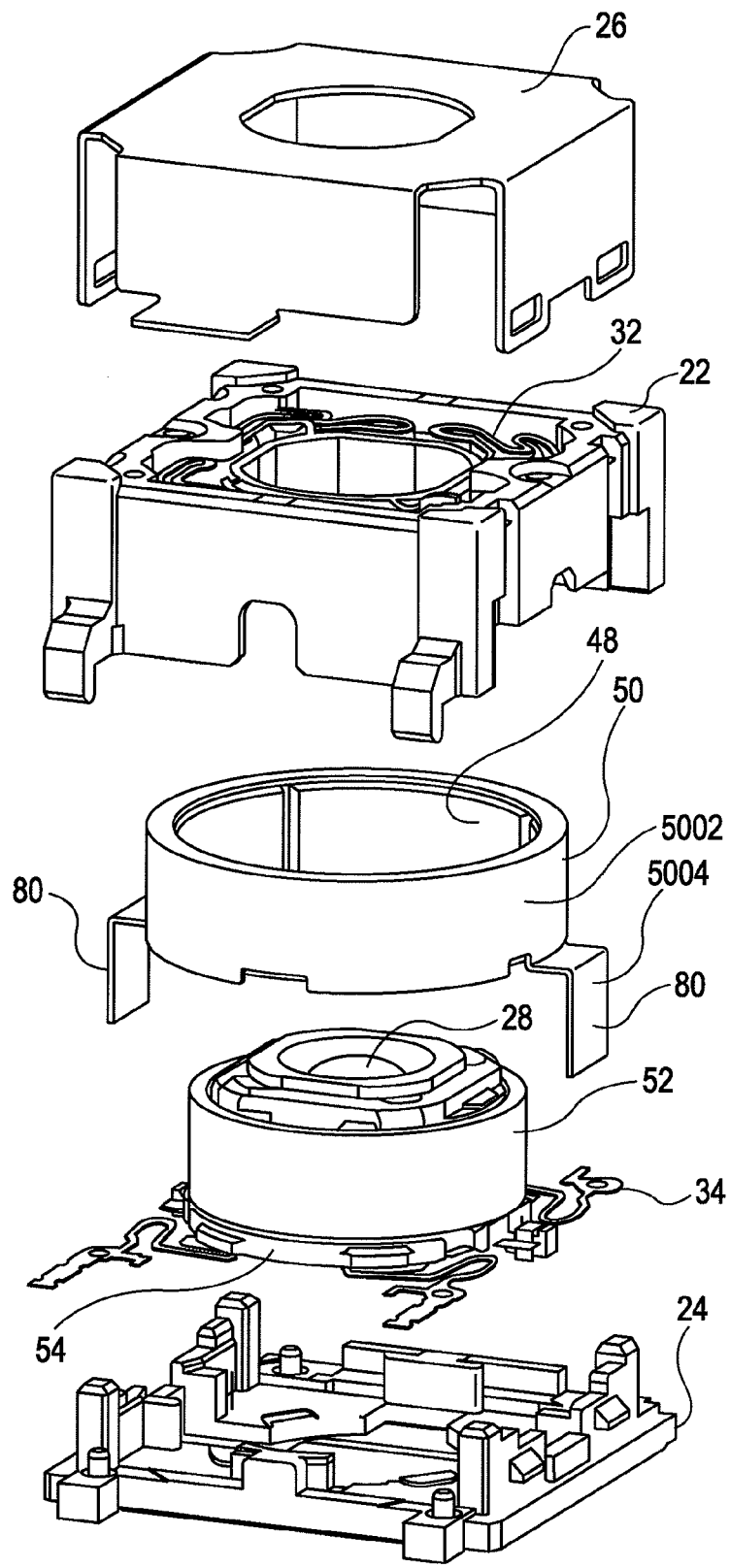
FIG. 28 is an exploded perspective view of the camera module 20 for illustrating a heat-dissipation structure.
Figure 30:
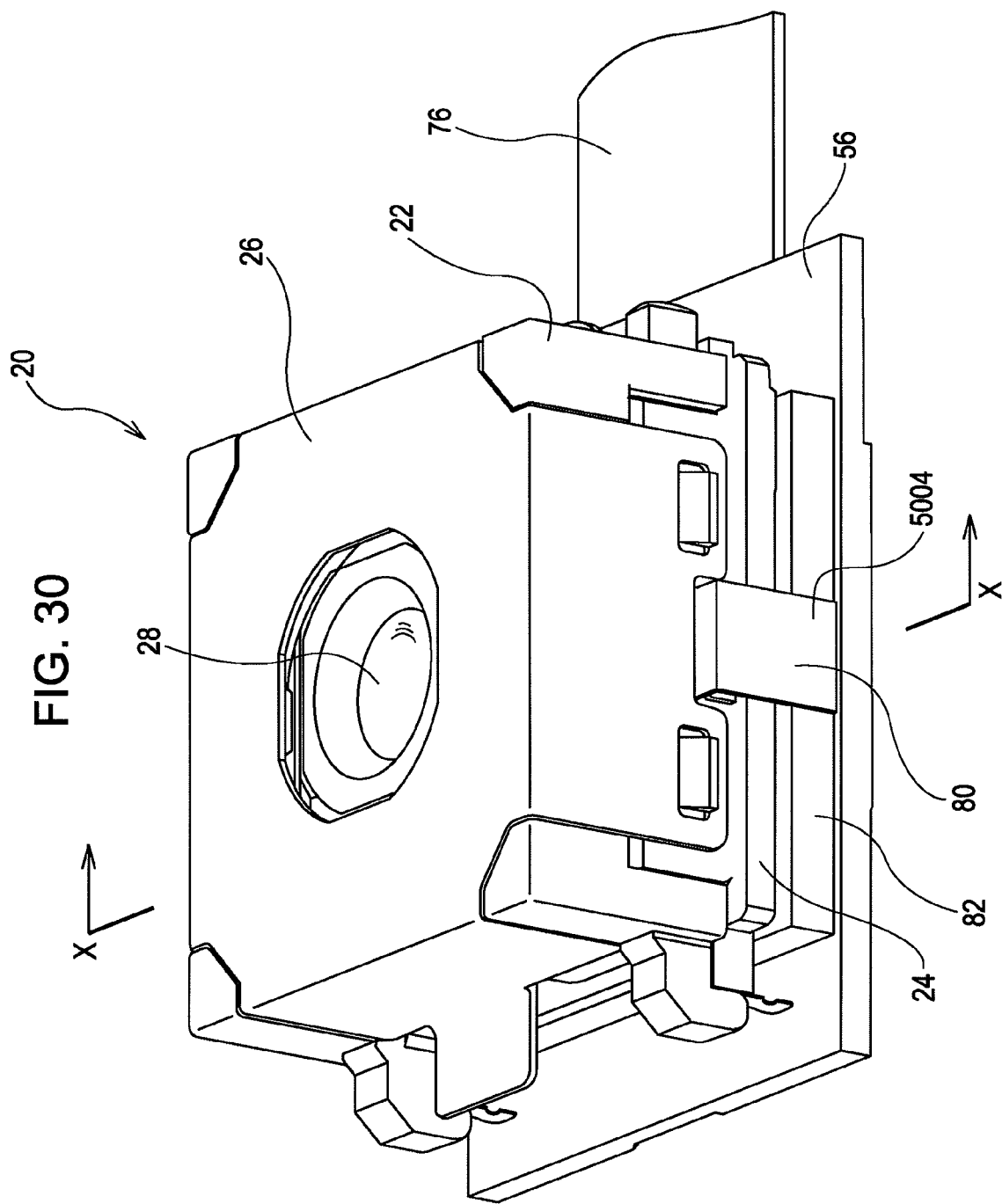
FIG. 30 is a perspective view of the camera module 20.
Figure 31:
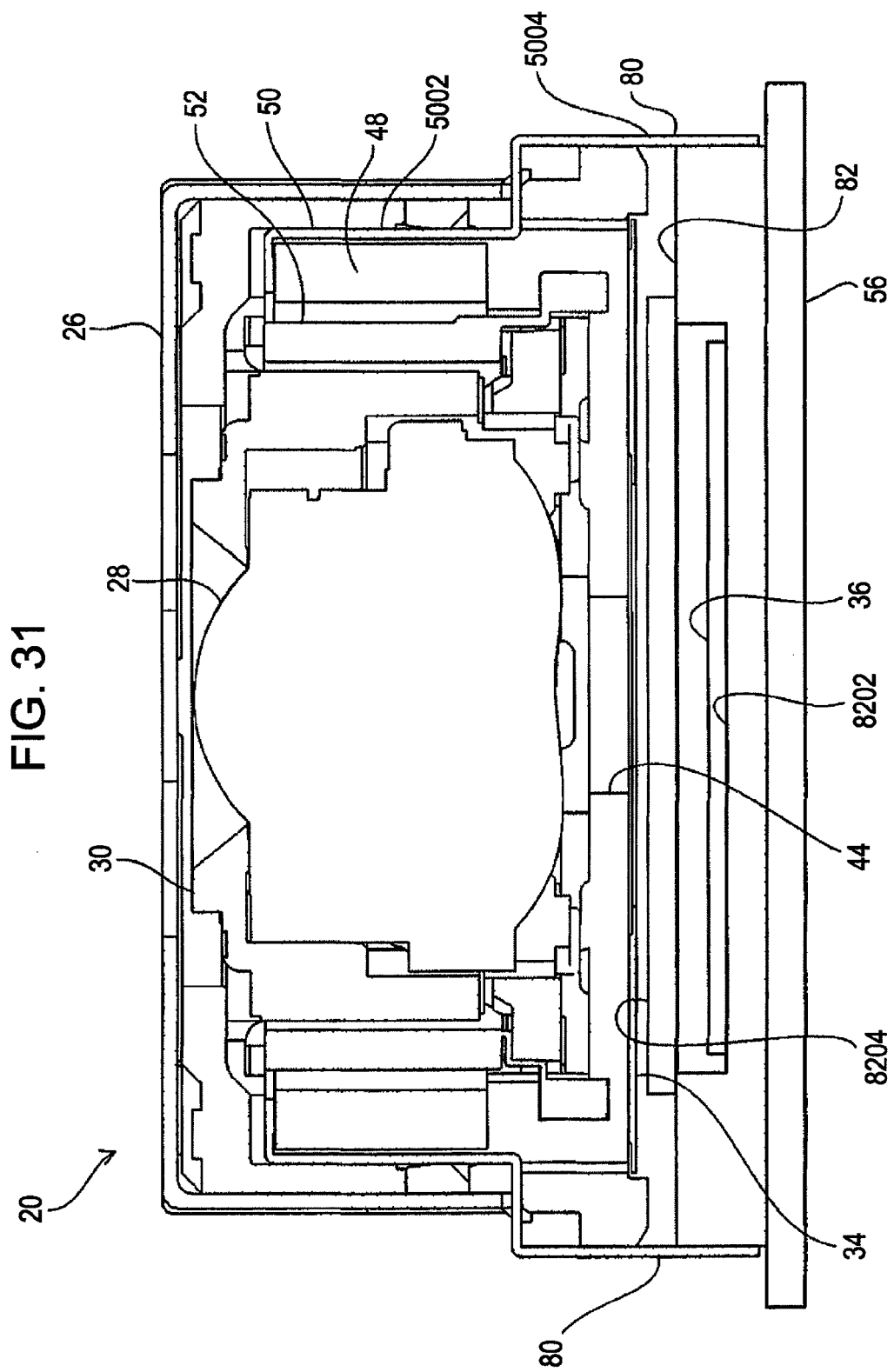
FIG. 31 is a sectional view taken along line XX in FIG. 30.

FIG. 28 is an exploded perspective view of the camera module 20 for illustrating the heat-dissipation structure. FIG. 29 is a view illustrating mounting of the camera module 20 to the image pickup element 36. FIG. 30 is a perspective view of the camera module 20. FIG. 31 is a sectional view taken along line XX in FIG. 30.

As shown in FIG. 31, the camera module 20 includes the lens holding member 30, which holds the image pickup optical element 28, the image pickup element 36, which picks up an object image guided by the image pickup optical system 28, and the driving section 38, which moves the lens holding member 30 along the optical axis of the image pickup optical system 28.

The driving section 38 includes the coil 52, mounted to an outer periphery of the lens holding member 30, the magnet 48, facing the outer periphery of the coil 52, and the yoke 50, mounted to an outer periphery of the magnet 48.

The yoke 50 is formed of a magnetic material. As such a magnetic material, various related magnetic materials that are publicly known, such as silicon steel, soft iron, permalloy, and stainless, may be used.

In addition, the image pickup element 36 and the yoke 50 are connected to each other, and a relay member 80 that transmits heat generated at the image pickup element 36 to the yoke 50 is provided.

As shown in FIGS. 28 to 31, the relay member 80 is integrally formed with, for example, the yoke 50.

In the embodiment, the yoke 50 includes a circular cylindrical body 5002, mounted to the outer periphery of the magnet 48, and two leg portions 5004, extending in an axial direction of the body 5002 from two locations that are spaced apart from each other in a peripheral direction at end portions in the axial direction of the body 5002. The relay member 80 comprises the two leg portions 5004.

As shown in FIGS. 29 and 31, the image pickup element 36 is sealed in a package 82.

More specifically, the package 82 has a front surface, facing the image pickup optical system 28, and a back surface, disposed at a side opposite thereto.

A rectangular accommodation recessed section 8202 opening at a front side is formed in the front surface of the package 82.

The image pickup element 36 is mounted to a bottom surface of the accommodation recessed section 8202, an opening of the accommodation recessed section 8202 is covered with a seal glass 8204 serving as an optical filter, and the seal glass 8204 seals the front surface of the package 82.

The back surface of the package 82 is mounted to the front surface of the substrate 56, and the substrate 56 is connected to, for example, a signal processing circuit (not shown) through a flexible substrate 76.

The relay member 80 is connected to the yoke 50, and is coupled to the package 82.

Therefore, the relay member 80 is connected to the image pickup element 36 with the package 82 being interposed therebetween.

According to such a structure, heat generated by the image pickup element 36 is transmitted to the yoke 50 through the relay member 80, and is dissipated at the yoke 50.

Therefore, it is possible to effectively dissipate the heat generated by the image pickup element 36 without providing a dedicated heat-dissipating member, such as a heat sink, as it used to be provided. Therefore, the present invention is advantageous in terms of improving the quality of an image pickup signal generated by the image pickup element 36, and stabilizing the operation of the image pickup element 36 while reducing costs and size of the camera module 20.

In addition, since the yoke 50 extends in a peripheral direction at an outer side in a radial direction of the lens holding section 30, it is a member having the largest surface area and the largest volume among the members making up the camera module 20. Therefore, the present invention is advantageous in terms of obtaining sufficient heat-dissipation effect by the yoke 50.

Next, a modification of the heat-dissipation structure will be described.

Figure 32:
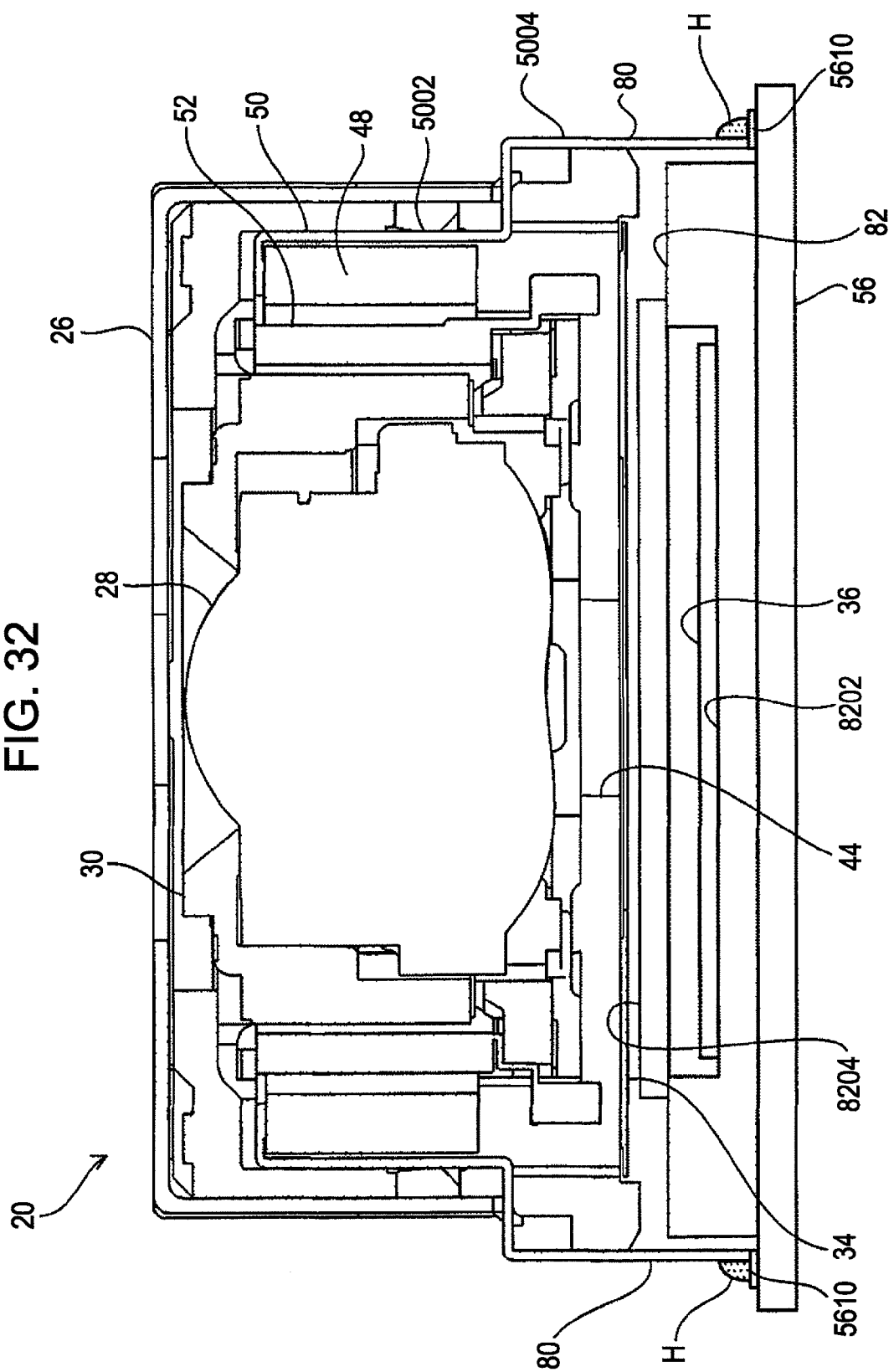
FIG. 32 is a sectional view of the camera module 20 for illustrating a modification of the heat-dissipation structure.

FIG. 32 is a sectional view of the camera module 20 for illustrating a modification of the heat-dissipation structure.

As shown in FIG. 32, the image pickup element 36 is sealed at the package 82, and the package 82 is mounted onto the substrate 56.

The relay member 80 is connected to the yoke 50, and is coupled to the substrate 56.

More specifically, a soldering pad 5610 is formed at a location where the front surface of the substrate 56 to which the package 82 is mounted faces the relay member 80. The relay member 80 and the soldering pad 5610 are coupled to each other by soldering using solder H.

Furthermore, since the seal glass 8204, positioned at the front surface of the package 82, and the soldering pad 5610, provided at the front surface of the substrate 56, are separated from each other in a thickness direction of the substrate 56, foreign matter, such as solder balls, generated when soldering the relay member 80 and the soldering pad 5610 to each other, is prevented from being adhered to the seal glass 8204.

Therefore, the relay member 80 is connected to the image pickup element 36 with the substrate 56 and the package 82 being interposed therebetween.

According to such a structure, heat generated by the image pickup element 36 is transmitted to the substrate 56 from the package 82, is further transmitted from the substrate 56 to the yoke 50 through the relay member 80, and is dissipated at the yoke 50.

Therefore, even in such a modification, the advantages that are the same as those of the previously described heat-dissipation structure are provided.

Although the case in which the image pickup element 36 is sealed in the package 82 is described, the image pickup element 36 may be mounted to the substrate 56.

In this case, the relay member 80 is connected to the yoke 50, and is coupled to the substrate 56. The relay member 80 and the substrate 56 may be coupled to each other by, for example, soldering.

That is, the relay member 80 is connected to the image pickup element 36 with the substrate 56 being interposed therebetween.

In such a structure, heat generated by the image pickup element 36 is transmitted from the substrate 56 to the yoke 50 through the relay member 80, and is dissipated at the yoke 50.

Therefore, the advantages that are the same as those of the previously described heat-dissipation structures are provided.

Next, the gist of the present invention will be described.

As shown in FIGS. 33 and 34, the gist of the present invention is that a shutter section 84, which is mounted to a front surface 2202 of the front lens barrel 22, is included.

In addition, the shutter section 84 has one or a plurality of shutter blades (not shown) that open and close the optical path of the image pickup optical system 28, an actuator (not shown) that drives the shutter blade or shutter blades, and a case 86 that accommodates the shutter blade or shutter blades and the actuator and that has an opening 8610 for the optical path.

Further, the shutter section 84 is mounted to the front surface 2202 of the front lens barrel 22 by stopping cover-side engagement stopping sections 88 of the cover 26 and case-side engagement stopping sections 90 of a case 86 by engaging them with each other.

This will be described in more detail.

Figure 35:
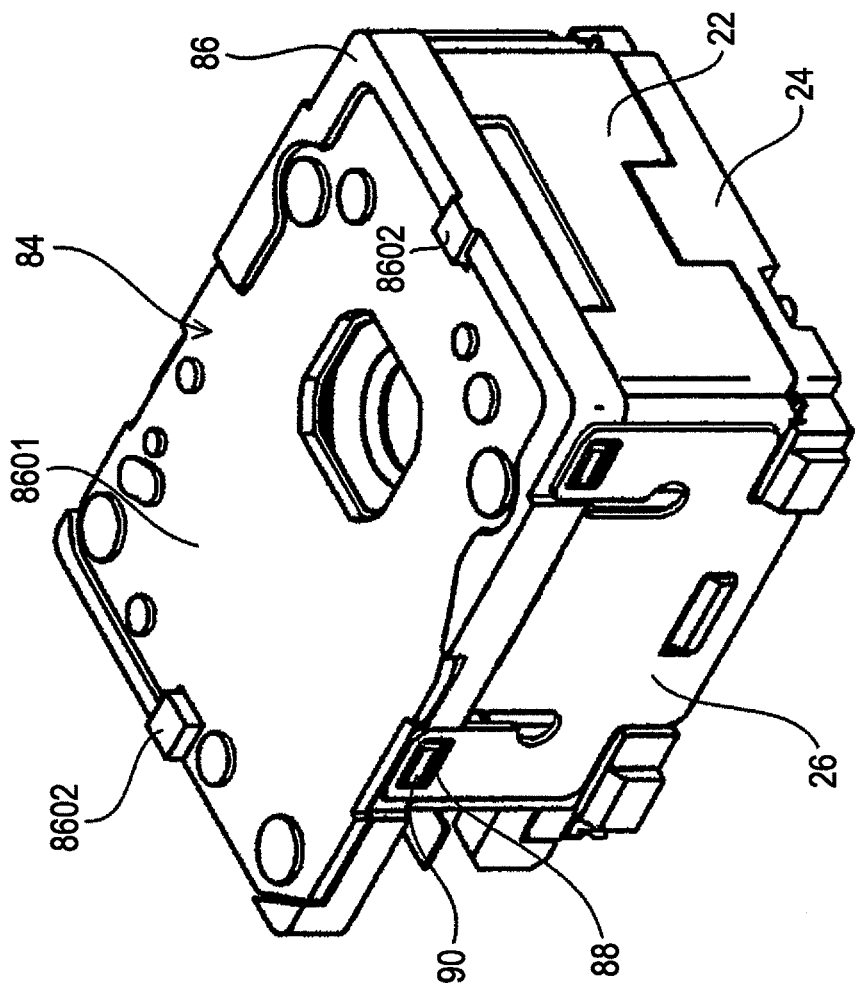
FIG. 35 is a perspective view showing a state in which the shutter section 84 is mounted to the front lens barrel 22.
Figure 36:
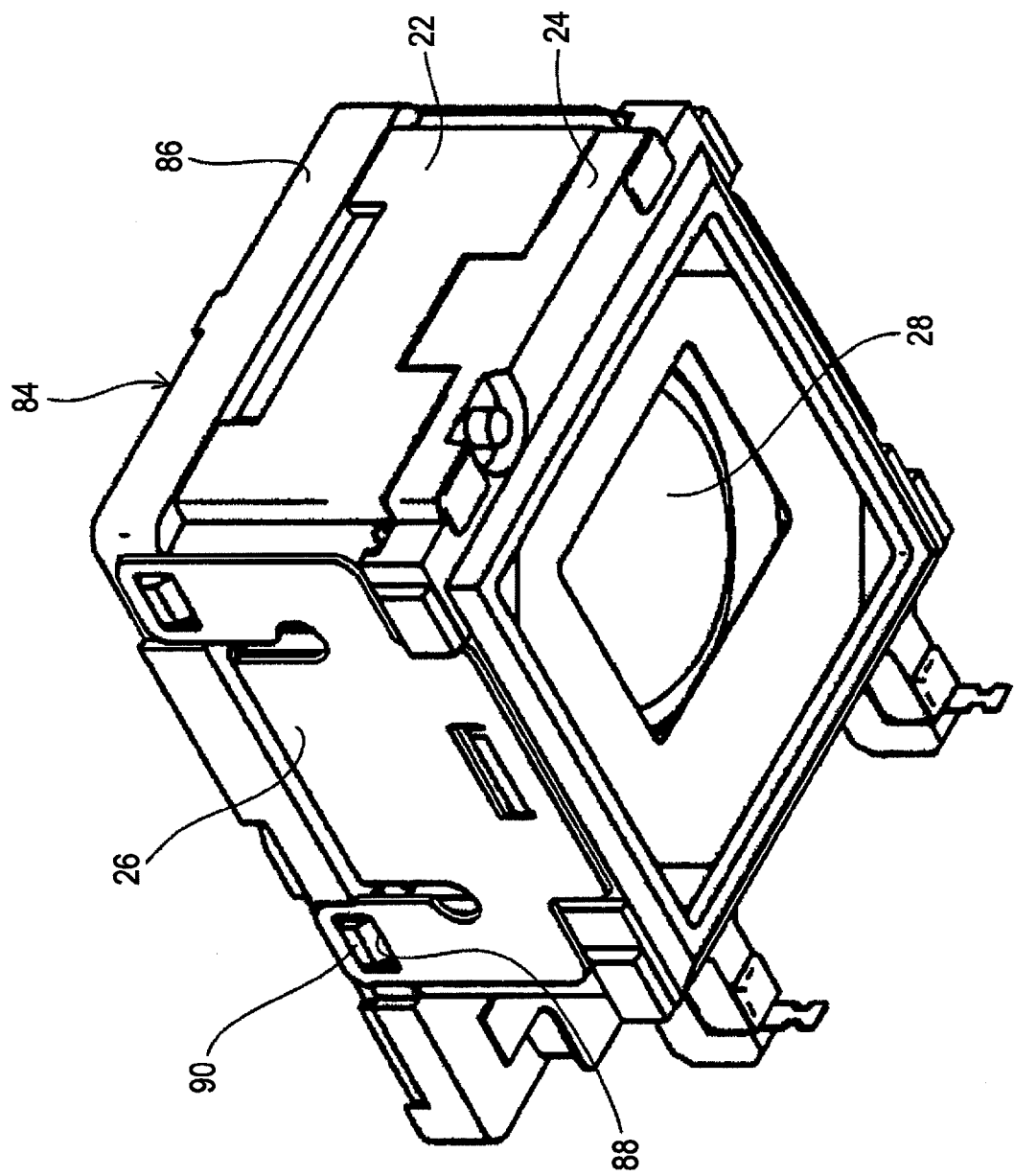
FIG. 36 is a perspective view showing the state in which the shutter section 84 is mounted to the front lens barrel 22.

FIGS. 33 and 34 are exploded perspective views illustrating the mounting of the shutter section 84 to the front lens barrel 22. FIGS. 35 and 36 are perspective views showing a state in which the shutter section 84 is mounted to the front lens barrel 22.

Figure 38:
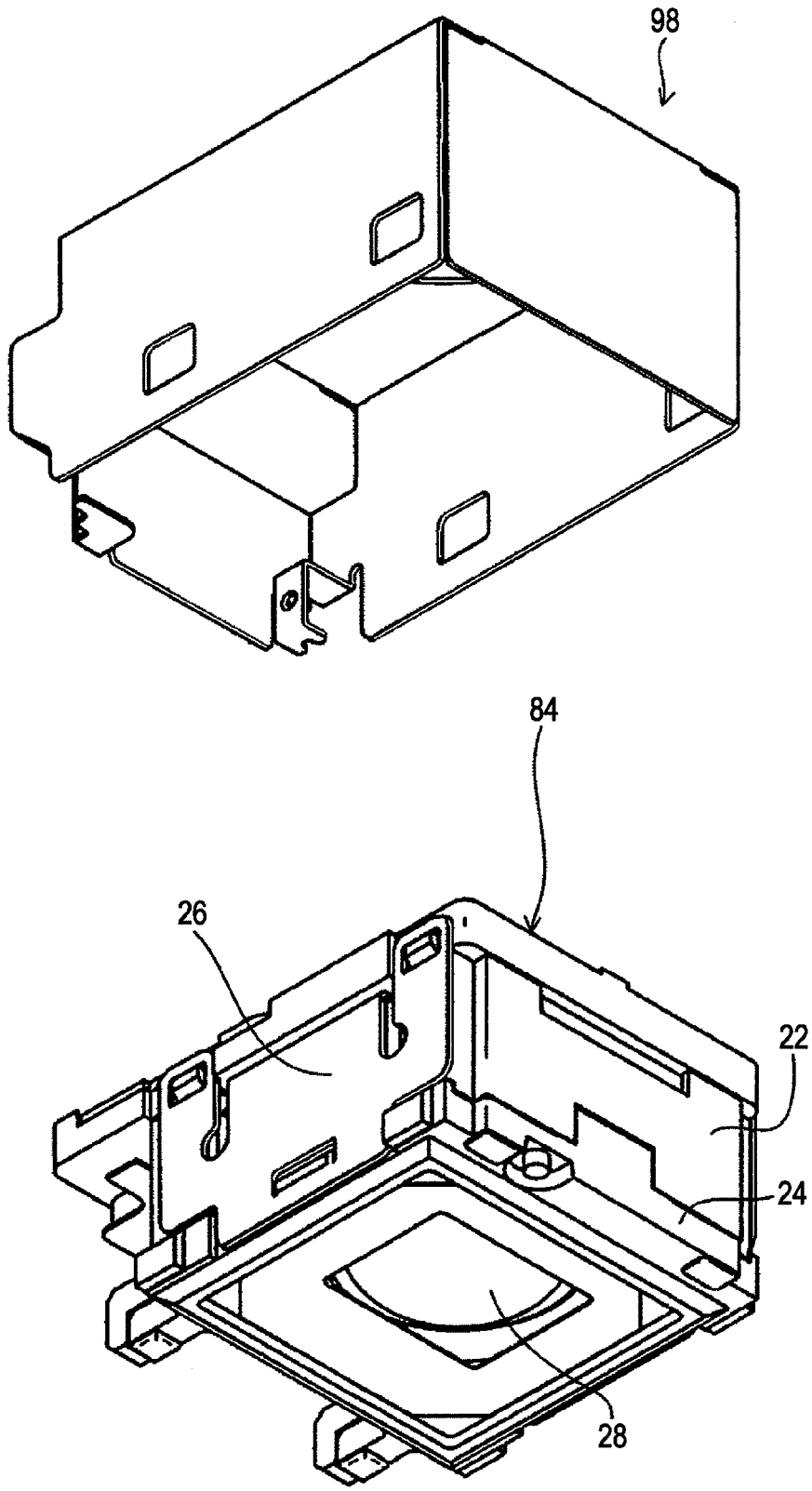
FIG. 38 is an exploded perspective view illustrating the mounting of the shield case 98 to the front lens barrel 22.
Figure 39:
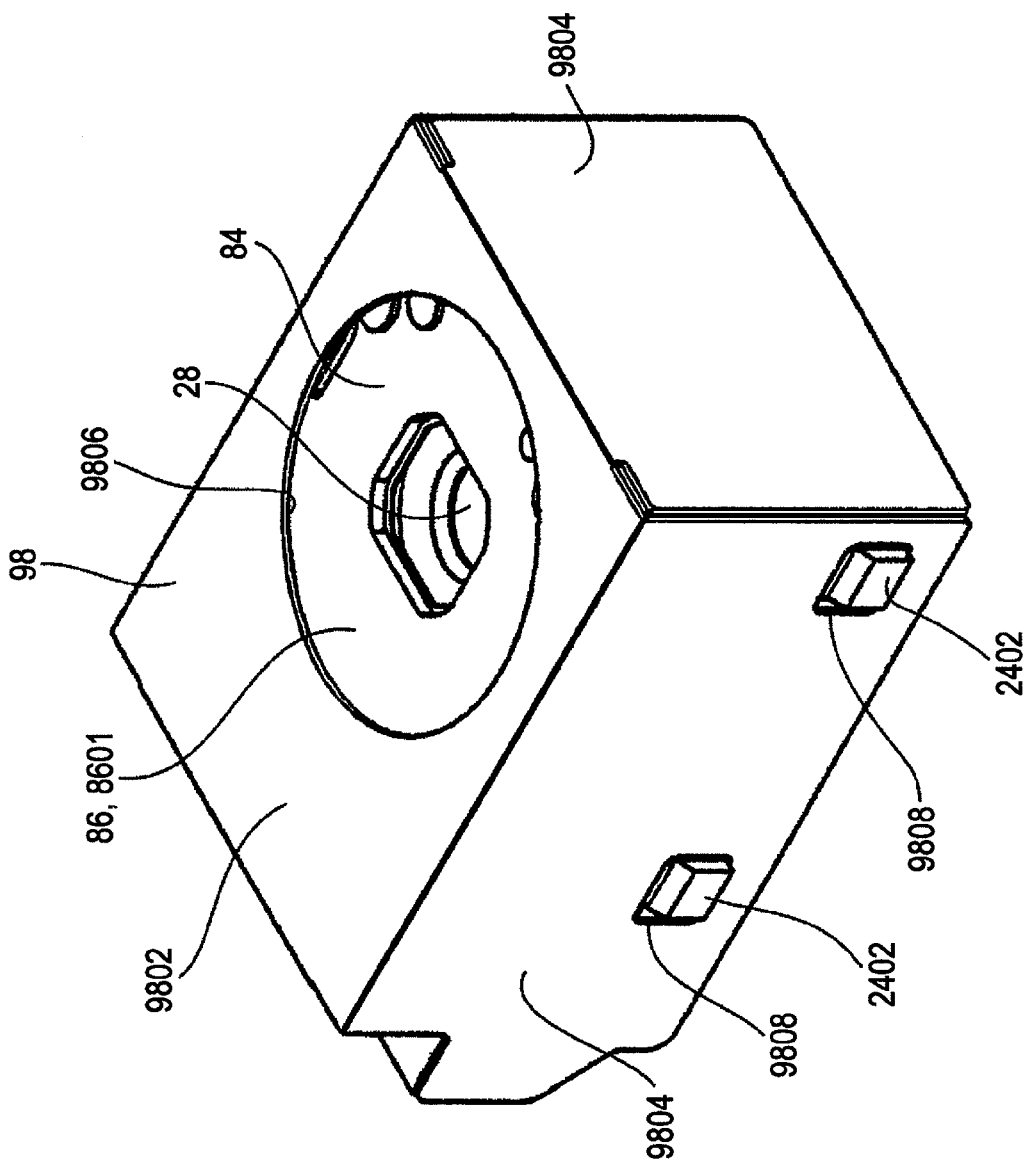
FIG. 39 is a perspective view showing a state in which the shield case 98 is mounted to the front lens barrel 22.

FIGS. 37 and 38 are exploded perspective views illustrating mounting of a shield case 98 to the front lens barrel 22. FIG. 39 is a perspective view showing a state in which the shield case 98 is mounted to the front lens barrel 22.

Figure 40:
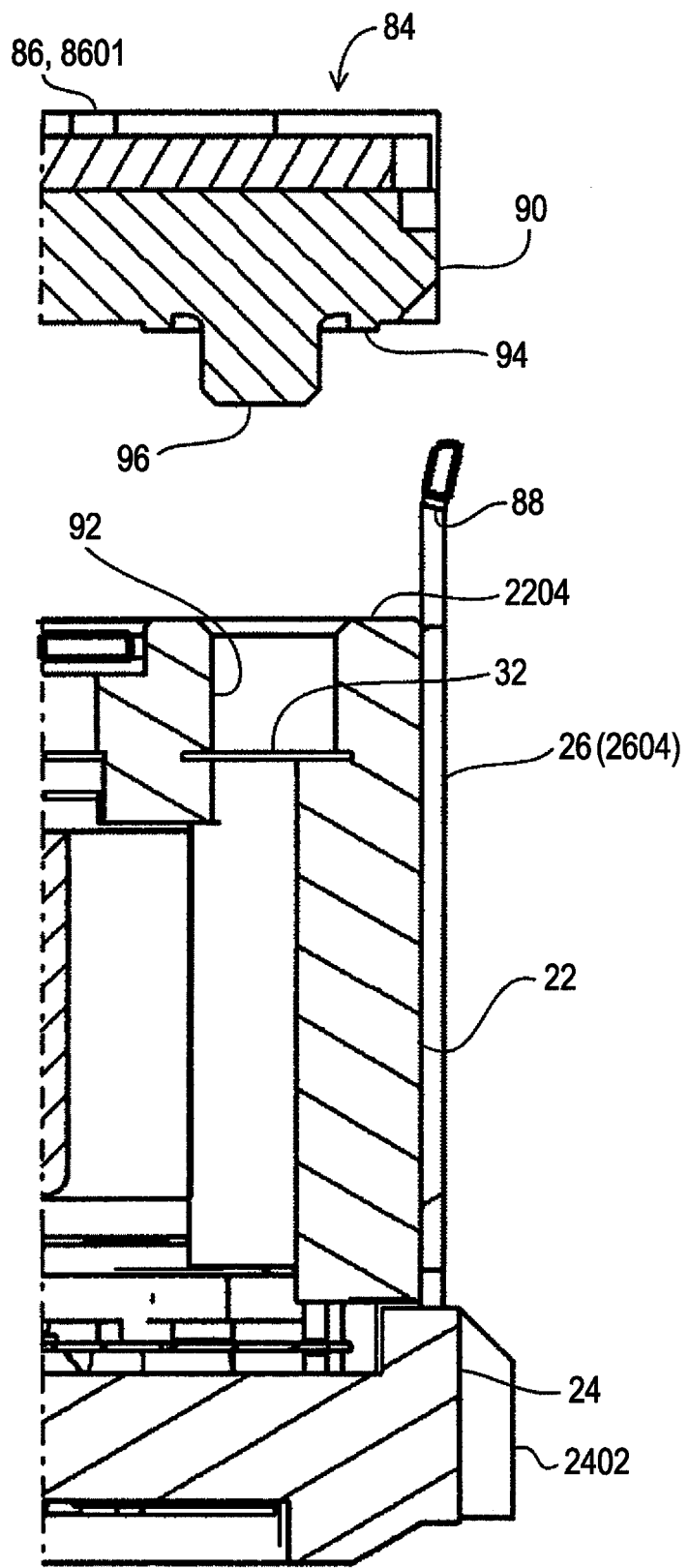
FIG. 40 is a sectional view illustrating the mounting of the shutter section 84 to the front lens barrel 22.
Figure 41:
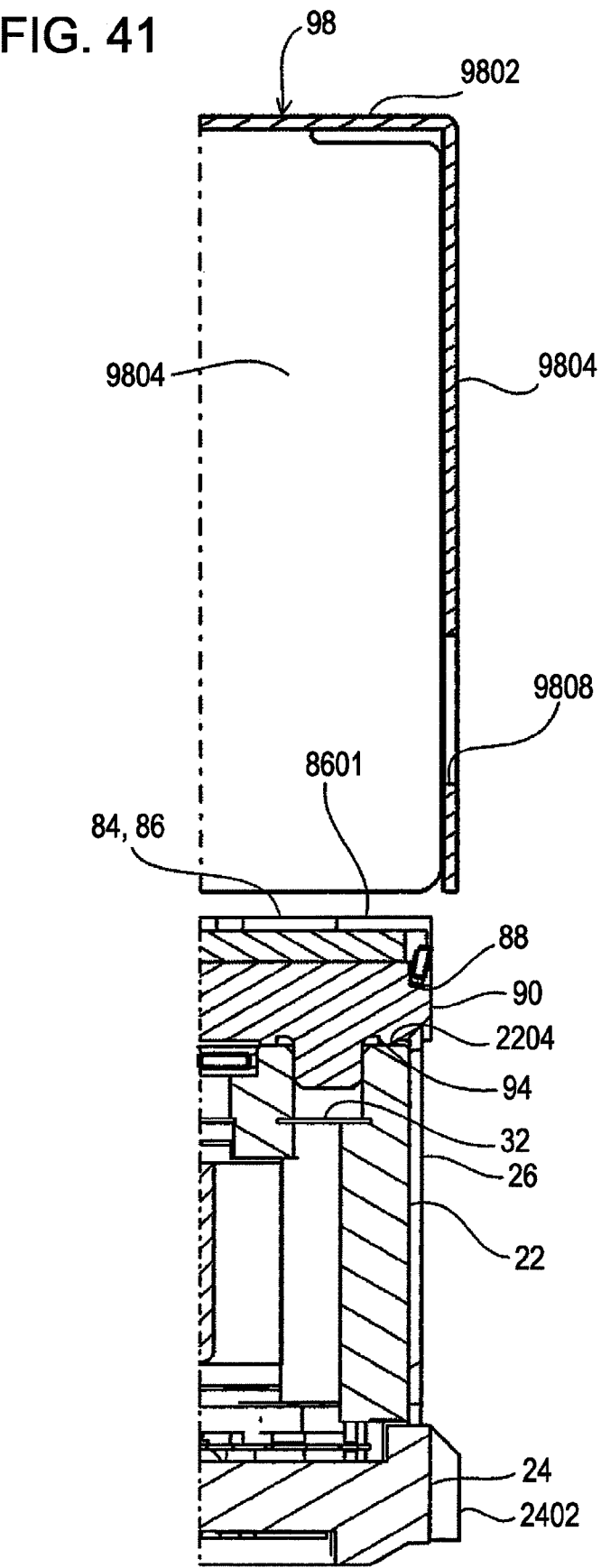
FIG. 41 is a sectional view illustrating the mounting of the shield case 98 to the front lens barrel 22.
Figure 42:
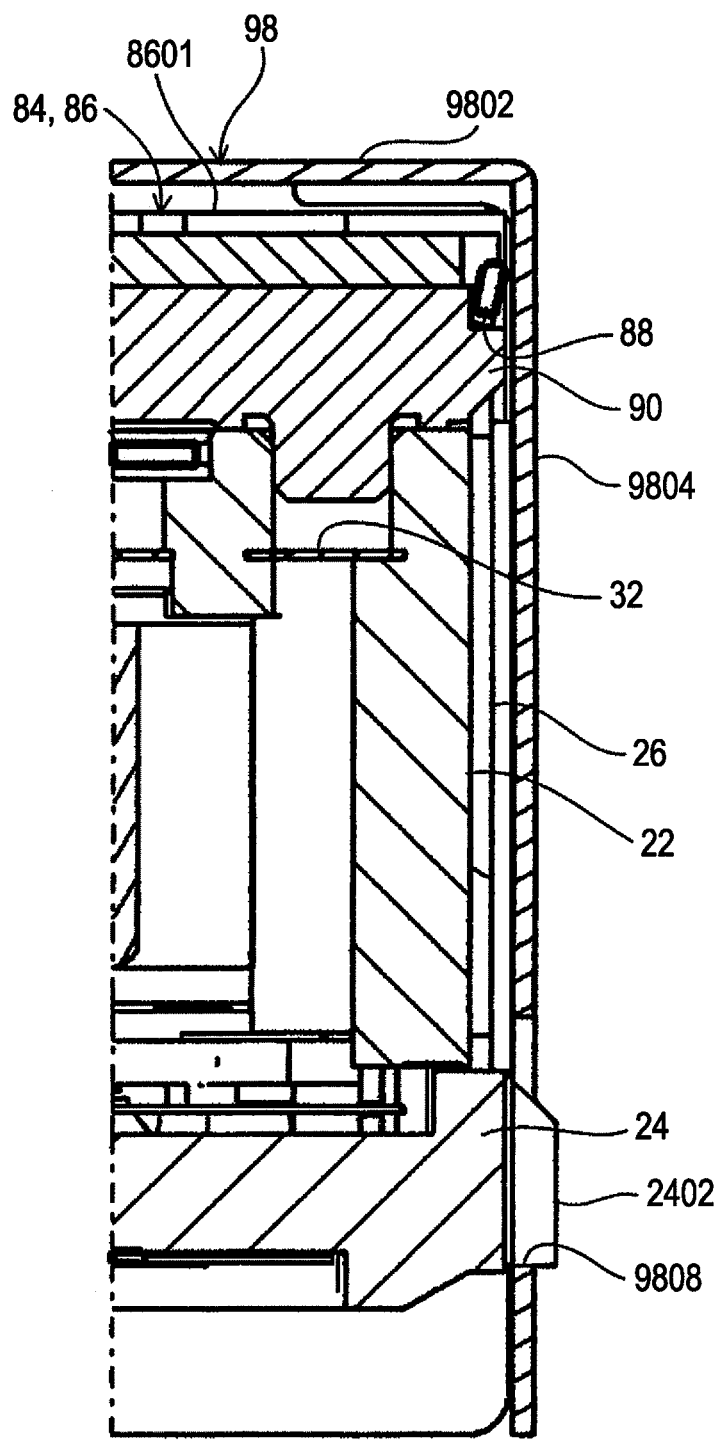
FIG. 42 is a sectional view illustrating the mounting of the shield case 98 to the front lens barrel 22.

FIG. 40 is a sectional view illustrating the mounting of the shutter section 84 to the front lens barrel 22. FIGS. 41 and 42 are sectional views illustrating the mounting of the shield case 98 to the front lens barrel 22.

Figure 43:
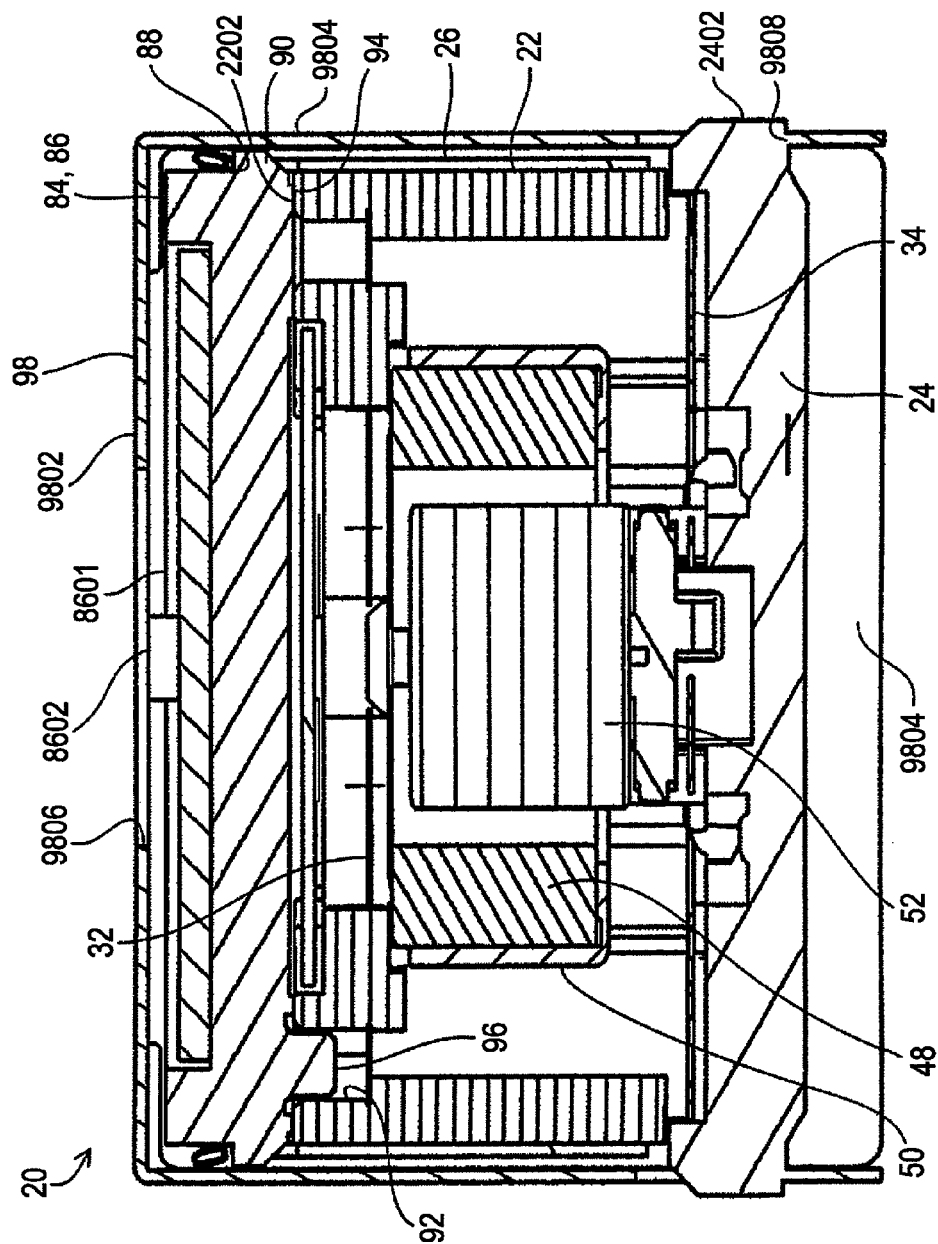
FIG. 43 is a sectional view of the camera module 20 to which the shield case 98 is mounted.

FIG. 43 is a sectional view of the camera module 20 to which the shield case 98 is mounted.

Figure 44:
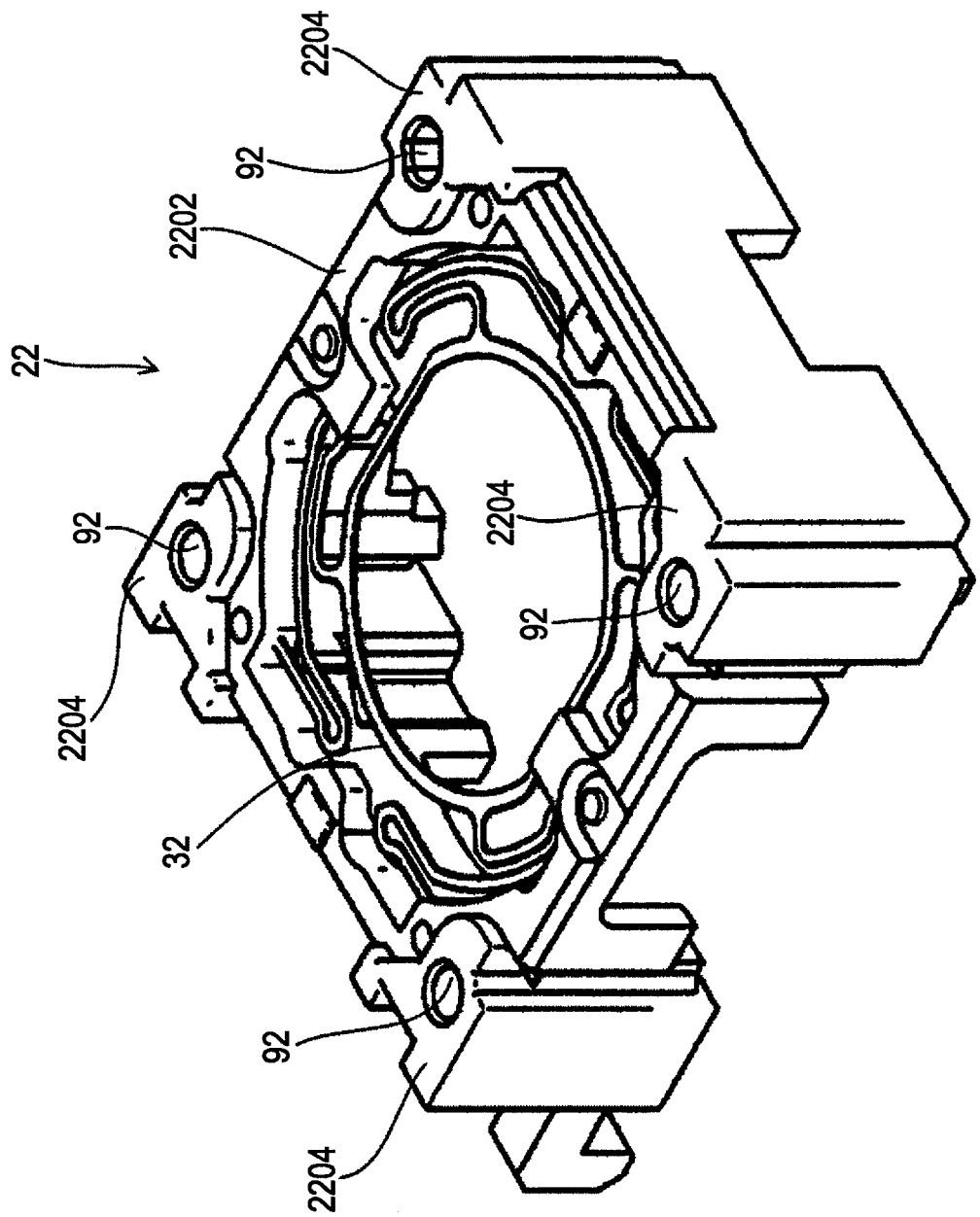
FIG. 44 is a perspective view of the front lens barrel 22.
Figure 45:
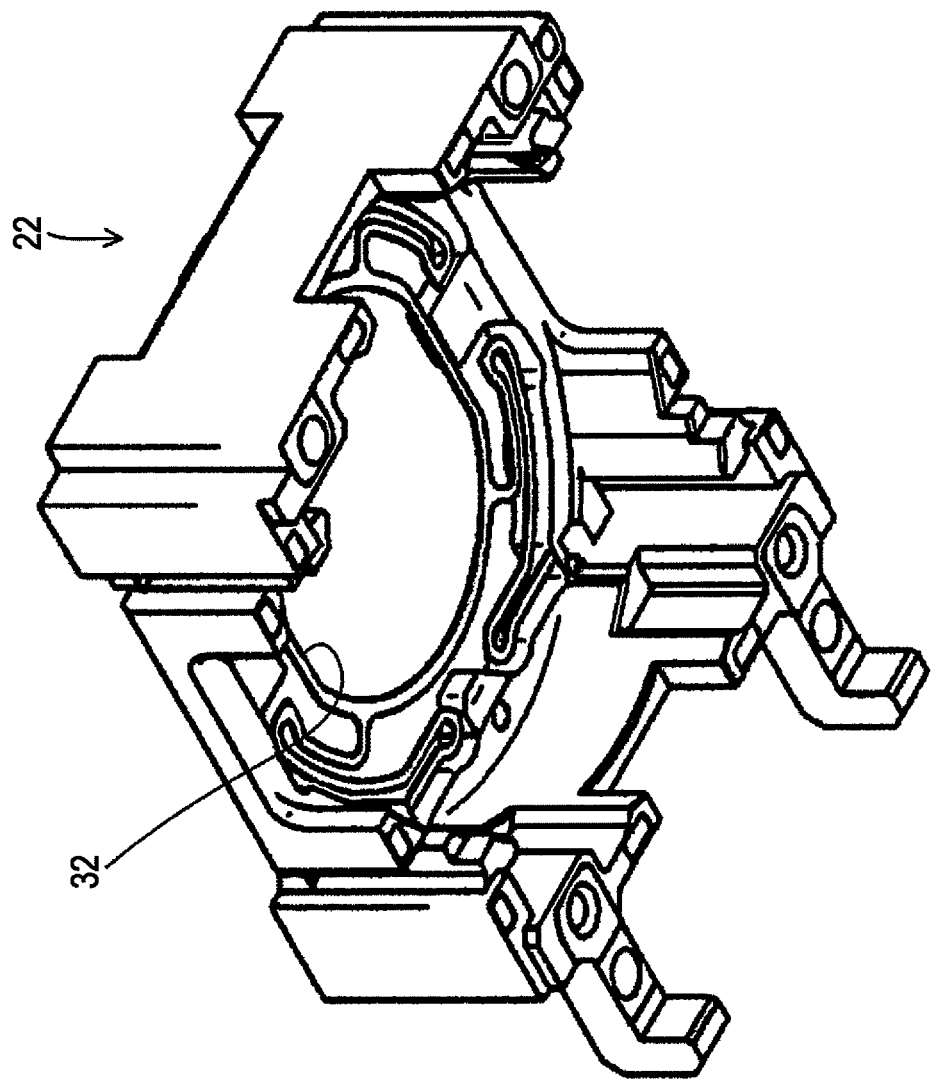
FIG. 45 is a perspective view of the front lens barrel 22.
Figure 46:
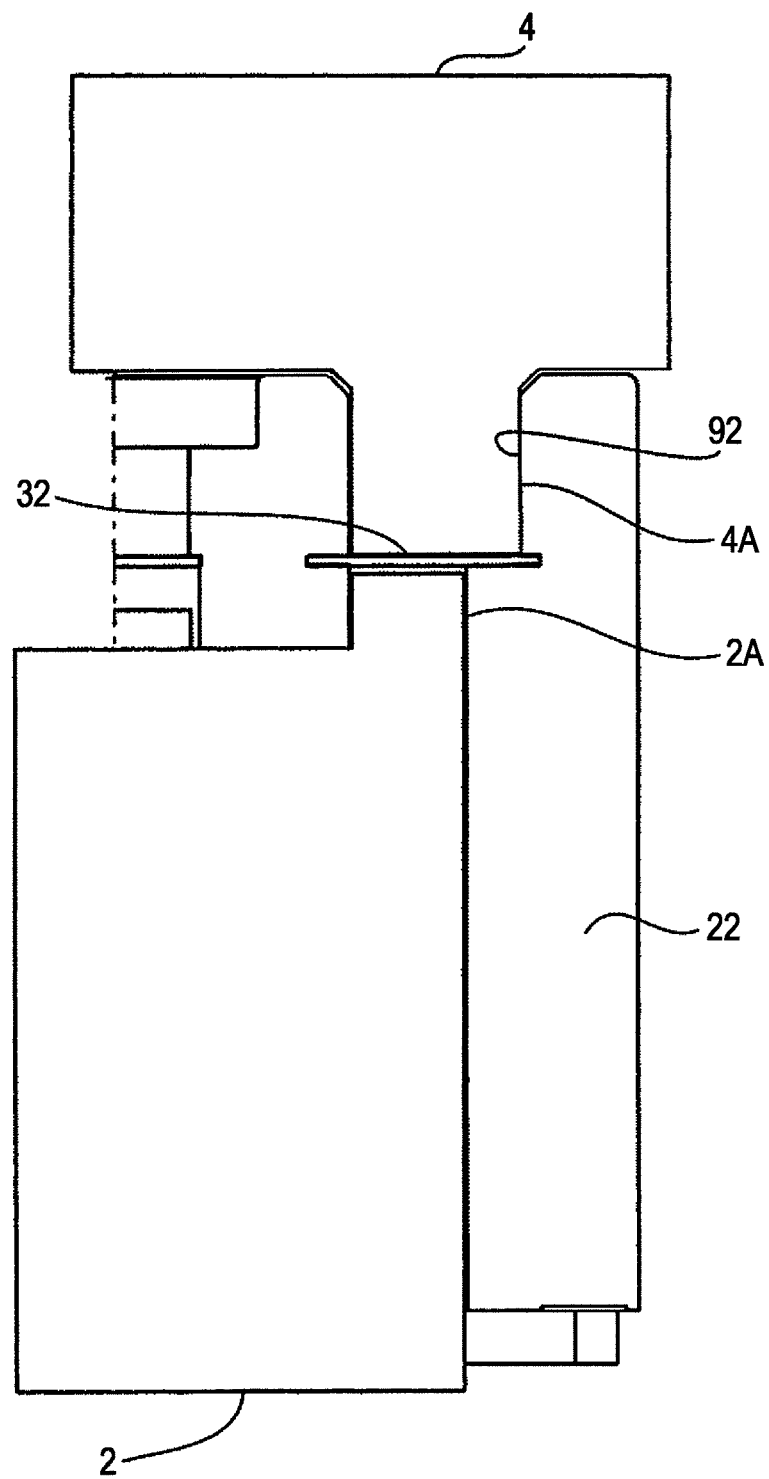
FIG. 46 illustrates insert molding of a front spring 32 to the front lens barrel 22.

FIGS. 44 and 45 are perspective views of the front lens barrel 22. FIG. 46 illustrates insert molding of the front spring 32 to the front lens barrel 22.

The shape of the front lens barrel 22 and the shape of the cover 26 to which the present invention is applied differ slightly from those in the embodiment shown in FIGS. 2 to 32.

Starting with the description of the front lens barrel 22, as shown in FIGS. 33 and 44, the front lens barrel 22 has the rectangular front surface 2202 having the form of a rectangular frame, and positioning surfaces 2204, used for positioning the image pickup optical system 28 in the optical axis direction, are provided at the four corners of the front surface 2202. In addition, positioning holes 92 for performing positioning in a plane orthogonal to the optical axis are provided in the respective positioning surfaces 2204.

When molding the front lens barrel 22, the positioning holes 92 are formed at the same time that insert molding of the front spring 32 is performed.

That is, as shown in FIG. 46, product cavities for molding the front lens barrel 22 are formed in a pair of molds 2 and 4. Here, while the four corners of the front spring 32 are clamped by a protruding portion 2A and a pin 4A of the pair of molds 2 and 4, molten synthetic resin is poured into the product cavities, to form the front lens barrel 22 that holds the four corners of the front spring 32.

The positioning holes 92 are holes where the pin 4A of the mold 4 holding the front spring 32 is positioned. By using such holes as the positioning holes 92, costs are reduced.

Furthermore, three of the four positioning holes 92 are circular in cross section, and the remaining one is elliptical in cross section.

(Cover 26)

Next, the cover 26 will be described.

As shown in FIGS. 33 and 34, the cover 26 has a front surface section 2602, which covers a portion excluding the four corners (the positioning surfaces 2204) of the front surface 2202 and which has an opening 2606 for forming the optical path provided in the center, and a pair of side surface sections 2604, bent backwards from opposing sides of the front surface section 2602. That is, unlike the previous embodiment, the two side surface sections 2604 are included instead of the four side surface sections 2604.

In addition, one engagement stopping hole (engagement groove) 2608, which engages and stops the engagement stopping protrusion (engagement protrusion) 57 of the rear lens barrel 24, is provided at each side surface section 2604.

The front lens barrel 22 and the rear lens barrel 24 are clamped by the cover 26 by engaging the front surface section 2602 with and stopping them by the front surface 2202, and by engaging the engagement stopping protrusions 57 of the rear lens barrel 24 with and stopping it by the engagement stopping holes 2608 of the side surface sections 2604.

The pair of side surface sections 2604 have widths along the opposing sides of the front surface section 2602.

With the front lens barrel 22 and the rear lens barrel 24 being clamped by the cover 26, protruding portions 2610 are provided at both sides in a widthwise direction of each side surface section 2604, so as to protrude forwardly from the front surface 2202 (positioning surfaces 2204) of the front lens barrel 22.

Engagement stopping holes 2612 are formed at end portions of the protruding portions 2610. In the embodiment, the above-described cover-side engagement stopping sections 88 are the engagement stopping holes 2612 of the protruding portions 2610.

(Shutter Section 84)

Next, the shutter section 84 will be described.

As shown in FIG. 33, the case 86 has the form of a thin plate having a small thickness in the optical axis direction. The opening 8610 for the optical path of the image pickup optical system 28 is formed in a front surface and a back surface of the case 86.

Engagement stopping protrusions 8602 that can engage and can be stopped by the engagement stopping holes 2612 of the protruding portions 2610 are provided at side portions of the case 86. In the embodiment, the aforementioned case-side engagement stopping sections 90 are the engagement stopping protrusions 8602.

As shown in FIG. 34, with the cover-side engagement stopping sections 88 and the case-side engagement stopping sections 90 being stopped by engaging them with each other, the case 86 has a surface facing the four corners of the front surface 2202 of the front lens barrel 22.

As shown in FIGS. 34, 40, and 41, contact sections 94 that perform positioning in a front-back direction by contacting the positioning surfaces 2204 are provided at four locations of the surface of the case 86 facing the four corners of the front surface 2202.

Positioning protrusions 96 are arranged with the contact sections 94 at the two locations among the four locations.

As shown in FIGS. 33, 40, and 41, these positioning protrusions 96 are inserted into one hole 92A, which is circular in cross section, and one hole 92B, which is elliptical in cross section, among the four positioning holes 92, and are positioned.

With the shutter section 84 being mounted to the rear lens barrel 24 and the front lens barrel 22, which are clamped by the cover 26, the case 86 of the shutter section 84 has a front surface 8601 facing a direction opposite to the front surface 2202 of the front lens barrel 22.

In the embodiment, as shown in FIGS. 33 and 43, the protrusions 8602 protruding forwardly from the front surface of the case 86 are formed so as to bulge from intermediate portions of a pair of opposing sides of the front surface 8601 of the case 86 of the shutter section 84.

(Shield Case 98)

In the embodiment, as shown in FIGS. 37 to 39, there is further included the shield case 98 covering the rear lens barrel 24, the front lens barrel 22, and the shutter 84 with the shutter section 84 being mounted to the front lens barrel 22 and the rear lens barrel 24, which are clamped by the cover 26.

The shield case 98 is formed of a resilient material having electromagnetic shielding capability.

The resilient material having electromagnetic shielding capability may be phosphor bronze, nickel silver, tin, copper; or a copper alloy, such as phosphor bronze, plated with, for example, nickel; or a conductive and non-magnetic material, such as stainless steel.

The shield case 98 has a front surface section 9802, provided with an opening 9806 for forming the optical path, and four side surface sections 9804, bent backwards from the four sides of the front surface section 9802.

In addition, two engagement stopping holes 9808 are provided in a pair of opposing side surface sections 9804 among the four side surface sections 9804.

Further, engagement stopping protrusions 2402 that engage the engagement stopping holes 9808 are provided at the rear lens barrel 24.

Therefore, as shown in FIGS. 39 and 42, the front surface section 9802 is engaged with and stopped by the front surface 8601 of the case 86 of the shutter section 84, and, by engaging the engagement stopping protrusions 2402 of the rear lens barrel 24 with and stopping them by the engagement stopping holes 9808 of the side surface sections 9804, respectively, the shield case 98 is mounted to the rear lens barrel 24 while it covers the shutter section 84, the front lens barrel 22, and the rear lens barrel 24.

As shown in FIGS. 42 and 43, with the shutter section 84, the front lens barrel 22, and the rear lens barrel 24 being covered by the shield case 98, inner surfaces of the side surface sections 9804 of the shield case 98 are situated close to or contact the cover-side engagement stopping sections 88 and the case-side engagement stopping sections 90.

More specifically, with the shutter section 84, the front lens barrel 22, and the rear lens barrel 24 being covered by the shield case 98, the inner surfaces of the side surface sections 9804 of the shield case 98 are situated close to the cover-side engagement stopping sections 88. In addition, the inner surfaces of the side surface sections 9804 of the shield case 98 are in contact with the case-side engagement stopping sections 90.

In addition, with the shutter section 84, the front lens barrel 22, and the rear lens barrel 24 being covered by the shield case 98, the case 86 of the shutter section 84 is urged towards the front surface 2202 (positioning surfaces 2204) by the shield case 98.

In the embodiment, the shield case 98 is disposed, with the front surface section 9802 of the shield case 98 being in contact with the protrusions 8602, and the front surface section 9802 of the shield case 98 being flexed by the protrusions 8602 (in a resiliently deformed state).

More specifically, with the shield case 98 being disposed, the front surface section 9802 of the shield case 98 is resiliently deformed so that a portion of the front surface section 9802 of the shield case 98 in contact with the protrusions 8602 is positioned forwardly of another portion of the front surface section 9802.

In addition, by resiliently deforming such a front surface section 9802, the inner surfaces of the side surface sections 9804 of the shield case 98 are situated close to or contact the cover-side engagement stopping sections 88 and the case-side engagement stopping sections 90. Further, the case 86 of the shutter section 84 is urged towards the front surface 2202 of the front lens barrel 22 by the shield case 98.

Figure 47:
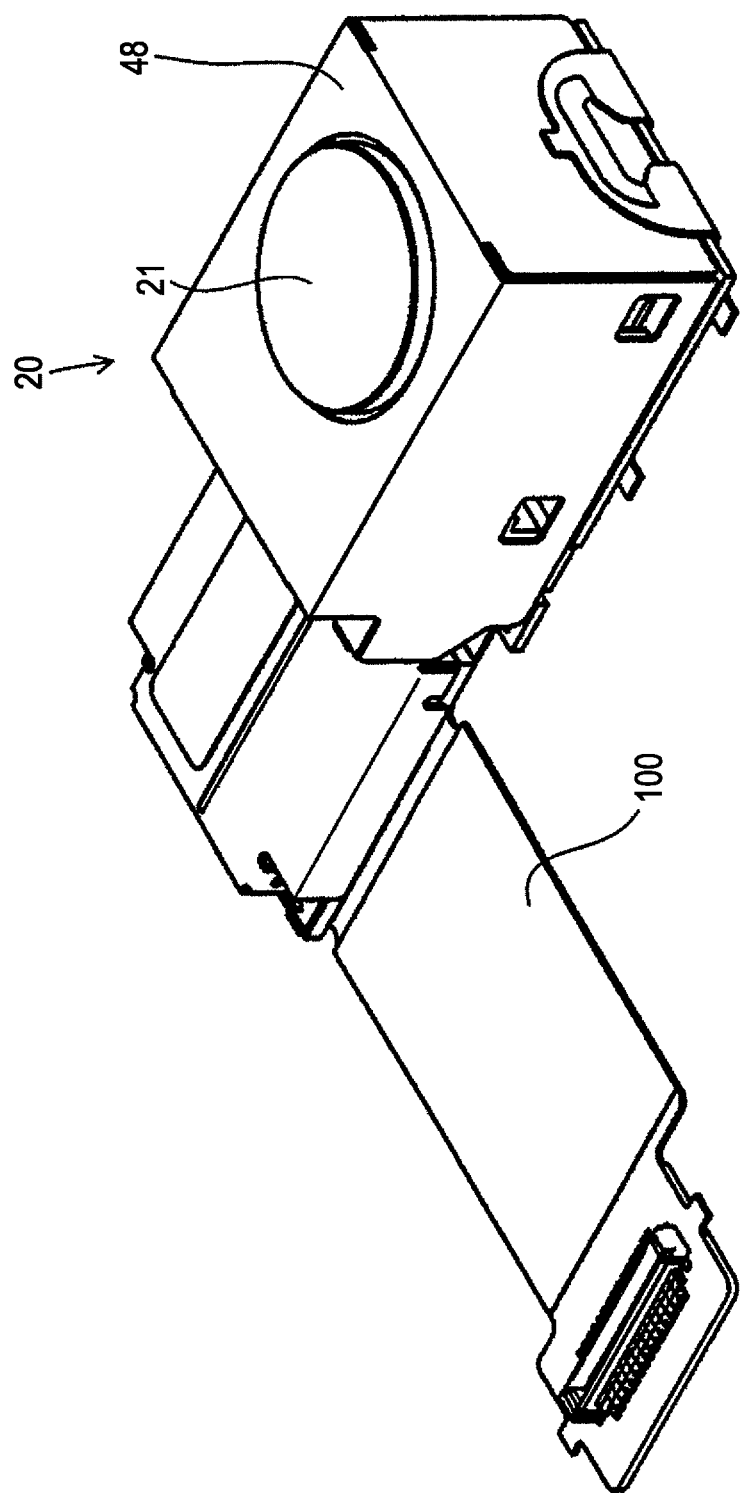
FIG. 47 is a perspective view showing a completed state of the assembly of the camera module 20.

Furthermore, as shown in FIG. 47, a shield case 48 is mounted to the rear lens barrel 24, and a flexible substrate 100 for transmitting a signal is electrically connected to the substrate 56 (FIG. 31) by soldering, so that the camera module 20 is completed.

Furthermore, in FIG. 47, reference numeral 21 denotes a dustproof transparent plate mounted to the front surface of the case 86 so as to cover the opening 8610 of the shutter section 84.

As described above, according to the embodiment, since the shutter section 84 is mounted to the front surface 2202 of the front lens barrel 22 by stopping the cover-side engagement stopping sections 88 of the cover 26 and the case-side engagement stopping sections 90 of the case 86 by engaging them with each other, screws and threaded holes for mounting the shutter section 84 are not required.

Therefore, the present invention is advantageous in terms of reducing the number of parts and simplifying the shapes of the parts, and reducing costs and the size of the camera module.

In addition, in the embodiment, when molding the front lens barrel 22, the holes formed by the pin 4A of the mold 4 that clamps the spring 32 are used as the positioning holes 92 for mounting the shutter section 84. Therefore, the present invention is advantageous in terms of precisely positioning the shutter section 84 in a plane orthogonal to the optical axis of the image pickup optical system 28, without providing parts specially for positioning or without providing shapes for positioning parts.

By ensuring positioning precision of the shutter section 84 in a direction orthogonal to the optical axis, it is possible to reliably prevent the occurrence of vignetting in which a portion of a light beam is blocked by a shutter vane of the shutter section 84, or the occurrence of ununiform brightness (shading) resulting from reflecting a portion of a light beam at an edge of a shutter vane. This is advantageous in terms of improving the quality of an image picked up by the image pickup element 36.

Further, in the embodiment, the cover 26 and the rear lens barrel 24 can be prevented from being disengaged from each other by bringing the inner surfaces of the side surface sections 9804 of the shield case 98 close to or in contact with the cover-side engagement stopping sections 88 and the case-side engagement stopping sections 90. Accordingly, the present invention is advantageous in terms of increasing shock resistance of the camera module 20.

Further, in the embodiment, since the case 86 of the shutter section 84 is urged towards the front surface 2202 (positioning surfaces 2204) of the front lens barrel 22 by resiliently deforming the front surface section 9802 of the shield case 98, the shutter section 84, the front lens barrel 22, and the rear lens barrel 24 are more firmly connected to each other. This is further advantageous in terms of increasing the shock resistance of the camera module 20.

Furthermore, although, in the embodiment, the case in which the case 86 of the shutter section 84 is urged towards the front surface 2202 (positioning surfaces 2204) of the front lens barrel 22 by using the shield case 98 is described, a spring piece that urges the case 86 of the shutter section 84 towards the front surface 2202 (positioning surfaces 2204) of the front lens barrel 22 as a result of contact with the cover 26 may be provided without using the shield case 98.

Figure 48:
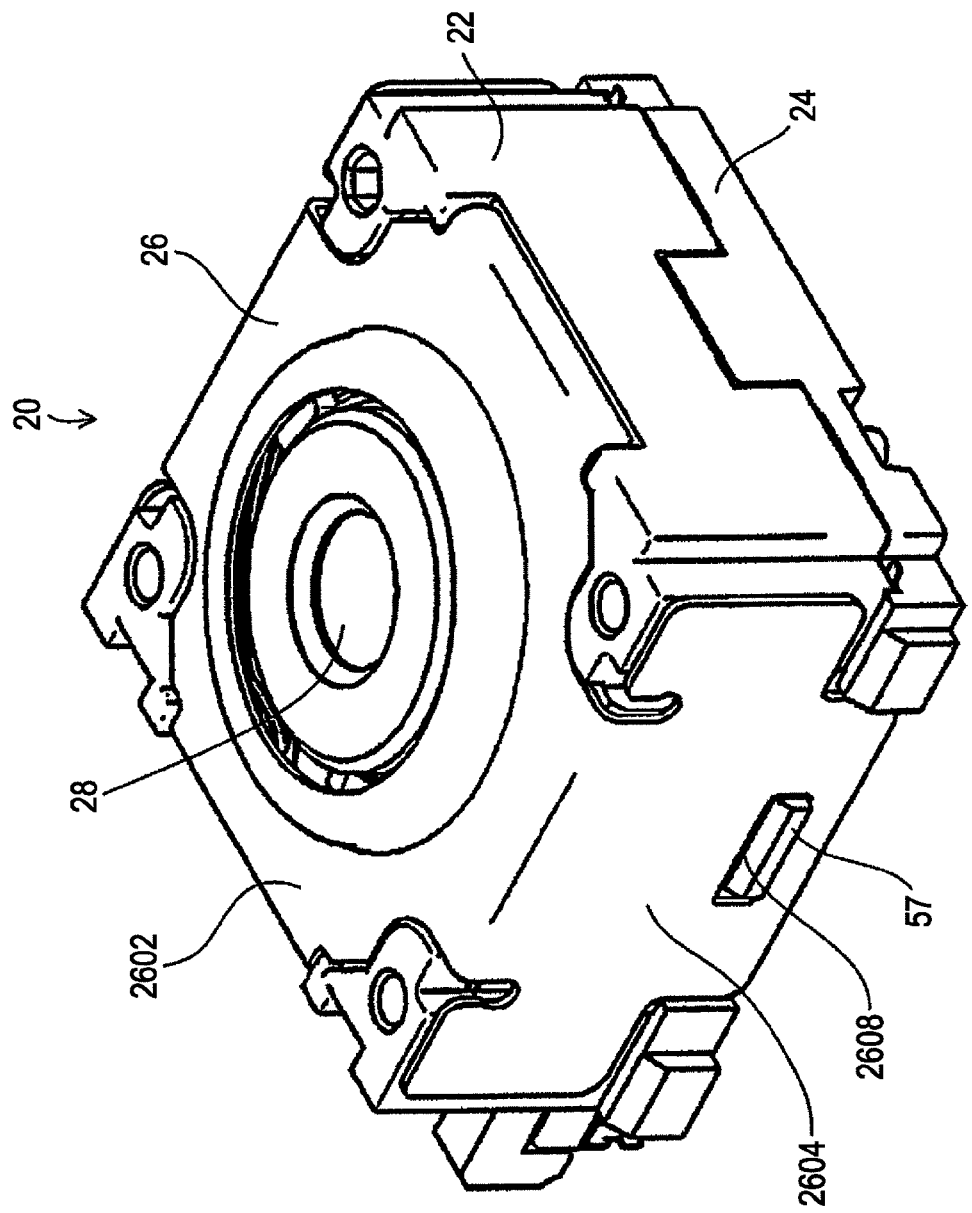
FIG. 48 is a perspective view of the camera module 20 not being provided with the shutter section 84.

In addition, although, in the embodiment, the camera module 20 having the shutter section 84 is described, when a camera module 20 that does not have a shutter section 84 is formed, a cover 26 not having cover-side engagement stopping sections 88 may be used as shown in FIG. 48.

Therefore, if, as the cover 26, two types of covers, a cover having cover-side engagement stopping sections 88 and a cover not having cover-side engagement stopping sections 88 are provided, it is possible to easily assemble both the camera module 20 having the shutter section 84 and the camera module 20 not having the shutter section 84.

Therefore, compared to the case in which a mounting structure for mounting the shutter section 84 is formed at the front lens barrel 22, it is obviously not necessary to manufacture two types of front lens barrels 22, a front lens barrel 22 having such a mounting structure and a front lens barrel 22 not having such a mounting structure. In addition, jigs, used for assembling the front lens barrel 22 and the rear lens barrel 24, need not be provided in accordance with the two types of front lens barrels 22. Therefore, the present invention is advantageous in terms of reducing manufacturing costs.

Comparative Example

Next, a comparative example will be described.

Figure 50:
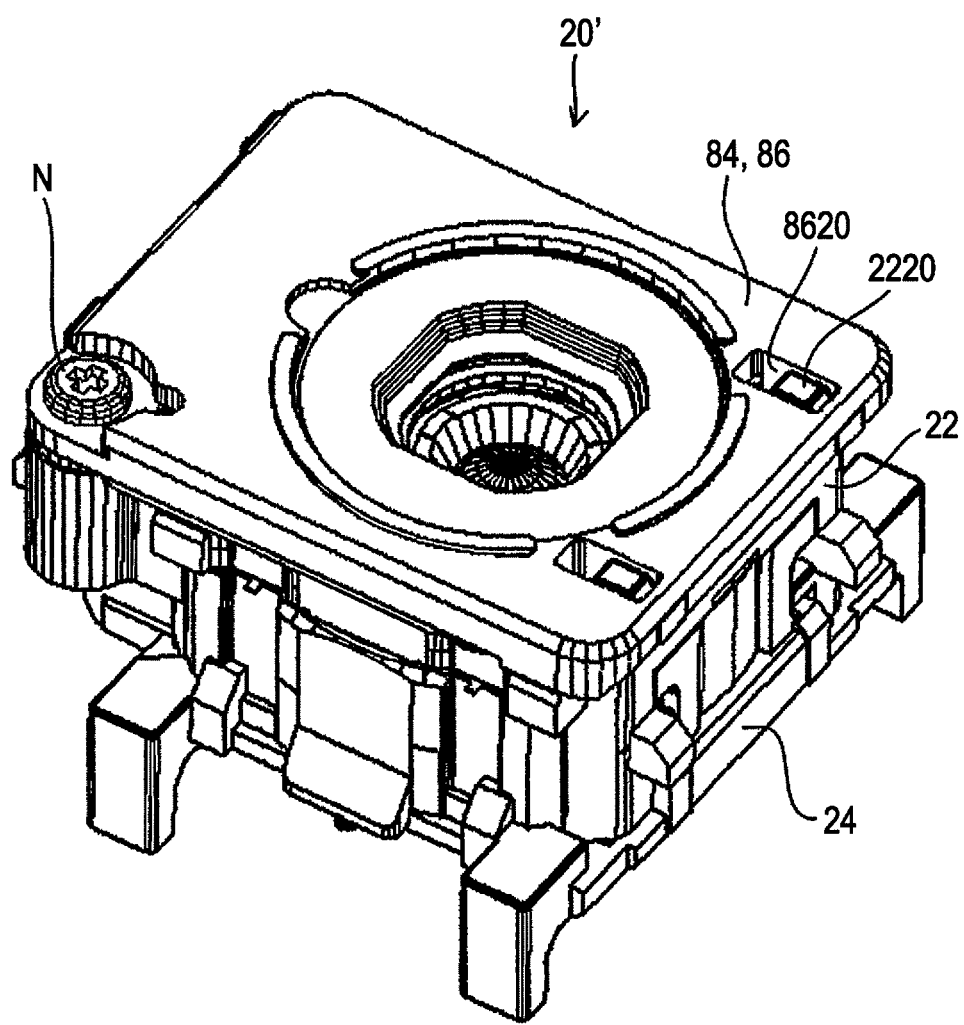
FIG. 50 is a perspective view showing a state in which the shutter section 84 is mounted to the lens barrel 22.

FIG. 49 is an exploded perspective view illustrating mounting of a shutter section 84 to a front lens barrel 22 in a comparative example. FIG. 50 is a perspective view showing a state in which the shutter section 84 is mounted to the front lens barrel 22. Portions or members similar to those according the embodiment will be given the same reference numerals and will be described below.

As shown in FIG. 49, in a camera module 20' according to the comparative example, the front lens barrel 22 includes two engagement stopping pawls 2220, one positioning protrusion 2222, a mounting threaded hole 2224, and a placing surface 2226, formed around the threaded hole 2224.

A case 86 of the shutter section 84 is provided with two engagement stopping holes 8620, in which the two engagement stopping pawls 2220 are inserted, engagement stopping surfaces 8622, provided at the respective engagement stopping holes 8620, a positioning hole (not shown), with which the positioning protrusion 2222 engages, an insertion hole 8624, in which a screw N is inserted, and a placing surface 8626, formed around the screw insertion hole 8624.

In addition, with the engagement stopping pawls 2220 of the front lens barrel 22 being inserted in the two engagement stopping holes 8620 of the shutter section 84, each of the engagement stopping pawls 2220 of the front lens barrel 22 is engaged with and stopped by the corresponding engagement stopping surface 8622, the positioning protrusion 2222 of the front lens barrel 22 is inserted in the positioning hole of the shutter 84, and the placing surfaces 2226 and 8626 are placed upon each other. By this, the shutter section 84 is positioned with respect to the front lens barrel 22 in the optical axis direction of the image pickup optical system 28 and in a plane orthogonal to the optical axis.

In this state, by screwing the screw N inserted in the screw insertion hole 8624 into the threaded hole 2224, the shutter section 84 is mounted to the front lens barrel 22.

In such a related camera module 20', for the structure for positioning and mounting the shutter section 84 with respect to the front lens barrel 22, not only is it necessary to use the threaded hole 2224 and the screw N, but also it is necessary to provide the engagement stopping pawls 2220 at the front lens barrel 22, and the engagement stopping holes 8620 and the engagement stopping surfaces 8622 at the case 86 of the shutter section 84. Since the number of parts is increased, and the shapes of the parts become complicated, this is disadvantageous in terms of reducing costs and size.

In contrast, according the camera module 20 of the present invention, since, for example, the aforementioned threaded hole 2224 and the screw N can be omitted, it is possible to considerably reduce the number of parts.

In addition, since it is no longer necessary to provide, for example, the front lens barrel 22 with, for example, the engagement stopping pawls 2220, the present invention is advantageous in terms of simplifying the shape of the front lens barrel 22, and considerably advantageous in terms of reducing costs and size compared to the comparative example.

In addition, although, in the embodiment, the case in which the electronic apparatus 10 incorporating the camera module 20 is a cellular phone, an image pickup device according to the present invention is widely applicable to various electronic apparatuses, such as a digital still camera or a video camera, or portable information terminals including, for example, a PDA or a notebook personal computer.

Further, in the embodiment, what is called a moving coil system in which the driving section comprises a coil, mounted to the lens holding section, and a magnet, mounted to the rear lens barrel 24, is described. However, the present invention is obviously applicable to what is called a moving magnet system in which the driving section comprises a magnet, mounted to the lens holding section, and a coil, mounted to the rear lens barrel 24.

The invention claimed is:

1. A camera module comprising:
a rear lens barrel;
a front lens barrel mounted to a front side of the rear lens barrel, the front lens barrel forming along with the rear lens barrel an accommodation space in which an image pickup optical system is accommodated;
a shutter section mounted to a front surface of the front lens barrel; and
a cover disposed between the front lens barrel and the shutter section and engaged with and stopped by the front lens barrel and the rear lens barrel, the cover clamping the front lens barrel and the rear lens barrel in a front-back direction,
wherein the shutter section includes a shutter blade that opens and closes an optical path of the image pickup optical system, an actuator that drives the shutter blade, and a case that accommodates the shutter blade and the actuator and that has an opening for the optical path, and
wherein the shutter section is mounted to the front surface of the front lens barrel by stopping a cover-side engagement stopping section of the cover and a case-side engagement stopping section of the case by engaging the cover-side engagement stopping section of the cover and the case-side engagement stopping section of the case with each other, and
wherein the front lens barrel includes rear-end surfaces were a peripheral wall faces the hack to provide setting surfaces set upon the rear end barrel and the front lens barrel includes protruding portions from rear end sides at two outer surfaces opposing each other on said peripheral wall.

2. The camera module according to claim 1, wherein the front surface of the front lens barrel has the form of a rectangular frame, wherein the cover has a front surface section and a pair of side surface sections, the front surface section covering a portion excluding four corners of the front surface and having an opening in a center thereof, the pair of side surface sections being bent backward from opposing sides of the front surface section, and wherein the front lens barrel and the rear lens barrel are clamped by the cover by engaging the front surface section with and stopping the front surface section by the front surface, and by engaging engagement stopping protrusions of the rear lens barrel with and stopping the engagement stopping protrusions of the rear lens barrel by engagement stopping holes of the side surface sections.

3. The camera module according to claim 2, wherein the pair of side surface sections have widths along the opposing sides of the front plate section, wherein, with the front lens barrel and the rear lens barrel being clamped by the cover, protruding portions are provided at both sides in a widthwise direction of each side surface section, respectively, the protruding portions protruding forwardly from the front surface of the front lens barrel, wherein engagement stopping holes are formed at end portions of the protruding portions, wherein engagement stopping protrusions that are capable of being engaged with and stopped by the engagement stopping holes of the protruding portions are provided at the case, wherein the cover-side engagement stopping section is the engagement stopping hole of the protruding portion, and wherein the case-side engagement stopping section is the engagement stopping protrusion.

4. The camera module according to claim 1, wherein, with the cover-side engagement stopping section and the case-side engagement stopping section being stopped by engaging the cover-side engagement stopping section and the case-side engagement stopping section with each other, the case has a surface facing four corners of the front surface of the front lens barrel, wherein positioning protrusions are provided at two locations among four locations of the surface of the case facing the four corners of the front surface, and wherein positioning holes in which the protrusions are inserted and used for positioning the case in a plane orthogonal to an optical axis of the image pickup optical system are provided in the front surface.

5. The camera module according to claim 1, wherein, with the cover-side engagement stopping section and the case-side engagement stopping section being stopped by engaging the cover-side engagement stopping section and the case-side engagement stopping section with each other, the case has a surface facing four corners of the front surface of the front lens barrel, and wherein contact sections that perform positioning in a front-back direction by contacting the front surface are provided at four locations of the surface of the case facing the four corners of the front surface.

6. The camera module according to claim 1, wherein, with the cover-side engagement stopping section and the case-side engagement stopping section being stopped by engaging the cover-side engagement stopping section and the case-side engagement stopping section with each other, the case has a surface facing four corners of the front surface of the front lens barrel, wherein contact sections that perform positioning in a front-back direction by contacting the front surface are provided at four locations of the surface of the case facing the four corners of the front surface, wherein positioning protrusions are arranged with the contact sections at the two locations among the four locations, and wherein positioning holes in which the protrusions are inserted and used for positioning the case in a plane orthogonal to an optical axis of the image pickup optical system are provided in the front surface.

7. The camera module according to claim 4, further comprising a lens holding section holding the image pickup optical system and accommodated in the accommodation space, and a spring disposed towards the front surface of the front lens barrel in the accommodation space and urging the lens holding section backwards, wherein the spring is insert-molded to the front lens barrel, and wherein the positioning holes are holes where a pin of a mold for holding the spring is positioned when molding the front lens barrel.

8. The camera module according to claim 1, further comprising a shield case covering the shutter section, the front lens barrel, and the rear lens barrel with the shutter section being mounted to the front lens barrel and the rear lens barrel, which are clamped by the cover, wherein, with the shutter section being mounted to the front lens barrel and the rear lens barrel, which are clamped by the cover, the case of the shutter section has a front surface facing a direction opposite to the front surface of the front lens barrel, wherein the shield case is disposed by being engaged with and being stopped by the front surface of the case of the shutter section, and by being engaged with and being stopped by the rear lens barrel, and wherein the shield case is situated close to or contacts the cover-side engagement stopping section and the case-side engagement stopping section.

9. The camera module according to claim 1, further comprising a shield case covering the shutter section, the front lens barrel, and the rear lens barrel with the shutter section being mounted to the front lens barrel and the rear lens barrel, which are clamped by the cover, wherein, with the shutter section being mounted to the front lens barrel and the rear lens barrel, which are clamped by the cover, the case of the shutter section has a front surface facing a direction opposite to the front surface of the front lens barrel, wherein the shield case is disposed by being engaged with and being stopped by the front surface of the case of the shutter section, and by being engaged with and being stopped by the rear lens barrel, and wherein the case of the shutter section is urged towards the front surface of the front lens barrel by the shield case.

10. The camera module according to claim 8, wherein protruding portions protruding forwardly from both side portions of the front surface are provided at intermediate portions of the front surface of the case of the shutter section, wherein the shield case has a front surface section opposing the front surface of the case of the shutter section, wherein the shield case is engaged with and stopped by the front surface of the case of the shutter section by contacting the front surface of the shield case with the protruding portions, and wherein, with the shield case being disposed, the front surface section of the shield case is resiliently deformed so that a portion of the front surface section of the shield case in contact with the protruding portions is positioned forwardly of another portion of the front surface section.

11. The camera module according to claim 6, further comprising a lens holding section holding the image pickup optical system and accommodated in the accommodation space, and a spring disposed towards the front surface of the front lens barrel in the accommodation space and urging the lens holding section backwards, wherein the spring is insert-molded to the front lens barrel, and wherein the positioning holes are holes where a pin of a mold for holding the spring is positioned when molding the front lens barrel.

12. The camera module according to claim 9, wherein protruding portions protruding forwardly from both side portions of the front surface are provided at intermediate portions of the front surface of the case of the shutter section, wherein the shield case has a front surface section opposing the front surface of the case of the shutter section, wherein the shield case is engaged with and stopped by the front surface of the case of the shutter section by contacting the front surface of the shield case with the protruding portions, and wherein, with the shield case being disposed, the front surface section of the shield case is resiliently deformed so that a portion of the front surface section of the shield case in contact with the protruding portions is positioned forwardly of another portion of the front surface section.

* * * * *